(12) United States Patent
Sethuraman et al.

(10) Patent No.: US 12,273,554 B2
(45) Date of Patent: Apr. 8, 2025

(54) SEARCH REGION FOR MOTION VECTOR REFINEMENT

(71) Applicant: HUAWEI TECHNOLOGIES CO., LTD., Guangdong (CN)

(72) Inventors: Sriram Sethuraman, Bangalore (IN); Sagar Kotecha, Maharashtra (IN); Jeeva Raj A, Rasipuram (IN); Semih Esenlik, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 269 days.

(21) Appl. No.: 17/467,794

(22) Filed: Sep. 7, 2021

(65) Prior Publication Data

US 2021/0409754 A1    Dec. 30, 2021

Related U.S. Application Data

(63) Continuation of application No. PCT/CN2020/077920, filed on Mar. 5, 2020.

(30) Foreign Application Priority Data

Mar. 8, 2019  (IN) .............................. 201931009158

(51) Int. Cl.
  *H04N 19/52*   (2014.01)
  *H04N 19/105*  (2014.01)
  (Continued)

(52) U.S. Cl.
  CPC .......... *H04N 19/52* (2014.11); *H04N 19/105* (2014.11); *H04N 19/172* (2014.11);
  (Continued)

(58) Field of Classification Search
  None
  See application file for complete search history.

(56) References Cited

U.S. PATENT DOCUMENTS

| 5,786,860 A * | 7/1998 | Kim .................. H04N 19/56 375/E7.25 |
| 6,424,676 B1 * | 7/2002 | Kono ................. H04N 19/513 375/E7.123 |

(Continued)

FOREIGN PATENT DOCUMENTS

| CN | 101489131 A | * | 7/2009 |
| CN | 101888546 A | | 11/2010 |

(Continued)

OTHER PUBLICATIONS

Zhou Yun et al., Study on the Development of Video Coding Standard VVC, Academy of Broadcasting Science, Sep. 15, 2018, with an English abstract total 6 pages.

(Continued)

*Primary Examiner* — Stefan Gadomski
(74) *Attorney, Agent, or Firm* — WOMBLE BOND DICKINSON (US) LLP

(57) ABSTRACT

A method for determining a motion vector to be used in inter-prediction of a current block of a video picture, the method comprising: obtaining an initial motion vector; obtaining at least two groups of points according to the initial motion vector, wherein a first group of the at least two groups of points only includes a first point corresponding to the initial motion vector and additional N points with N≥0 and wherein each point of the first group is closer to the first point than any point of the points of a second group of the at least two groups; and obtaining the motion vector for the current block according to the at least two groups of points and a cost function.

20 Claims, 28 Drawing Sheets

(51) Int. Cl.
  *H04N 19/172*  (2014.01)
  *H04N 19/176*  (2014.01)
  *H04N 19/533*  (2014.01)
  *H04N 19/56*  (2014.01)
  *H04N 19/567*  (2014.01)
  *H04N 19/57*  (2014.01)

(52) U.S. Cl.
  CPC ......... *H04N 19/176* (2014.11); *H04N 19/533* (2014.11); *H04N 19/56* (2014.11); *H04N 19/567* (2014.11); *H04N 19/57* (2014.11)

(56) References Cited

U.S. PATENT DOCUMENTS

| | | | |
|---|---|---|---|
| 7,408,988 B2 * | 8/2008 | Linzer | G06T 7/223 |
| | | | 375/E7.113 |
| 8,611,415 B1 * | 12/2013 | Xu | H04N 19/513 |
| | | | 375/240 |
| 9,591,326 B2 * | 3/2017 | Xu | H04N 19/61 |
| 10,009,629 B2 * | 6/2018 | Xu | H04N 19/57 |
| 10,511,835 B2 * | 12/2019 | Chuang | H04N 19/57 |
| 10,708,617 B2 * | 7/2020 | Wu | H04N 19/513 |
| 10,812,810 B2 * | 10/2020 | Ye | H04N 19/52 |
| 2002/0025001 A1 * | 2/2002 | Ismaeil | H04N 19/56 |
| | | | 375/E7.113 |
| 2008/0159400 A1 * | 7/2008 | Lee | H04N 19/176 |
| | | | 375/E7.157 |
| 2008/0212719 A1 * | 9/2008 | Okada | H04N 19/57 |
| | | | 375/240.16 |
| 2009/0168884 A1 * | 7/2009 | Lu | H04N 19/109 |
| | | | 375/240.16 |
| 2010/0066914 A1 * | 3/2010 | Sato | H04N 7/014 |
| | | | 348/E5.062 |
| 2010/0315547 A1 * | 12/2010 | Takada | H04N 19/61 |
| | | | 348/E11.006 |
| 2011/0002550 A1 * | 1/2011 | Takada | G06T 7/223 |
| | | | 382/218 |
| 2012/0057631 A1 * | 3/2012 | Le Leannec | H04N 19/33 |
| | | | 375/E7.026 |
| 2012/0075535 A1 * | 3/2012 | Van Beek | H04N 5/145 |
| | | | 348/E5.062 |
| 2013/0259134 A1 * | 10/2013 | Sato | H04N 19/52 |
| | | | 375/240.16 |
| 2014/0092968 A1 * | 4/2014 | Guillemot | H04N 19/597 |
| | | | 375/E7.125 |
| 2015/0117543 A1 * | 4/2015 | Hong | H04N 19/533 |
| | | | 375/240.16 |
| 2015/0201209 A1 * | 7/2015 | Sakamoto | H04N 19/56 |
| | | | 375/240.16 |
| 2017/0142438 A1 * | 5/2017 | Hepper | H04N 19/117 |
| 2017/0332094 A1 * | 11/2017 | Maaninen | H04N 19/176 |
| 2018/0070105 A1 * | 3/2018 | Jin | H04N 19/521 |
| 2018/0184106 A1 * | 6/2018 | Hu | H04N 19/105 |
| 2018/0184117 A1 | 6/2018 | Chen et al. | |
| 2018/0199057 A1 * | 7/2018 | Chuang | H04N 19/573 |
| 2018/0249154 A1 * | 8/2018 | Chuang | H04N 19/567 |
| 2018/0316929 A1 * | 11/2018 | Li | H04N 19/52 |
| 2018/0359486 A1 * | 12/2018 | Lai | H04N 19/88 |
| 2019/0020895 A1 | 1/2019 | Liu et al. | |
| 2019/0200033 A1 * | 6/2019 | Fu | H04N 19/105 |
| 2019/0320199 A1 * | 10/2019 | Chen | H04N 19/176 |
| 2020/0007888 A1 * | 1/2020 | Xu | H04N 19/52 |
| 2020/0128258 A1 * | 4/2020 | Chen | H04N 19/139 |
| 2020/0280735 A1 * | 9/2020 | Lim | H04N 19/137 |

FOREIGN PATENT DOCUMENTS

| | | |
|---|---|---|
| CN | 104811723 A | 7/2015 |
| CN | 105939475 A | 9/2016 |
| WO | 2016206748 A1 | 12/2016 |
| WO | 2019001737 A1 | 1/2019 |
| WO | 2019001741 A1 | 1/2019 |

OTHER PUBLICATIONS

Document: JVET-D0029, Xu Chen et al, Decoder-Side Motion Vector Refinement Based on Bilateral Template Matching, Joint Video Exploration Team (JVET) of ITU-T SG 16 WP 3 and ISO/IEC JTC 1/SC 29/WG 11, 4th Meeting: Chengdu, CN, Oct. 15-21, 2016, total 4 pages.

Document: JVET-M1001-v3, Benjamin Bross et al, Versatile Video Coding (Draft 4), Joint Video Experts Team (JVET) of ITU-T SG 16 WP 3 and ISO/IEC JTC 1/SC 29/WG 11, 13th Meeting: Marrakech, MA, Jan. 9-18, 2019, total 254 pages.

ITU-T H.264(Apr. 2017), Series H: Audiovisual and Multimedia Systems, Infrastructure of audiovisual services—Coding of moving video, Advanced video coding for generic audiovisual services, total 812 pages.

ITU-T H.265(Feb. 2018), Series H: Audiovisual and Multimedia Systems Infrastructure of audiovisual services—Coding of moving video, High efficiency video coding, total 692 pages.

Rosewarne (Primary Editor) C et al: "High Efficiency Video Coding (HEVC) Test Model 16 (HM 16) Update 3 of Encoder Description",2015, JCTVC-U1002_r1, 58 pages.

Chiu Yi-Jen et al: "Decoder-side Motion Estimation and Wiener filter for HEVC", 2013, 6 pages.

* cited by examiner

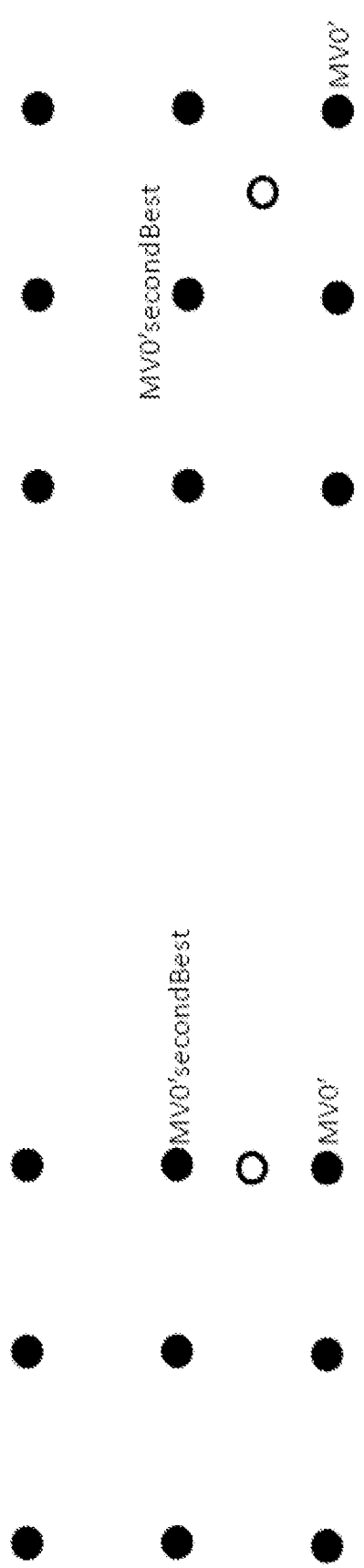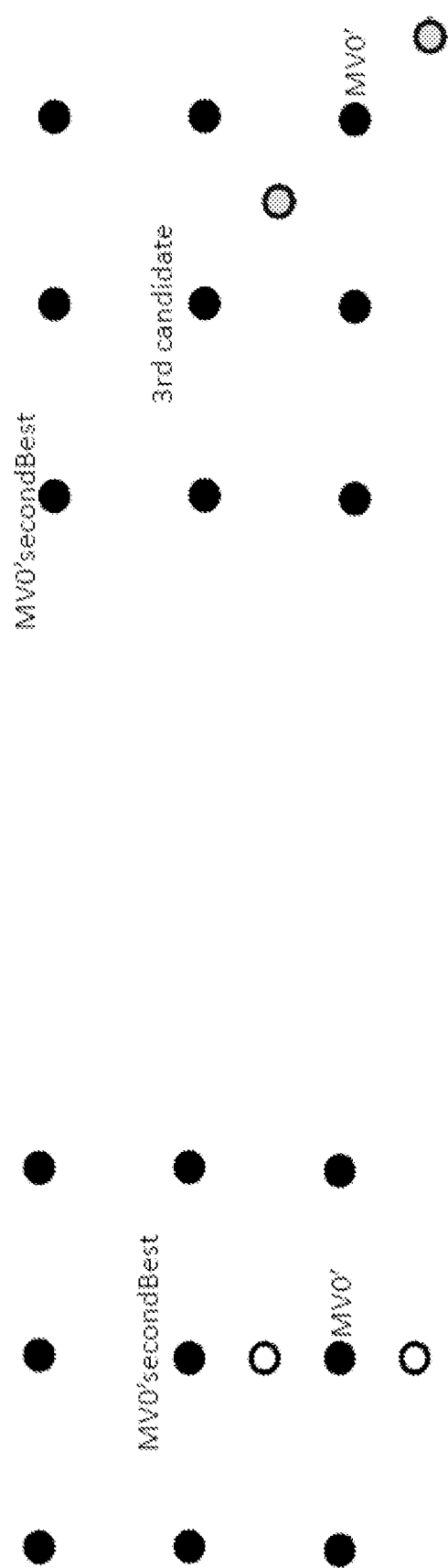

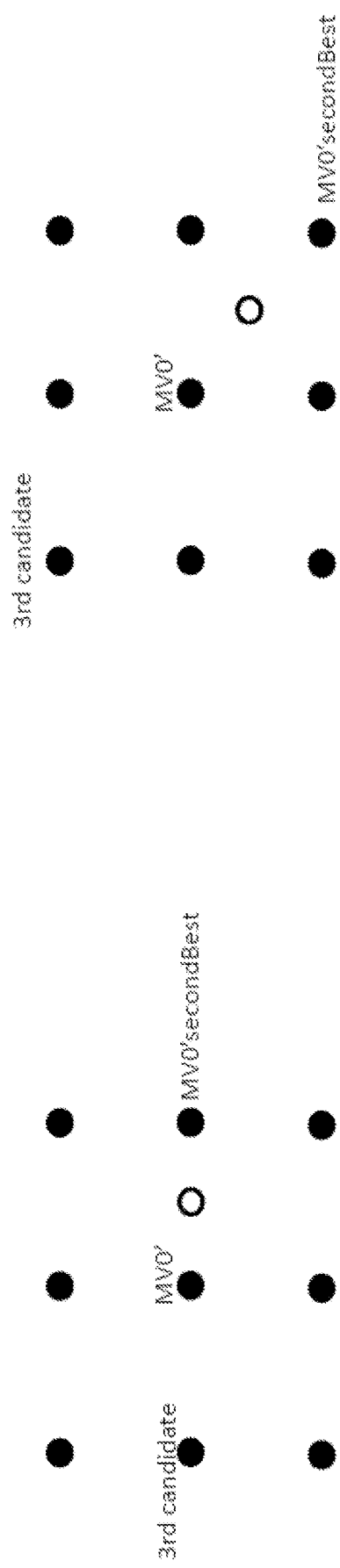

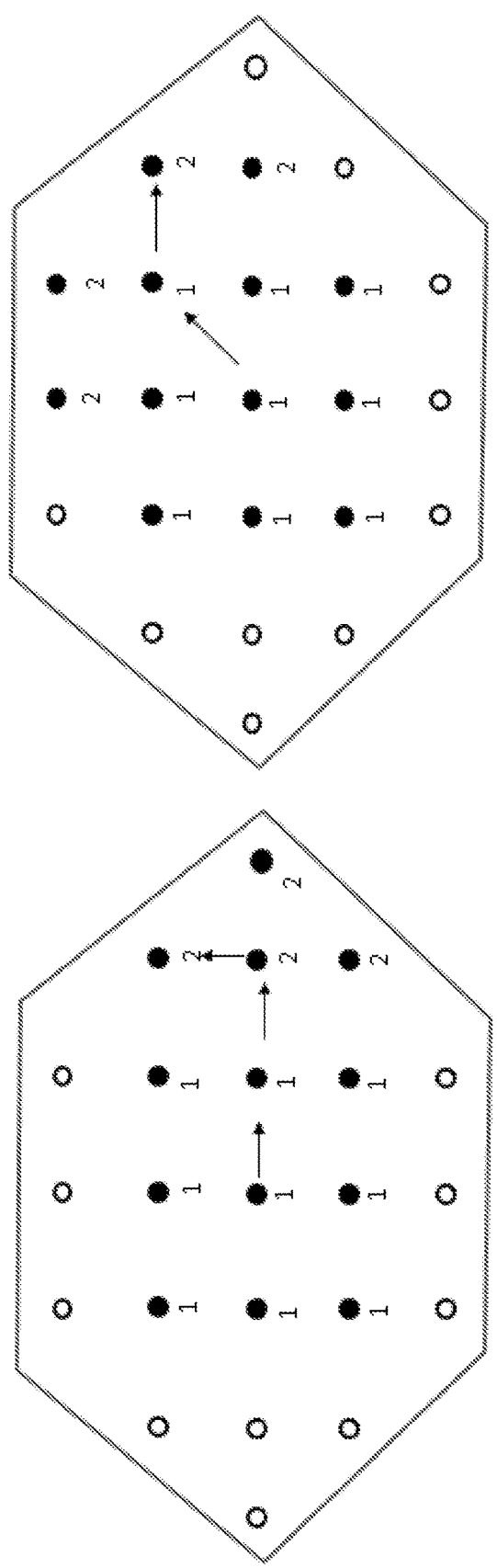
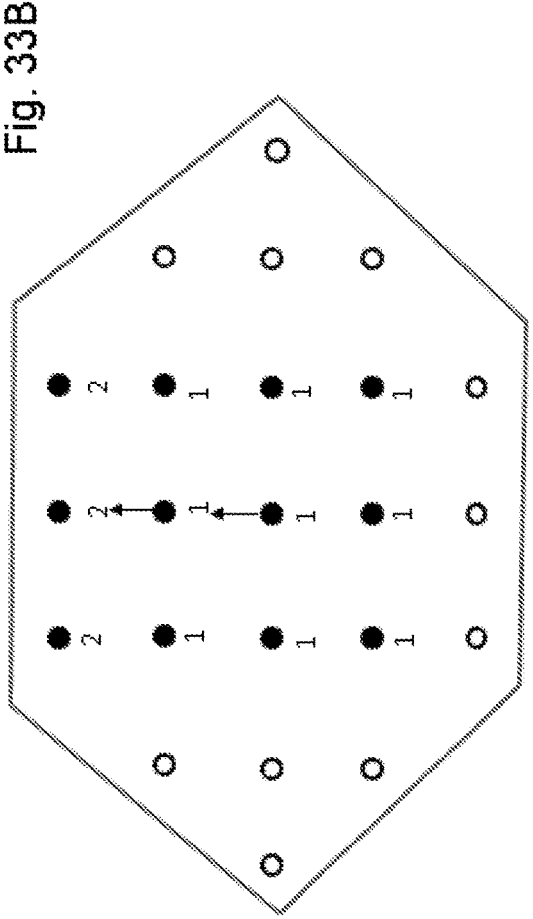
Fig. 33A
Fig. 33B
Fig. 33C

SEARCH REGION FOR MOTION VECTOR REFINEMENT

CROSS-REFERENCE TO RELATED APPLICATION

This application is a continuation of International Application No. PCT/CN2020/077920, filed on Mar. 5, 2020, which claims priority India provisional Patent Application No.IN201931009158, filed on Mar. 8, 2019. The disclosures of the aforementioned applications are hereby incorporated by reference in their entireties.

TECHNICAL FIELD

Embodiments of the present disclosure generally relate to the construction of a search space for determining motion vectors of a block of a picture in a video sequence.

BACKGROUND

Current hybrid video codecs employ predictive coding. A picture of a video sequence is subdivided into blocks of pixels and these blocks are then coded. Instead of coding a block pixel by pixel, the entire block is predicted using already encoded pixels in the spatial or temporal proximity of the block. The encoder further processes only the differences between the block and its prediction. The further processing typically includes a transformation of the block pixels into coefficients in a transformation domain. The coefficients may then be further compressed (e.g., by means of quantization) and further compacted (e.g., by entropy coding) to form a bitstream. The bitstream can further include any signaling information which enables the decoder to decode the encoded video. For instance, the signaling may include settings concerning the encoder settings such as size of the input picture, frame rate, quantization step indication, prediction applied to the blocks of the pictures, or the like.

The differences between a block and its prediction are known as the residual of the block. More specifically, each pixel of the block has a residual, which is the difference between an intensity level of that pixel and its predicted intensity level. The intensity level of a pixel is referred to as the pixel value or value of the pixel. The residuals of all the pixels of a block are referred to collectively as the residual of the block. In other words, the block has a residual which is a set or matrix comprising the residuals of all the pixels of the block.

Temporal prediction exploits temporal correlation between pictures, also referred to as frames, of a video. The temporal prediction is also called inter-prediction, as it is a prediction using the dependencies between (inter) different video frames. Accordingly, a block to be decoded, also referred to as a current block, is predicted from one or more previously decoded pictures referred to as reference pictures. The one or more reference pictures are not necessarily pictures preceding the current picture in which the current block is located in the displaying order of the video sequence. The encoder may encode the pictures in a coding order different from the displaying order. As a prediction of the current block, a co-located block (referred to as a predictor) in a reference picture may be determined. The co-located block may be located in the reference picture at the same position as the current block in the current picture. Such prediction is accurate for motionless picture regions, i.e. picture regions without movement from one picture to another.

In the encoder, in order to obtain a predictor which takes movement into account, i.e. a motion-compensated predictor, motion estimation is typically employed. The current block is predicted by a block located in the reference picture at a position indicated by a motion vector. The motion vector points from the position of the co-located block to the position of the current block (or vice versa, depending on the sign convention). In order to enable a decoder to determine the same prediction of the current block as the encoder, the motion vector may be signaled in the bitstream. In order to further reduce the signaling overhead caused by signaling the motion vector for each of the blocks, the motion vector itself may be estimated. The motion vector estimation may be performed based on the motion vectors of blocks which are neighbors of the current block in the spatial and/or the temporal domain.

The prediction of the current block may be computed using one reference picture or by weighting predictions obtained from two or more reference pictures. The reference picture may be an adjacent picture, i.e. a picture immediately preceding or immediately following the current picture in the display order since adjacent pictures are most likely to be similar to the current picture. However, in general, the reference picture may be any picture preceding or following the current picture in the displaying order and preceding the current picture in the bitstream (decoding order). This may provide advantages for instance in case of occlusions and/or non-linear movement in the video content. The reference picture may be signaled in the bitstream.

A special mode of the inter-prediction is a so-called bi-prediction in which two reference pictures are used in generating the prediction of the current block. In particular, two predictions determined in the respective two reference pictures are combined into a prediction signal of the current block. The bi-prediction can result in a more accurate prediction of the current block than the uni-prediction, i.e. prediction using only a single reference picture. The more accurate prediction leads to smaller differences between the pixels of the current block and the prediction (i.e. to smaller residuals), which may be encoded more efficiently, i.e. compressed to a shorter bitstream.

In order to provide more accurate motion estimation, the resolution of the reference picture may be enhanced, for example by interpolating samples between pixels. Fractional pixel interpolation can be performed by weighted averaging of the closest pixels. For example, in case of half-pixel resolution, a bilinear interpolation can be used. Other fractional pixels can be calculated as an average of the closest pixels weighted by, for example, the inverse of the distance between the respective closest pixels to the pixel being predicted.

A motion vector can be estimated, for example, by calculating a similarity between the current block and the corresponding prediction blocks pointed to by candidate motion vectors in the reference picture. This can be a complex computational task. In order to reduce the complexity, the number of candidate motion vectors can be reduced by limiting the candidate motion vectors to a certain search space. The search space may be, for instance, defined by a number and/or positions of pixels surrounding the position in the reference picture corresponding to the position of the current block in the current image. Alternatively, the candidate motion vectors may be defined by a list of candidate motion vectors formed of motion vectors of neighboring blocks.

Motion vectors are usually at least partially determined at the encoder side and signaled to the decoder within the coded bitstream. However, the motion vectors may also be derived at the decoder side. In this case, the current block is not available at the decoder and cannot be used for calculating the similarity between the current block and any of the blocks to which the candidate motion vectors point in the reference picture. Therefore, instead of the current block, a template can be used which can be constructed out of pixels of already decoded blocks. For instance, already decoded pixels adjacent to the current block may be used. Such motion estimation provides an advantage of reducing the signaling: the motion vector is derived in the same way at both the encoder and the decoder and thus, no signaling is needed. On the other hand, the accuracy of such motion estimation may be lower.

In order to provide a tradeoff between the accuracy and signaling overhead, the motion vector estimation may be divided into two operations: motion vector derivation and motion vector refinement. For instance, motion vector derivation may include selection of a motion vector from the list of candidates. The selected motion vector may be further refined, for instance, by a search within a search space. The search in the search space is based on calculating a cost function for each candidate motion vector, i.e. for each candidate position of the block to which the candidate motion vector points.

Document JVET-D0029: Decoder-Side Motion Vector Refinement Based on Bilateral Template Matching, X. Chen, J. An, J. Zheng (The document can be found at: http://phenix.it-sudparis.eu/jvet/ site) shows motion vector refinement in which a first motion vector in integer pixel resolution is found and further refined by a search with a half-pixel resolution in a search space around the first motion vector. Here, the pixel resolution (e.g., integer or half-integer) describes the resolution of the search space, i.e. the displacement of the searched points to the non-refined motion vector that is input to the process. As a result, the search coordinates of the refinement stage do not necessarily coincide with the actual pixel coordinates on the image plane.

SUMMARY OF THE DISCLOSURE

Starting from the above described approaches, it is an aim of the present disclosure to further increase the efficiency of the motion vector estimation in order to improve the coding efficiency and/or reduce complexity.

In order to achieve this, a scheme for constructing a search space for motion vector refinement is provided, involving a first search space and a second search space. The number of positions and/or the positions of the second search space are determined according to two positions in the first search space which are derived based on a cost function.

In particular, according to a first aspect, an apparatus for determining a motion vector to be used in inter-prediction of a current block of a video frame is provided. The apparatus comprises a search space determining unit for obtaining an estimate of the motion vector and determining a first search space comprising a plurality of candidate motion vectors based on the estimate, selecting a first and a second candidate motion vector in the first search space according to a cost function, and determining a second search space comprising one or more candidate motion vectors based on the first and the second candidate motion vectors. The apparatus further comprises a motion vector selecting unit for selecting the motion vector for the current block from among the candidate motion vectors of the first search space and the second search space.

As an advantage, the number of candidate motion vectors tested in the process of motion vector refinement on the decoder side may be reduced while maintaining a high quality coding performance with respect to picture quality and bitrate.

Advantageously, the cost function may be based on a predetermined template and indicates, for the respective candidate motion vector, a level of similarity between the predetermined template and a predictor pointed to by the respective candidate motion vector. The search space determining unit may thus be configured to select, as the first and the second candidate motion vectors, two candidate motion vectors in the first search space which point to predictors of the current block that are most similar to the predetermined template.

According to a first embodiment, the search space determining unit may further be configured to determine the size and/or the position of the second search space in accordance with a direction of a line connecting the positions pointed to by the first and the second candidate motion vectors; in other words, in accordance with the direction of a difference vector of the first and the second candidate motion vectors. The difference vector can be defined as the first candidate motion vector subtracted from the second candidate motion vector, or vice versa.

In an embodiment, the search space determining unit may further be configured to set the first search space to have an integer pixel resolution. The search space determining unit may be configured to include in the second search space one or more candidate motion vectors which point to positions located in the direction of a line connecting the positions to which the first and the second candidate motion vectors point, the second search space having a fractional pixel resolution. The direction of that line may be, in other words, the direction of the difference vector of the first and the second candidate motion vectors.

In an embodiment, at least one of the candidate motion vectors of the second search space may point to a position between positions pointed to by the first and the second candidate motion vectors.

According to a second embodiment, the search space determining unit may be configured to determine a location of a region including at least two positions to which at least two candidate motion vectors point respectively, said at least two positions being adjacent in a pixel resolution of the second search space, and to determine the second search space as those positions of the region which do not belong to the first search space.

In an embodiment, the search space determining unit may be configured to determine the first search space including the estimate of the motion vector and candidate motion vectors pointing to the positions adjacent in a pixel resolution of the first search space to the position pointed to by said estimate of the motion vector.

According to a third embodiment, the search space determining unit may further be configured to determine as a first candidate motion vector of the second search space the candidate motion vector pointing to the position which is adjacent in the pixel resolution of the first search space to the positions pointed to by the first and the second candidate motion vectors identified in the first search space and different from the position pointed to by the estimate of the motion vector.

In an embodiment, the search space determining unit may further be configured to select as a further candidate motion vector of the second search space a candidate motion vector pointing to a position in a resolution of the second search space, which is located approximately on a line connecting the estimate of the motion vector and the candidate of the second search space, the pixel resolution of the second search space being higher than the pixel resolution of the first search space.

In an embodiment, the further candidate motion vector of the second search space may point to a position located between the positions pointed to by the first candidate motion vector of the second search space and the estimate of the motion vector.

In an embodiment, the second search space may have a higher resolution than the first search space.

In an embodiment, the apparatus may further comprise a motion vector determining unit for determining the estimate of the motion vector from a list of motion vectors including motion vectors of at least one block adjacent to the current block.

Further provided is a video decoder for decoding a plurality of pictures from a bitstream. The video decoder in an embodiment comprises a bitstream parser for obtaining from the bitstream an indication of the estimate of the motion vector, an inter-prediction unit including the apparatus according to any embodiment and example of the first aspect, which is further configured to determine a prediction block to which the motion vector of the current block points, and a reconstruction unit for reconstructing the current block based on the prediction block.

Also provided is a video encoder for encoding a plurality of pictures into a bitstream. The video encoder in an embodiment comprises an inter-prediction unit including the apparatus according to any embodiment and example of the first aspect which is further configured to determine a prediction block to which the motion vector of the current block points, a bitstream former for including into the bitstream an indication of the estimate of the motion vector, and a reconstruction unit for reconstructing the current block based on the prediction block and storing the reconstructed block in a memory.

According to a second aspect, a method is provided for determining a motion vector to be used in inter-prediction of a current block. The method comprises the operations of obtaining an estimate of the motion vector, determining a first search space comprising a plurality of candidate motion vectors based on the estimate, selecting a first and a second candidate motion vector in the first search space according to a cost function, determining a second search space comprising one or more candidate motion vectors based on the first and the second candidate motion vectors, and selecting the motion vector for the current block from among the candidate motion vectors of the first search space and the second search space.

Advantageously, the cost function may be based on a predetermined template and indicate, for the respective candidate motion vector, a level of similarity between the predetermined template and a predictor pointed to by the respective candidate motion vector. Selecting the first and the second candidate motion vectors may thus comprise selecting two candidate motion vectors in the first search space which point to predictors of the current block that are most similar to the predetermined template.

In a first exemplary embodiment, in the operation of determining the second search space, the size and/or position of the second search space may be determined in accordance with a direction of a line connecting the positions to which the first and the second candidate motion vectors point.

In an embodiment, in the operation of determining the first search space including a plurality of candidate motion vectors, the first search space may have an integer pixel resolution. In the operation of determining the second search space, the second search space may be determined to include one or more candidate motion vectors pointing to positions located in the direction of a line connecting the positions to which the first and the second candidate motion vectors point, the second search space having a fractional pixel resolution.

In an embodiment, at least one of the candidate motion vectors of the second search space may point to a position between positions pointed to by the first and the second candidate motion vectors.

According to a second exemplary embodiment, in the operation of determining the second search space, a location of a region including at least two positions to which at least two candidate motion vectors point respectively may be determined, said at least two positions being adjacent in a pixel resolution of the second search space, and the second search space may be determined as those positions of the region which do not belong to the first search space.

In an embodiment, in the operation of determining the first search space, the first search space may include the estimate of the motion vector and candidate motion vectors pointing to the positions adjacent in a pixel resolution of the first search space to the position pointed to by said estimate of the motion vector.

According to a third exemplary embodiment, in the operation of determining the second search space, as a first candidate motion vector of the second search space, a candidate motion vector may be determined which points to a position which is adjacent in the pixel resolution of the first search space to the positions pointed to by the first and the second candidate motion vectors identified in the first search space and different from the position pointed to by the estimate of the motion vector.

In an embodiment, as a further at least one candidate motion vector of the second search space, a candidate motion vector may be determined which points to a position in a resolution of the second search space, which is located approximately on a line connecting the estimate of the motion vector and the candidate of the second search space. Therein, the pixel resolution of the second search space may be higher than the pixel resolution of the first search space.

In an embodiment, said further candidate motion vector of the second search space may point to a position located between the positions pointed to by the first candidate motion vector of the second search space and the estimate of the motion vector.

In an embodiment, the second search space may have a higher resolution than the first search space.

In an embodiment, the operation of obtaining the estimate of the motion vector may be performed by determining the estimate of the motion vector from a list of motion vectors including motion vectors of at least one block adjacent to the current block.

BRIEF DESCRIPTION OF THE DRAWINGS

In the following, exemplary embodiments are described in more detail with reference to the attached figures and drawings, in which:

FIGS. 5-8 are schematic drawings of search space configurations according to an embodiment of the present application.

FIGS. 10-11 are schematic drawings of further search space configurations according to an embodiment of the present application.

FIGS. 33A, 33B and 33C are schematic drawings illustrating another example of a multi-stage search in a search space according to an embodiment of the present application.

DETAILED DESCRIPTION OF THE EMBODIMENTS

The present disclosure relates to an efficient determination of a search space for motion compensation and is particularly advantageous for motion vector refinement. The determination of the search space may be employed in motion estimation applied during encoding and decoding of video. In the following, an exemplary encoder and decoder are described which may implement the motion estimation employing the search space construction according to the present disclosure.

Figure 1:
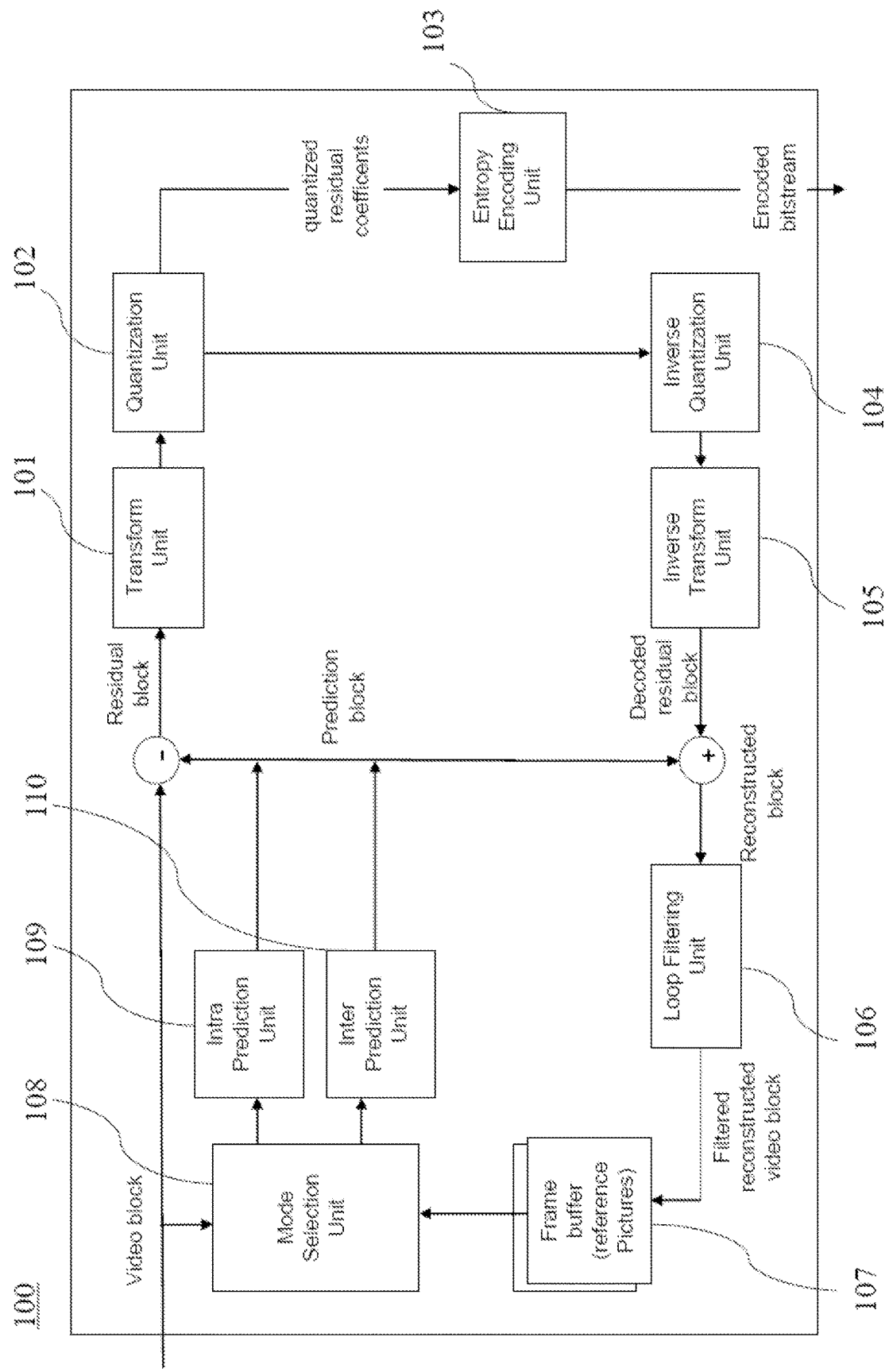
FIG. 1 is a block diagram showing an exemplary structure of a video encoder.

FIG. 1 shows an encoder 100 which comprises an input for receiving input blocks of frames or pictures of a video stream and an output for providing an encoded video bitstream. The term "frame" is used in this disclosure as a synonym for picture. However, it is noted that the present disclosure is also applicable to fields in case interlacing is applied. In general, a picture includes M times N pixels. These correspond to image samples and may each comprise one or more color components. For the sake of simplicity, the following description refers to pixels meaning samples of luminance. However, it is noted that the motion vector search of the embodiments of the disclosure can be applied to any color component including chrominance or components of a color space such as RGB or the like. On the other hand, it may be beneficial to perform motion vector estimation for only one component and to apply the determined motion vector to several (or all) components.

The input blocks to be coded do not necessarily have the same size. One picture may include blocks of different sizes and the block rasters of different pictures may also differ.

The encoder 100 is configured to apply prediction, transformation, quantization, and entropy coding to the video stream. The transformation, quantization, and entropy coding are carried out respectively by a transform unit 101, a quantization unit 102 and an entropy encoding unit 103 so as to generate as an output the encoded video bitstream.

The video stream may include a plurality of frames. Each frame is divided into blocks that are either intra or inter coded. The blocks of, for example, the first frame of the video stream are intra coded by means of an intra prediction unit 109. An intra frame is coded using information from that frame only, so that it can be decoded independently from other frames. An intra frame can thus provide an entry point in the bitstream, e.g., for random access. Blocks of other frames of the video stream may be inter coded by means of an inter prediction unit 110: each block of an inter-coded frame is predicted from a block in another frame (reference frame), e.g., a previously coded frame. A mode selection unit 108 is configured to select whether a block of a frame is to be intra predicted or inter predicted, i.e. whether it will be processed by the intra prediction unit 109 or the inter prediction unit 110. The mode selection unit 108 also controls the parameters of intra of inter prediction. In order to enable refreshing of the image information, an inter coded frame may comprise not only inter coded blocks, but also one or more intra coded blocks. Intra frames, in contrast, contain only intra coded and no inter coded blocks. Intra frames may be inserted in the video sequence (e.g., regularly, that is, each time after a certain number of inter frames) in order to provide entry points for decoding, i.e. points where the decoder can start decoding without using information from preceding frames.

The intra prediction unit 109 is a block prediction unit. For performing spatial or temporal prediction, the coded blocks may be further processed by an inverse quantization unit 104, and an inverse transform unit 105. After reconstruction of the block, a loop filtering unit 106 may be applied to further improve the quality of the decoded image. The filtered blocks then form the reference frames that are then stored in a frame buffer 107. Such a decoding loop (decoder) at the encoder side provides the advantage of producing reference frames which are the same as the reference pictures reconstructed at the decoder side. Accordingly, the encoder and decoder side operate in a corresponding manner. The term "reconstruction" here refers to obtaining the reconstructed block by adding the decoded residual block to the prediction block.

The inter prediction unit 110 receives as an input a block of a current frame or picture to be inter coded and one or several reference frames or pictures from the frame buffer 107. Motion estimation and motion compensation are performed by the inter prediction unit 110. The motion estimation is used to obtain a motion vector and a reference frame, e.g., based on a cost function. The motion compensation then describes a current block of the current frame in terms of the translation of a reference block of the reference frame to the current frame, i.e. by a motion vector. The inter prediction unit 110 selects a prediction block (i.e. a predictor) for the current block from among a set of candidate blocks (i.e. candidate predictors) in the one or several reference frames such that the prediction block minimizes the cost function. In other words, a candidate block for which the cost function is minimum will be used as the prediction block for the current block.

For instance, the cost function may be a measure of a difference between the current block and the candidate block, i.e. a measure of the residual of the current block with respect to the candidate block. For example, the cost function may be a sum of absolute differences (SAD) between all pixels (samples) of the current block and all pixels of the candidate block in the candidate reference picture. However, in general, any similarity metric may be employed, such as mean square error (MSE) or structural similarity metric (SSIM).

However, the cost function may also be the number of bits that are necessary to code such inter-block and/or distortion resulting from such coding. Thus, a rate-distortion optimization procedure may be used to decide on the motion vector selection and/or in general on the encoding parameters such as whether to use inter or intra prediction for a block and with which settings.

The intra prediction unit 109 receives as an input a block of a current frame or picture to be intra coded and one or several reference samples from an already reconstructed area of the current frame. The intra prediction then describes pixels of a current block of the current frame in terms of a function of reference samples of the current frame. The intra prediction unit 109 outputs a prediction block for the current block, wherein said prediction block advantageously minimizes the difference between the current block to be coded and its prediction block, i.e., it minimizes the residual block.

The minimization of the residual block can be based, e.g., on a rate-distortion optimization procedure. In particular, the prediction block is obtained as a directional interpolation of the reference samples. The direction may be determined by the rate-distortion optimization and/or by calculating a similarity measure as mentioned above in connection with inter-prediction.

The difference between the current block and its prediction, i.e. the residual block, is then transformed by the transform unit 101. The transform coefficients are quantized by the quantization unit 102 and entropy coded by the entropy encoding unit 103. The thus generated encoded video bitstream comprises intra coded blocks and inter coded blocks and the corresponding signaling (such as the mode indication, indication of the motion vector, and/or intra-prediction direction). The transform unit 101 may apply a linear transformation such as a discrete Fourier transformation (DFT) or a discrete cosine transformation (DCT). Such transformation into the spatial frequency domain provides the advantage that the resulting coefficients have typically higher values in the lower frequencies. Thus, after an effective coefficient scanning (such as zig-zag), and quantization, the resulting sequence of values has typically some larger values at the beginning and ends with a run of zeros. This enables further efficient coding. The quantization unit 102 performs a lossy compression by reducing the resolution of the coefficient values. Entropy coding unit 103 then assigns binary codewords to coefficient values. The codewords are written to a bitstream referred to as the encoded bitstream. The entropy coder also codes the signaling information (not shown in FIG. 1).

Figure 2:
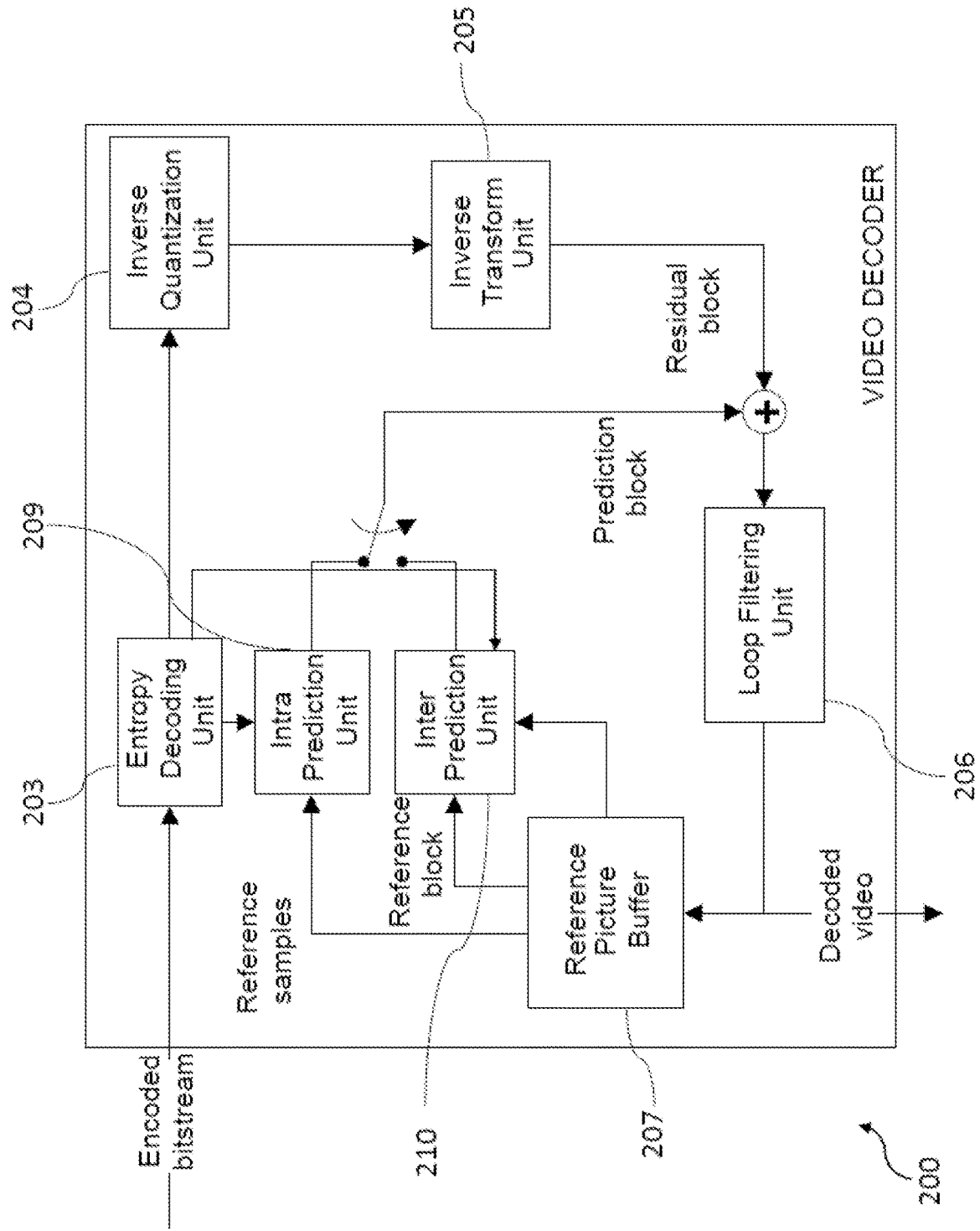
FIG. 2 is a block diagram showing an exemplary structure of a video decoder.

FIG. 2 shows an example of a video decoder 200. The video decoder 200 comprises particularly a reference picture buffer 207 and an intra prediction unit 209, which is a block prediction unit. The reference picture buffer 207 is configured to store at least one reference frame reconstructed from the encoded video bitstream. The intra prediction unit 209 is configured to generate a prediction block, which is an estimate of the block to be decoded. The intra prediction unit 209 is configured to generate this prediction based on reference samples that are obtained from the reference picture buffer 207.

The decoder 200 is configured to decode the encoded video bitstream generated by the video encoder 100, and preferably both the decoder 200 and the encoder 100 generate identical predictions for the respective block to be encoded/decoded. The features of the reference picture buffer 207 and the intra prediction unit 209 are similar to the features of the reference picture buffer 107 and the intra prediction unit 109 of FIG. 1.

The video decoder 200 comprises further units that are also present in the video encoder 100 like, e.g., an inverse quantization unit 204, an inverse transform unit 205, and a loop filtering unit 206, which respectively correspond to the inverse quantization unit 104, the inverse transform unit 105, and the loop filtering unit 106 of the video coder 100.

An entropy decoding unit 203 is configured to decode the received encoded video bitstream to obtain quantized residual transform coefficients and signaling information. The quantized residual transform coefficients are fed to the inverse quantization unit 204 and the inverse transform unit 205 to generate a residual block. The residual block is added to a prediction block and the resulting sum is fed to the loop filtering unit 206 to obtain a decoded video block. Frames of the decoded video can be stored in the reference picture buffer 207 and serve as reference frames for inter prediction.

Generally, the intra prediction units 109 and 209 of FIGS. 1 and 2 can use reference samples from an already encoded area to generate prediction signals for blocks that need to be encoded or need to be decoded.

The entropy decoding unit 203 receives as its input the encoded bitstream. The bitstream may first be parsed, i.e. the signaling parameters and the residuals are extracted from the bitstream. The syntax and semantic of the bitstream may be defined by a standard so that the encoders and decoders may work in an interoperable manner. As described in the above Background section, the encoded bitstream includes further information in addition to the prediction residuals. In case of motion compensated prediction, a motion vector indication is also coded in the bitstream and parsed from the bitstream at the decoder. The motion vector indication may be given by means of a reference picture within which the motion vector is provided and by means of the motion vector coordinates. In this example, the motion vector coordinates are x and y coordinates within the reference picture and they define the point to which the motion vector points, assuming that the coordinate (0, 0) is the position within the reference frame corresponding to the position of the current block being processed in the current frame. However, motion vector indication does not have to signal directly the coordinates. In general, any identification of the motion vector is applicable, such as a pointer (index) to a list of candidate motion vectors or any other identifier which enables identifying the inter-prediction of the block.

In order to efficiently code the reference picture, H.265 codec (ITU-T, H265, Series H: Audiovisual and multimedia systems: High Efficient Video Coding) provides a list of reference pictures. Each entry of the list indicates a particular reference frame. In other words, each index (i.e. entry number) of the list is assigned a respective reference frame. The bitstream includes, for each inter frame, a respective list index and thus identifies a certain reference frame for reconstructing that inter frame. The list may be defined in the standard or signaled at the beginning of the video or a set of a number of frames. It is noted that in H.265 there are two lists of reference pictures defined, called L0 and L1. The reference picture is then signaled in the bitstream by indicating the list (L0 or L1) and indicating an index in that list associated with the desired reference picture. Providing two or more lists may have advantages for better compression. For instance, L0 may be used for both uni-directionally inter-predicted slices and bi-directionally inter-predicted slices while L1 may only be used for bi-directionally inter-predicted slices. However, in general the present disclosure is not limited to any content of the L0 and L1 lists.

The motion vector may be signaled directly by the coordinates of the block to which the motion vector points (in the reference picture). Alternatively, as specified in H.265, a list of candidate motion vectors may be constructed and an index associated by the list with the particular motion vector can be transmitted.

Motion vectors of the current block are often correlated with the motion vectors of neighboring blocks in the current picture or in the earlier coded pictures. This is because neighboring blocks are likely to correspond to the same moving object with similar motion and the motion of the object is not likely to change abruptly over time. Consequently, using one or more motion vectors of spatially or temporally neighboring blocks to define a predictor (referred to as the motion vector predictor, MVP) for the motion vector of the current block reduces the size of the signaled motion vector difference.

The MVP can be derived from already decoded motion vectors from spatially neighboring blocks or from temporally neighboring blocks in the co-located picture. In H.264/AVC, this is done by doing a component wise median of three spatially neighboring motion vectors. Using this approach, no signaling of the predictor is required. Temporal MVPs from a co-located picture are currently considered only in the so-called temporal direct mode of H.264/AVC. The H.264/AVC direct modes are also used to derive motion data other than the motion vectors. Hence, they relate more to the block merging concept in HEVC.

In HEVC, the approach of implicitly deriving the MVP was replaced by a technique known as motion vector competition, which explicitly signals which MVP from a list of MVPs is used for motion vector derivation. The variable coding quadtree block structure in HEVC can result in one block having several neighboring blocks with motion vectors as potential MVP candidates. Taking the left neighbor as an example, in the worst case a 64×64 luma prediction block could have 16 4×4 luma prediction blocks to the left when the specific 64×64 luma prediction block is not further split and the left block is split to the maximum depth.

Advanced Motion Vector Prediction (AMVP) was introduced to modify motion vector competition to account for such a flexible block structure. During the development of HEVC, the initial AMVP design was significantly simplified to provide a good trade-off between coding efficiency and an implementation friendly design. The initial design of AMVP included five MVPs from three different classes of predictors: three motion vectors from spatial neighbors, the median of the three spatial predictors and a scaled motion vector from a co-located, temporally neighboring block. Furthermore, the list of predictors was modified by reordering to place the most probable motion predictor in the first position and by removing redundant candidates to assure minimal signaling overhead. The final design of the AMVP candidate list construction includes the following two MVP candidates: a) up to two spatial candidate MVPs that are derived from five spatially neighboring blocks; b) one temporal candidate MVP derived from two temporally co-located blocks when both spatial candidate MVPs are not available or they are identical; and c) zero motion vectors when the spatial, the temporal or both candidates are not available. Details on motion vector determination can be found in the book by V. Sze et al (Ed.), High Efficiency Video Coding (HEVC): Algorithms and Architectures, Springer, 2014, in particular in Chapter 5, incorporated herein by reference.

As will be described in detail below, the motion vector derived at the encoder side and provided in the bitstream can be refined further. Motion vector estimation can thus be improved without further increase in signaling overhead. The motion vector refinement may be performed at the decoder side without assistance from the encoder. The decoder loop in the encoder may employ the same refinement to obtain corresponding reference pictures. The refinement can be performed by determining a template, determining a search space, and finding in the search space the position of a reference picture portion best matching the template. The best matching portion position determines the best motion vector which is then used to obtain the predictor of the current block, i.e. the current block being reconstructed.

In operation, the circuitry of an inter prediction unit 110, which may be implemented in the video encoder 100 of FIG. 1, performs motion estimation (see FIG. 3) in order to obtain a motion vector for inter prediction of a current block.

Figure 3:
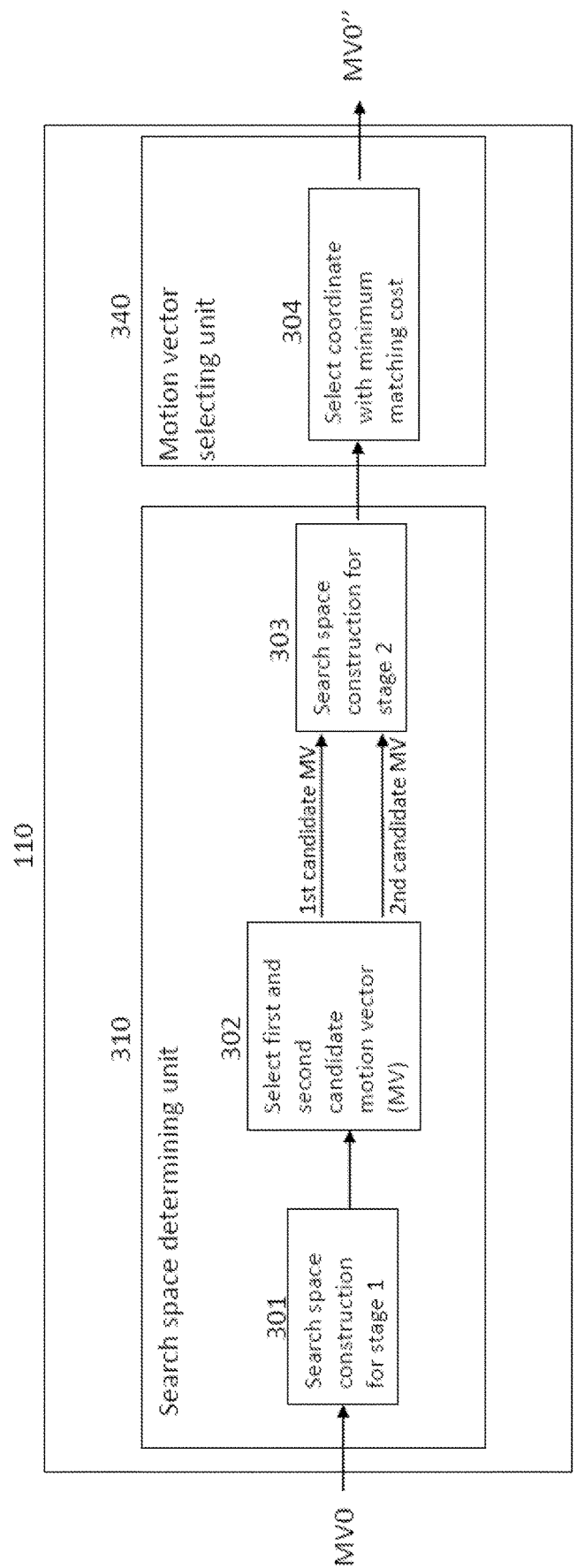
FIG. 3 is a block diagram showing an exemplary structure of an apparatus for determining a motion vector.

Similar prediction may also be performed by the inter prediction unit 210 of the video decoder 200 of FIG. 2, to which FIG. 3 and the accompanying description apply as well.

An initial motion vector MV0, which can be seen as a first estimate or approximation of the exact motion vector, is obtained by the inter prediction unit 110. For instance, MV0 may be selected from a list of candidate motion vectors. The list may include motion vectors of at least one block adjacent to the current block. Alternatively, MV0 may be obtained by block matching at the encoder side and signaled to the decoder side within the bitstream. Correspondingly, at the decoder side, the inter-prediction unit 210 can obtain the initial motion vector MV0 from the bitstream. For instance, an index to the list of candidates is extracted from the bitstream and the motion vector candidate identified by that index is provided to the inter-prediction unit as the initial motion vector MV0. Alternatively, coordinates of MV0 are directly extracted from the bitstream. However, the present disclosure is not limited to any particular way of obtaining the initial motion vector MV0. In general, the MV0 may be determined in any manner, for instance by template matching in the same way at the encoder and the decoder. Still alternatively, the motion vector may be predicted as a function of motion vectors of the neighboring blocks of the current block in the spatial or temporal domain.

The initial motion vector MV0 is an initial estimate of a final motion vector MV0" to be used in inter-prediction of a current block. It constitutes the input for a refinement process at the end of which the final motion vector MV0" is output. The refinement process comprises determining a search space and selecting the final motion vector from the search space.

Generally, the search space construction (e.g., performed by a search space determining unit 310 of the inter prediction unit 110 or 210) may comprise two stages, in each of which a part of the search space is constructed. A motion vector selecting unit 340 (also part of the inter-prediction unit 110 and/or 210) then selects the motion vector MV0" (corresponding to coordinates of a search space position) according to the matching cost. It is noted that for some candidate motion vectors of the search space, possibly for all candidate motion vectors of the respective partial search spaces determined in each of the stages, the costs may be calculated already as part of and during the search space construction.

The search space construction may include the first stage 301 of constructing the first (partial) search space. Out of the positions of the first search space determined in the first stage 301, at least two candidate positions are chosen 302 and are used to decide which candidate positions are to be checked in the second stage 303.

In other words, based on the initial motion vector MV0, a first search space including a plurality of candidate motion vectors is determined at 301. In the first search space, a first candidate motion vector and a second candidate motion vector are identified 302 according to a cost function. Based on the first and the second candidate motion vectors, a second search space is determined 303 including one or more candidate motion vectors. From among the candidate motion vectors of both the first search space and the second search space, the motion vector MV0" for the current block is selected by the motion vector selecting unit 340. In particular, the candidate motion vector is found that minimizes the cost function after the second search space has been evaluated, and this candidate motion vector is selected as the final motion vector MV0" to be applied in the inter-prediction. The first search space is equivalent to a first subset of positions in a reference picture, namely the subset of positions pointed to by the candidate motion vectors of the first search space. Similarly, the second search space is equivalent to a second subset of positions in a reference picture, namely the subset of positions pointed to by the candidate motion vectors of the second search space.

The motion vector refinement is performed in a search space which is a subset of positions in a reference picture and which comprises positions of the first and the second search space. The positions are locations to which the respective candidate motion vectors point, i.e. locations at which the match with a template is to be evaluated. The reference picture may be available in an integer or fractional resolution. Irrespectively of the reference picture resolution, the search space or its part may have an own resolution lower or higher than the reference picture. A higher resolution can be achieved by performing a fractional pixel interpolation to obtain fractional pixels.

For example, the initial motion vector MV0 may point to an integer pixel position, also referred to as a full-pixel position. Alternatively, MV0 may point to a fractional pixel position, e.g., a half-pixel position or a quarter-pixel position. Here as well as in the rest of the description, "half-pixel position" (and, respectively, "quarter-pixel position") refers to a point on a line between two adjacent full-pixel positions (i.e. neighboring pixels in full-pixel resolution), the fractional pixel position having a distance to the next full pixel position which is a half (or, respectively, a quarter) of the distance between the two neighboring full-pixel positions.

In different embodiments of the present disclosure, irrespective of whether MV0 points to a full-pixel or a half-pixel position, the first search space and the second search space may either have the same resolution or differ in resolution. For instance, the second search space may have a higher resolution than the first search space. Thus, the second search space can be seen as a refinement of the first search space.

Advantageously, the first search space has a full-pixel resolution. Then, if the resolution of the second search space is different from the resolution of the first search space, the resolution of the second search space may be a fractional pixel resolution such as half-pixel resolution. It is noted that the resolution of the search space may differ from the resolution of the reference picture. For instance, the initial motion vector may point to a half-pixel within the reference picture. Nevertheless, the first search space may include only positions that are in a distance of at least an integer pixel from each other. These positions may nevertheless be all located on the sub-pixel pixels of the reference picture.

Figure 4:
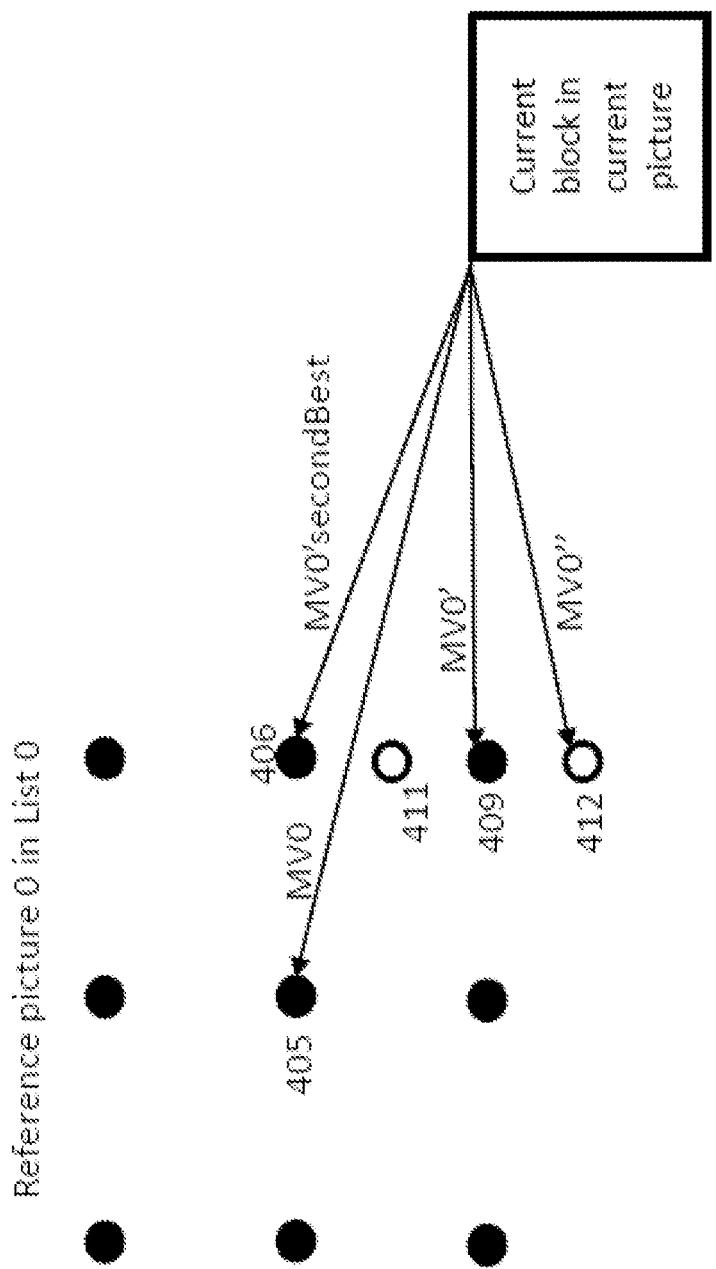
FIG. 4 is a schematic drawing of a current block and an exemplary search space configuration.

In FIG. 4 as well as in the remaining figures in which different configurations of the search space according to various embodiments of the present disclosure are shown, a full-pixel resolution is indicated by means of shaded (full) dots, whereas fractional pixel positions are illustrated as non-shaded (empty) dots. The pixels of the pictures in the video which is coded or decoded may be arranged in a square pattern. In general, however, they may have a generic rectangular pixel pattern which is not necessarily a square pattern. The present disclosure is generally not limited to any particular pixel pattern. The pixels may also be arranged in a non-rectangular pattern.

In one implementation, the candidate motion vectors for the current block point from the top left pixel of the current block in the current picture (assumed as having coordinate (0, 0)) to the respective top left pixels of candidate prediction blocks, i.e. candidate predictors, in the reference picture (as illustrated in FIG. 4). The top left pixels of the candidate prediction blocks thus represent the search space in the reference picture. In this implementation, the top left pixel of a block is taken as the position of the block. However, any other pixel of a block can be taken as the position of the block, wherein it is understood that the same position convention applies to all blocks. For example, a motion vector may be defined equivalently as running from a center pixel of the current block to the center pixel of a respective candidate block.

As an example (see FIG. 4 again), the first search space includes nine candidate motion vectors, namely the initial estimate MV0 of the motion vector as well as its four nearest neighboring positions and its four second nearest neighboring positions in full-pixel resolution. The constellation of the first search space in FIG. 4 is a "square" constellation, meaning that the distances between the pixels in vertical and horizontal dimensions are the same. As will be shown when describing the embodiments of the present disclosure, constellations with various sizes and shapes may be used for the first search space.

As explained above, the motion vector refinement scheme can be performed in the same way at the encoder and the decoder without additional control signaling. This can be achieved, for example, by providing a template at the encoder side as well as at the decoder side. The template may be determined, for example, from already encoded/decoded pixels (e.g. using one of the techniques described in the above mentioned document JVET-D0029). An example of such a template may be pixels of one or more blocks decoded before the current block and neighboring the current block. More particularly, the template for the refinement of a motion vector for a current block may be determined to be N pixels of the neighboring block at the left boundary and M pixels of the neighboring block at the top boundary, assuming that the decoding of blocks is performed from left to right and from top to bottom, as usual. M and N are integers larger than 1. However, the template may be determined differently and may also include, apart from the pixels of neighboring blocks directly adjacent to the boundary with the current block, other pixels of the neighboring blocks, and/or the entire boundary of one or more neighboring blocks.

In fact, the motion vector refinement is mostly relevant for the decoder. As no information is encoded in the bitstream concerning the refinement of the particular motion vector, the encoding side applies the refinement only in the decoding loop in order to produce reference images taking into account the refined motion vectors.

Similarity may be measured by a cost function which may, for example, be a sum of absolute differences between the template and the reference picture area that corresponds to the template in the location pointed to by the motion vector candidate. After calculating the sum of absolute differences (SAD) for all candidate motion vectors, the candidate with the smallest SAD is selected. However, it is noted that SAD is only an example and any other similarity metric such as sum of square differences or correlation or the like may be applied.

The first candidate motion vector and the second candidate motion vector respectively refer to a position of a predictor of the current block which is most similar (and second most similar, respectively) to a predetermined template. The template may be generated in a preceding operation, e.g., using one of the techniques described in JVET-D0029.

A method for motion vector determination by refinement is described in the following with respect to FIG. 18. The method starts in S1801. In S1802, an initial estimate MV0 of the motion vector is obtained, and a first search space is set based on the initial estimate of the motion vector. The first search space comprises candidate motion vectors pointing to positions surrounding the position associated with MV0. The costs associated with the candidate motion vectors of the first search space are calculated in S1803, and according to the calculated costs, a first candidate motion vector and a second candidate motion vector, P1 and P2, are selected. In accordance with P1 and P2, a second search space including one or more candidate motion vector(s) is set in operation S1804. The second search space can be fairly small (and thus be searched quickly) because it is set based on the two most promising points. In particular, by considering two (or more than two) positions, a trend direction in which the cost (i.e. the value of the cost function) diminishes (or probably diminishes) may be determined, and the second search space may be set in the trend direction and may have a smaller size as compared to, e.g., setting the second search space only on the basis of the initial motion vector or on the basis of a single best point. It is further noted that in general, the present disclosure is not limited to taking into account two best candidate motion vectors (respective positions to which they point). In general, the trend of the cost function may be determined even more precisely by taking more than two best positions into account. In such cases, the direction in which the cost function decreases is determined based on the considered two or more positions with the lowest costs among the positions of the first search space. The second search space is then set in a location in the direction of the trend. Accordingly, the number of positions of the search space and in particular of the second search space can be kept low, while still checking the most promising positions.

The costs associated with the candidate motion vector(s) of the second search space are calculated in S1805. From the candidate motion vectors of the first and the second search space, the best candidate motion vector, i.e. the candidate motion vector associated with the lowest cost, is selected (in S1806). After selecting the best candidate motion vector, the motion vector refinement terminates (in S1807).

Different embodiments of the present disclosure may differ, inter alia, in the way in which the first search space and the second search space are determined, as will be described in the following.

Another method of motion vector refinement is described as follows:

Motion vectors are usually at least partially determined at the encoder side and signaled to the decoder within the coded bitstream. However, the motion vectors may also be refined at the decoder (and also at the encoder) starting from initial motion vectors indicated in the bitstream. In such a case, for instance, a similarity between patches of already decoded pixels pointed to by the initial motion vectors may be used to improve the accuracy of the initial motion vectors. Such motion refinement provides an advantage of reducing the signaling overhead: the accuracy of the initial motion vectors is improved in the same way at both the encoder and the decoder and thus, no additional signaling for the refinement is needed.

It is noted that the initial motion vectors before refinement might not be the best motion vectors that result in the best prediction. Since the initial motion vectors are signaled in the bitstream, it might not be possible to represent the initial motion vectors with very high accuracy (which would increase the bitrate). Therefore the motion vector refinement process is utilized to improve the initial motion vectors. Initial motion vectors might, for instance, be the motion vectors that are used in the prediction of a neighboring block of a current block. In this case it is enough to signal an indication in the bitstream, indicating motion vectors of which neighboring block are used by the current block. Such a prediction mechanism is very efficient in reducing the number of bits to represent the initial motion vectors. However, the accuracy of the initial motion vectors might be low, since in general the motion vectors of two neighboring blocks are not expected to be identical.

In order to further improve the accuracy of motion vectors without further increase in signaling overhead, it may be beneficial to further refine the motion vectors derived at the encoder side and provided (signaled) in the bitstream. The motion vector refinement may be performed at the decoder without assistance from the encoder. The encoder in its decoder loop may employ the same refinement to obtain corresponding refined motion vectors as would be available at the decoder. The refinement for a current block that is being reconstructed in a current picture is performed by determining a template of reconstructed samples, determining a search space around the initial motion vector for the current block and finding in the search space a reference picture portion best matching the template. The best matching portion determines the refined motion vectors for the current block which is then used to obtain the inter-predicted samples for the current block, i.e. the current block being reconstructed.

Motion vector refinement is a part of the Inter Prediction Unit 210 in FIGS. 2 and 310 in FIG. 3.

The motion vector refinement may be performed according to the following operations:

Typically, an initial motion vector can be determined based on an indication in the bitstream. For example, an index might be signaled in the bitstream which indicates a position in a list of candidate motion vectors. In another example, a motion vector predictor index and motion vector difference value can be signaled in the bitstream. Motion vectors that are determined based on an indication in the bitstream are defined to be initial motion vectors. In the case of bi-prediction, where the inter prediction for the current block is obtained as a weighted combination of the predicted block of samples which are determined according to two motion vectors, let the initial motion vector in a first reference picture in list L0 be denoted as MV0 and the initial motion vector in a second reference picture in list L1 be denoted as MV1.

Using the initial motion vectors, refinement candidate motion vector (MV) pairs are determined. At least, two refinement candidate pairs need to be determined. Typically, the refinement candidate motion vector pairs are determined based on the initial motion vector pair (MV0, MV1). Furthermore, the candidate MV pairs are determined by adding small motion vector differences to MV0 and MV1. For example, the candidate MV pairs might include the following:

(MV0, MV1)
(MV0+(0,1), MV1+(0,−1))
(MV0+(1,0), MV1+(−1,0))
(MV0+(0,−1), MV1+(0,1))
(MV0+(−1,0), MV1+(1,0))
. . .

Where (1,−1) denotes a vector that has a displacement of 1 in the horizontal (or x) direction and a displacement of −1 in the vertical (or y) direction.

It is noted that the above list of candidate MV pairs are just examples for explanation and the disclosure is not limited to a specific list of candidates.

Refinement candidate motion vector (MV) pairs form the search space of the motion vector refinement process.

In a bi-prediction of the current block, two prediction blocks obtained using the respective first motion vector of list L0 and the second motion vector of list L1, are combined to a single prediction signal, which can provide a better adaptation to the original signal than uni-prediction, resulting in less residual information and possibly a more efficient compression.

In motion vector refinement, the two prediction blocks obtained using the respective first motion vector and the second motion vector of a candidate MV pair are compared based on a similarity metric for each of the refinement candidate MV pairs. A candidate MV pair resulting in the highest similarity is usually selected as the refined motion vectors. The refined motion vector in a first reference picture in list L0 and the refined motion vector in a second reference picture in list L1 may be denoted as MV0' and MV1', respectively. In other words, predictions are obtained corresponding to a list L0 motion vector and a list L1 motion vector of the candidate motion vector pair, which are then compared based on a similarity metric. The candidate motion vector pair that has the highest associated similarity is selected as the refined MV pair.

Typically, the output of the refinement process are refined MVs. The refined MVs might be same as the initial MVs or might be different from the initial MVs, depending on which candidate MV pair achieves the highest similarity, the candidate MV pair formed by initial MVs are also among the MV pair candidates. In other words, if the highest candidate MV pair that achieves the highest similarity is formed by the initial MVs, the refined MVs and initial MVs are equal to each other.

Instead of selecting the position that maximizes a similarity metric, another method is to select a position that minimizes a dis-similarity metric. The dis-similarity comparison measure might be SAD (Sum of absolute differences), MRSAD (mean removed sum of absolute differences), SSE (Sum of Squared Error) etc. The SAD between two prediction blocks may be obtained using a candidate MV pair (CMV0, CMV1), the SAD can be computed as follows:

$$SAD(CMV0, CMV1) = \sum_{x=0}^{nCbW-1} \sum_{y=0}^{nCbH-1} abs(predSamples\ L0[x][y] - predSamples\ L1[x][y])$$

where nCbH and nCbW are the height and the width of the prediction blocks, the function abs(a) specifies the absolute value of the argument a, predSamplesL0 and predSamplesL1 are prediction block samples obtained according to the candidate MV pair which is denoted by (CMV0, CMV1).

Alternatively, the dis-similarity comparison measure can be obtained by evaluating only a subset of the samples in a prediction block, in order to reduce the number of computations. An example is given below, where rows of samples are alternatively included in the SAD calculation (every second row is evaluated).

$$SAD(CMV0, CMV1) = \sum_{x=0}^{nCbW-1} \sum_{y=0}^{nCbH/2-1} \text{abs}(predSamples\ L0[x][2*y] -$$
$$predSamples\ L1[x][2*y])$$

One example of motion vector refinement is explained in the document JVET-M1001-v3, "Versatile Video Coding (Draft 4)" of JVET (of ITU-T SG 16 WP 3 and ISO/IEC JTC 1/SC 29/WG 11) which is publicly available under http://phenix.it-sudparis.eu/jyeti". The section "8.4.3Decoder side motion vector refinement process" in the document exemplifies the motion vector refinement.

In order to reduce internal memory requirements for refinement, in some embodiments, the motion vector refinement process may be performed independently on blocks of luma samples obtained by partitioning a coded block of samples that exceeds a certain pre-determined width or pre-determined height in luma samples into sub-blocks of samples that are smaller than or equal to the pre-determined width and pre-determined height in luma. The refined MV pair for each sub-block within a partitioned coded block can be different. Inter prediction for both luma and chroma are then performed for each sub-block using the refined MV pair of that sub-block.

Each MV of the initial MV pair can have a fractional pixel precision. In other words, the MV indicates a displacement between a current block of samples and a re-sampled reference region and this displacement can point to a fractional position in the horizontal and vertical directions from the integer grid of reconstructed reference samples. Typically, a 2-dimensional interpolation of the reconstructed reference integer sample grid values is performed to obtain the sample values at the fractional sample offset location. The process of obtaining predicted samples from the reconstructed reference pictures using a candidate MV pair can be through one of the following methods:

Round the fractional part of the initial MV pair to the nearest integer location and obtain the integer grid values of the reconstructed reference pictures.

Perform a 2-tap (e.g. bilinear) separable bilinear interpolation to obtain the predicted sample values at the fractional pixel accuracy indicated by the initial MV pair.

Perform a higher tap (e.g. 8-tap or 6-tap) separable interpolation to obtain the predicted sample values at the fractional pixel accuracy indicated by the initial MV pair.

While the candidate MV pairs can have arbitrary sub-pixel offsets with respect to the initial MV pair, in some embodiments, for the sake of simplicity of search, the candidate MV pairs are chosen with integer pixel distance with respect to the initial MV pair. In such cases, the predicted samples across all the candidate MV pairs can be obtained by performing a prediction for a block of samples around the initial MV pair to cover all the refinement positions around the initial MV pair.

In some embodiments, once the dis-similarity cost value at all the candidate MV pairs at an integer distance from the initial MV pair have been evaluated, additional candidate MV pairs at sub-pixel distance offsets from the best cost value position are added. Predicted samples are obtained for each of these positions using one of the methods described earlier and the dis-similarity costs are evaluated and compared to obtain the lowest dis-similarity position.

In certain other embodiments, to avoid this computationally expensive prediction process for each sub-pixel distance position around the best cost integer-distance position, the integer-distance cost values evaluated are remembered and a parametric error surface is fitted in the vicinity of the best integer-distance position. The minimum of this error surface is then analytically computed and used as the position with the minimum dis-similarity. In such cases, the dis-similarity cost value is said to be derived from the computed integer-distance cost values.

The similarity or dis-similarity is calculated between patches of samples that are pointed to by candidate motion vector pairs. The patches are sometimes called template.

The application of motion vector refinement for a given coded block of samples can be conditioned on certain coding properties of the coded block of samples. Some examples of such coding properties can be:

The distances in number of pictures (when sampled at a uniform frame-rate) from the current picture to the two reference pictures used for bi-prediction of the coded block of samples are equal and fall on opposite sides of the current picture.

The initial dis-similarity between the two predicted blocks obtained using the initial MV pair is less than a pre-determined per-sample threshold.

First Exemplary Embodiment

According to a first exemplary embodiment (see FIG. 4), a cost function is evaluated for each of the candidate motion vectors of the first search space. In other words, for each of these candidate motion vectors, a respective cost, which is the value of the cost function, is calculated or estimated or otherwise determined. According to this evaluation, the candidate with the minimum cost and the candidate with the second lowest cost are selected. In the example of FIG. 4, an initial motion vector MV0 points to a position 405. A position 409 in the first search space has the lowest cost and is therefore selected as the first candidate motion vector MV0'. The right neighbor 406 of MV0 has the second lowest cost and is therefore selected as the second candidate motion vector MV0'secondBest. MV0' and MV0'secondBest are used to construct the second search space. In the example, the second search space comprises two additional candidate motion vectors, which point to half-pixel positions 411 and 412 (empty circles in the figure) located on a line connecting positions 409 and 406 (i.e. MV0' and MV0'secondBest). In this example, the half-pixel positions 411 and 412 are half-pixel positions above and below MV0', respectively. From the candidates of the first search space and the candidates of the second search space, the candidate with the minimum cost is selected as the final motion vector MV0", in this example the position 412.

The example of FIG. 4 illustrates motion vector refinement for one current block and one reference picture, namely the reference picture which is assigned index 0 in a reference picture list L0. The drawing of the current block is merely schematic and illustrates that a position of a search space point corresponds to a position of the search template which is given by the template's top left corner. The present disclosure is applicable with any size and form of the template. The template is advantageously a block of a size of the current block and the search of the two best candidate motion vectors is performed by template (block) matching in the first search space and the second search space. Since the current block is in general not available at the decoder, the template is constructed out of already decoded image portions. For instance, in case of bi-prediction, there are two initial motion vectors MV0 and MV1 associated with the respective two reference pictures RefPict0 and RefPict1. A template block for the motion vector refinement may then be constructed by weighted averaging of two blocks respectively pointed to by MV0 in Refpict0 and MV1 in RefPict1. Other template constructions are possible based on the already decoded pixels from the current picture or the respective reference pictures or closest pictures already decoded.

In accordance with a direction of a line connecting the tip (i.e. endpoint) of the first candidate motion vector and the tip of the second candidate motion vector MV0'secondBest, the size (i.e. the number of candidates) and/or the position (location) of the second search space (i.e. the position(s) pointed to by the candidate motion vector(s) of the second search space) are determined. In particular, the first candidate motion vector and the direction (line) given by connecting the tips of the first and second candidate motion vectors are used to decide on the number and/or coordinates of the candidates used in the second operation. The size of the second search space may be determined in accordance with the position to which the first candidate motion vector MV0' points. However, it is noted that the embodiments of the present disclosure are not limited to determining both the size and the position of the second search space based on the two best points. For instance, the size (in terms of the number of positions) of the second search space may be fixed and only the location of the second search space may be determined based on the two best positions.

Search space configurations according to the first embodiment of the present disclosure are exemplarily illustrated in FIGS. 5 to 8, 10, and 11. In these examples, the size of the second search space is always 2, but its location is given by the two best points of the first search space. As can be seen in the figures, the first search space having a first (for example integer) pixel resolution has the "square" constellation already shown in FIG. 4. From this first search space, with nine points (eight points surrounding the initial vector point MV0), a first candidate motion vector MV0' and a second candidate motion vector MV0'secondBest are identified according to the cost function.

Advantageously, according to the first embodiment, the first search space, which includes a plurality of candidate motion vectors, has integer pixel resolution. Accordingly, the first candidate motion vector MV0' which points to a position where the cost function is minimized after the first stage, and the second candidate motion vector MV0'secondBest which has the second lowest value of the cost function, are first determined using integer pixel search resolution.

Furthermore, the second search space may have a fractional pixel resolution with respect to the resolution of the first search space, and may include one or more candidate motion vectors which point to positions located in the direction given by the first and second candidate motion vectors included in the first search space. Accordingly, in the second stage (more precisely, in "stage 2" 303 from FIG. 3), one or more, for instance two, half-pixel positions of the second search space (i.e. the new search window) are considered. This means that, since with MV0' the best candidate of the first search space is known, the cost of MV0' only needs to be further compared with costs of the additional points of the second search space until a candidate motion vector is found that has a lower cost than MV0' to finally perform the motion vector selection. In this case, the second search operation involving the second search space has a finer precision than the first search operation. In other words, it may be advantageous if the second search space has a higher resolution (i.e. lower distance between the search space positions) than the first search space. In this way, the search space is refined with each stage of its construction and may include more than two such stages. For example, based on two best points of the joint first and second search space, a third search space with a resolution higher than the first and second search spaces may be constructed.

In the example of FIGS. 4 to 8, the one or more half-pixel positions of the second search space are selected according to the direction of a line connecting MV0' and MV0'secondBest corresponding to a difference vector MV0'diff=(MV0'-MV0'secondBest). Thus, the second search space is determined in accordance with an angle between MV0'diff and a picture boundary (or a horizontal row of pixels in the reference picture). At the end of the second search operation, the final motion vector MV0" is determined in stage 304 of FIG. 3.

Further, at least one of the candidate motion vectors of the second search space advantageously points to a position between positions pointed to by the first and the second candidate motion vectors included in the first search space. It is noted that the second search space may include a single candidate motion vector which is the point between the first and the second candidate motion vectors.

Exemplary search space constellations according to the first embodiment of the present disclosure will be described in the following with respect to FIGS. 5 to 8, 10, and 11.

In FIGS. 5 to 8, MV0' points to one of the nearest or second nearest neighboring positions of the initial motion vector MV0 (i.e. of the position in the center of the first search space), i.e. to one of the positions immediately surrounding the MV0 position. The second search space is determined to comprise two candidate motion vectors which point to positions on two sides of MV0', which both point approximately to positions on a line connecting MV0' and MV0'secondBest. In other words, the second search space includes a first position between MV0' and MV0'secondBest and a second position in the direction connecting MV0' and MV0'secondBest and located on the other side of MV0' than the first position.

Here as well as in the rest of the present application, the "nearest" neighbor or neighboring or adjacent position refers to the position adjacent to the given position in the resolution of the considered (partial) search space. For instance, even if the reference picture has a fractional ¼ pixel resolution, if the first search space has an integer resolution, adjacent positions also have the integer pixel distance from each other in the first search space. This applies although the first search space positions may be located on fractional pixel positions of the reference picture.

Furthermore, the "second nearest position" refers to a position adjacent to two nearest neighbors (diagonal neighbors in rectangularly arranged search spaces). However, in a general case which is not shown in any of the figures, the distance to the adjacent position in one direction (for example the vertical direction) may differ from the distance in the other (for example horizontal) direction. In this case, the term "nearest neighbor" as used in the present disclosure, applies to the adjacent position in both directions, regardless of a possible difference in the distance.

In FIGS. 5 and 6, MV0' and MV0'secondBest are nearest neighbors with respect to each other in the resolution of the first search space (i.e. full pixel resolution). In the figures, the line connecting MV0' and MV0'secondBest is a vertical line. The search space constellation shown in FIG. 5 is identical to the search space constellation shown in FIG. 4. The line connecting the first and second candidate motion vectors corresponds to a horizontal line if MV0'secondBest is situated to the left or to the right of MV0' rather than being situated above or below MV0'. Although not shown in the figures, the first embodiment also applies to case in which the first candidate motion vector and the second candidate motion vector are connected by a horizontal line.

In the example shown in FIG. 7, the second candidate motion vector MV0'secondBest points to a second nearest neighbor of the first candidate motion vector MV0'. In such a case, the line connecting the first and second candidate vectors is a diagonal line.

It is usually expected that the similarity between a predictor of a current block and a template block increases monotonously in one direction. Accordingly, as in FIGS. 5 to 8, in the resolution of the first search space, the candidate vectors MV0' and MV0'secondBest should be nearest or second nearest neighbors. However, it may occur, that there is a third candidate motion vector of the search space between MV0' and MV0'secondBest for which the value of the cost function is higher than for each of the candidate motion vectors MV0' and MV0'secondBest, as shown in FIG. 8.

For example, such a situation may occur due to noise in the video which is encoded/decoded. In such a situation, two fractional pixel positions on the line connecting MV0' and MV0'secondBest may be chosen to form the second search space which are closer to MV0' than to MV0'secondBest, but still located in the direction given by the two best points of the first search space. However, the present disclosure is not limited to this method. For instance, in order to maintain low complexity, if the cost function trend is not monotone based on the two or more positions with the lowest costs, a default second search space may be set assuming, for instance, a horizontal direction. The horizontal direction may be considered as a more likely direction in natural video sequences, due to the panning of the camera, as well as movement of typical objects in natural videos. In other words, if there is no clear trend of the cost function based on the first and the second best motion vector candidates of the first search space, preferably some points around the first best candidate motion vector are set as the second search space. In order to reduce the size of the second search space, a default direction may be assumed and the corresponding default second search space may be set.

Figure 9:
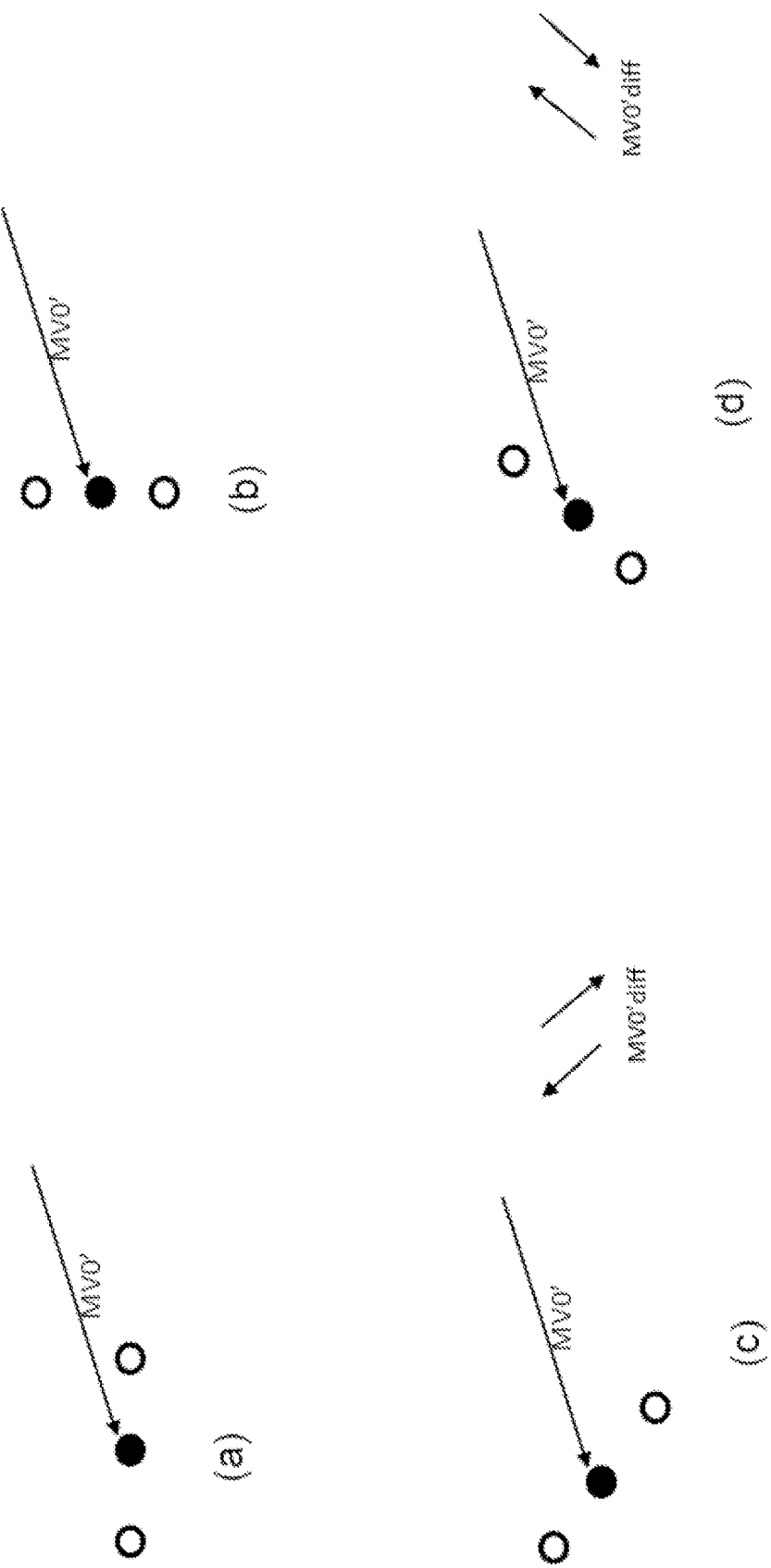
FIG. 9 is a schematic drawing illustrating the determination of a second search space according to an embodiment of the present application.

The method for the determination of the second search space in the second stage according to the first embodiment is illustrated in FIG. 9. In particular, the pixel positions to which the candidate motion vectors of the second search space point are determined according to the components of the difference vector MV0'diff=(MV0'−MV0'secondBest).

If MV0' diff only has a horizontal (i.e. non-zero) component, the second search space is determined to comprise the two positions to the left and to the right of MV0', each having a distance to MV0' which corresponds to the resolution of the second search space (e.g. half-pixel resolution), as shown in FIG. 9(a). Further, if MV0'diff only has a vertical component, the second search space is determined to comprise the two positions above and below MV0', each having a distance to MV0' which corresponds to the resolution of the second search space (see FIG. 9(b)).

If MV0'diff has both a horizontal and a vertical component (with a non-zero value) as shown in sub-figures (c) and (d), the second search space is selected to include second nearest (diagonal) neighbor positions with respect to the position associated with MV0' in the resolution of the second search space. If the horizontal and vertical components are both positive or both negative, second nearest neighbor positions on the top left and on the bottom right with respect to MV0' are selected, as shown in FIG. 9(c). If one component is positive and the other component is negative, second nearest neighbor positions on the bottom left and on the top right with respect to MV0' are selected (FIG. 9(d)). Else, if MV0'diff cannot be determined (e.g. due to characteristics of the cost function such as all candidates of the first search space having the same costs), MV0'diff may be set as (0,0), and an arbitrary choice, for instance among the alternatives shown in FIGS. 9 (a)-(d), may be made for a default second search space. However, in this case, the configuration of search points in FIG. 9(a) is preferable (over FIGS. 9(b), 9(c) and 9(d)) due to the statistical properties of the video sequences in general (a horizontal object or camera movement is more likely than a vertical movement, as usually the area of interest lies in a horizontal direction).

It should be noted that in FIG. 9, as well as in the rest of the application where coordinates are considered, the positive direction of the horizontal axis ("x-axis") points to the right (as in an ordinary Cartesian coordinate system), whereas the positive direction ("y-axis") of the vertical axis points to the bottom (contrary to the Cartesian convention but typically used in image processing).

In all of the search space constellations shown in FIGS. 5 to 8, the first candidate motion vector MV0' points to pixel positions that are at the edge of the first search space. In particular, one candidate motion vector of the second search space points to a position between two candidate motion vectors of the first search space. The other candidate motion vector of the second search space points to a position outside the first search space, i.e. a position which is not surrounded by candidate motion vectors of the first search space.

However, as mentioned above, not only the position(s) of the candidate motion vector(s) of the second search space, but also the size (i.e. the number of candidate motion vector(s)) may be determined in accordance with a direction of a line connecting the candidate motion vectors MV0' and MV0'secondBest. More specifically, if the first candidate motion vector MV0' points to a position in the center of the first search space, one candidate vector may be sufficient for the second search space. In particular, the single candidate motion vector of the second search space then points to a position of the resolution of the second search space between two candidate motion vectors of the first search space. However, in contrast to the search space constellations shown in FIGS. 5 to 8, the second candidate motion vector outside the first search space is omitted. The process illustrated in FIG. 9 is modified accordingly to determine only one candidate motion vector of the second search space, i.e. the search window of the second search operation.

Examples of the second search space comprising only one motion vector candidate are shown in FIGS. 10 and 11. In FIG. 10, MV0' and MV0'secondBest are nearest neighbors (adjacent horizontally), and in FIG. 11, MV0' and MV0'secondBest are second nearest neighbors (adjacent diagonally). As shown in both figures, MV0' points to a position within the first search space. In other words, there are candidate motion vectors of the first search space pointing to all pixel positions adjacent to MV0'. One of these candidate motion vectors pointing to an adjacent position is MV0'secondBest.

In other words, the second search space comprises only one candidate motion vector pointing at a fractional pixel position between the first and the second candidate motion vectors if a second position, indicated by 3rd candidate in FIGS. 10 and 11, adjacent to the first candidate motion vector MV0' in the first search space and located in the direction given by connecting MV0' and MV0'secondBest belongs to the first search space. In such a situation, since the cost has already been calculated for the second position and was found to be higher than for MV0' as well as MV0'secondBest, the probability that a low-cost candidate can be found in this direction is rather low. In general, the number of positions in a search space may also depend on the likelihood that a candidate motion vector better (in terms of cost) than MV0' could be found. The likelihood may be estimated by interpolating and/or extrapolating the cost function calculated for the positions of the first search space.

It is noted that in the above examples, the first search space has been illustrated having 9 adjacent positions arranged in a square grid. However, the present disclosure is not limited to a particular size of the search space or to a particular arrangement of the pixels. Similarly, the first embodiment may be applied to first and second search spaces having the same or different resolutions (the latter shown in FIGS. 5 to 8). The second search space may also have more than two positions.

Figure 18:
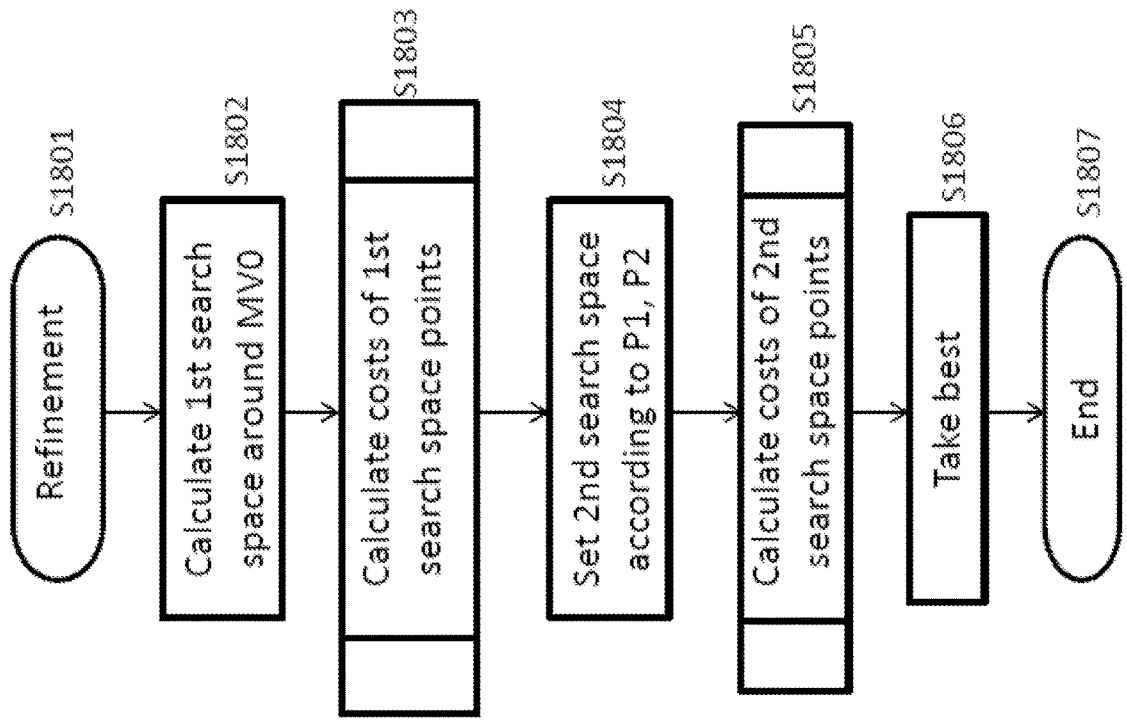
FIG. 18 is a flow chart showing a method for motion vector refinement according to an embodiment of the present application.
Figure 19:
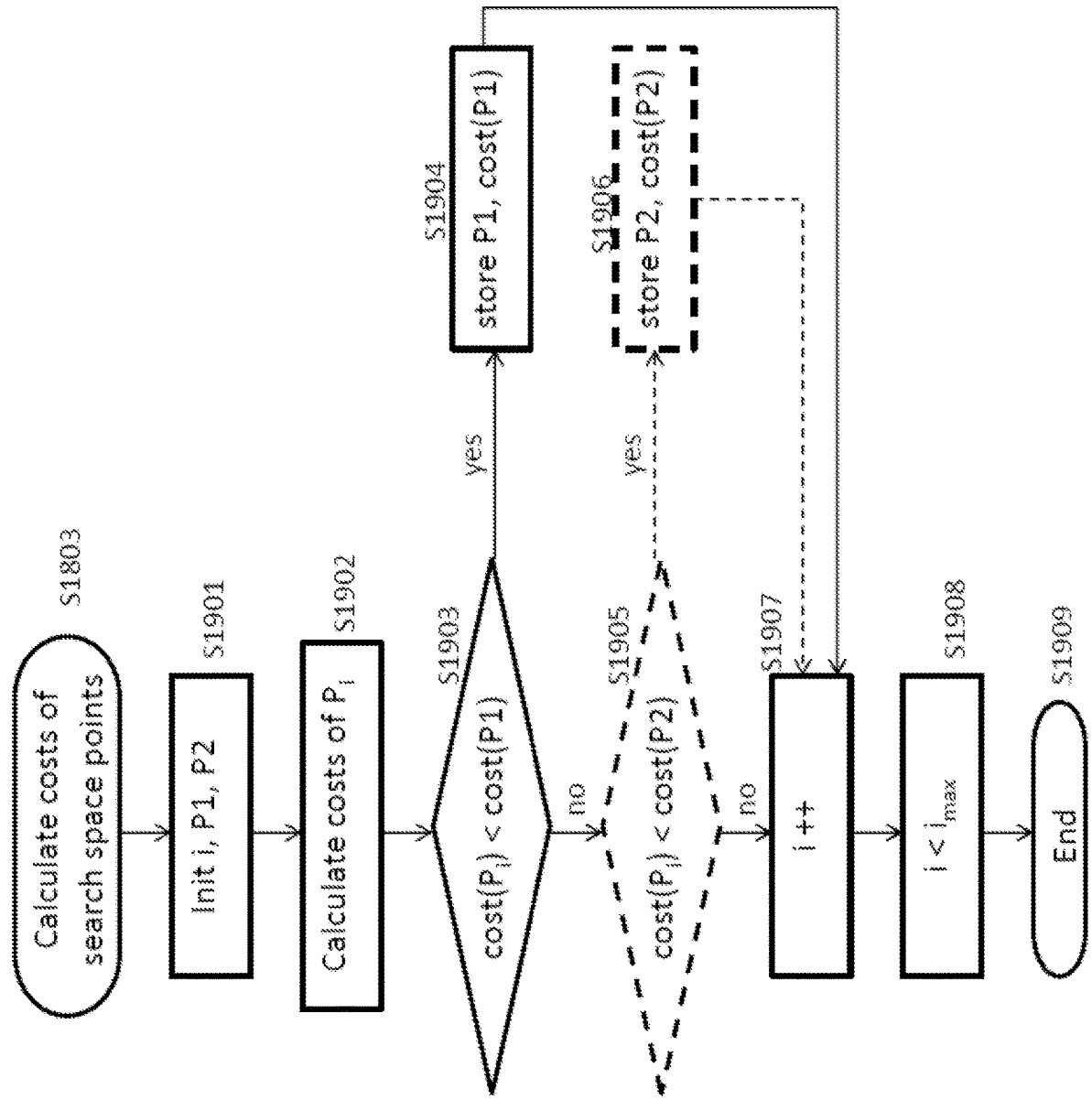
FIG. 19 is a flow chart showing a method for calculating costs for search space positions according to an embodiment of the present application.

According to the first exemplary embodiment, the suboperation S1803 of calculating the costs for the candidate motion vectors of the first search space in the refinement method of FIG. 18 is shown in FIG. 19. The variables i, P1, and P2 are initialized S1901, where i is an index variable subsequently denoting each of the respective candidates of the search space (e.g. the first search space). Variables P1 and P2 denote the respective motion vector candidates with the lowest and second lowest cost (i.e. the position in the search space and the cost value associated with the position). At the beginning, P1 and P2 may be initialized to a value not associated with any position, and the respective costs associated with P1 and P2 may be initialized to a value higher than any value possibly obtained in a cost calculation, i.e. a maximum cost representable with the variable. In a loop iterating over i, the cost of the i-th candidate motion vector is calculated S1902. The cost of the i-th candidate motion vector is compared S1903 with the cost of the currently stored motion vector P1 with the lowest cost. If the cost of the i-th candidate motion vector is lower than the cost of the stored P1, then P1 is set to the i-th candidate motion vector and stored S1904. If the cost of the i-th candidate is not lower than the cost of the P1, then the cost of the i-th candidate motion vector is compared S1905 with the cost of P2. If the cost of the i-th candidate motion vector is lower than the cost of P2, then P2 is set to the i-th candidate motion vector and stored S1906. After the two operations of comparing S1903, S1905 and possibly one of the operations of storing S1904, S1906, i is incremented S1907. If i has not yet reached a maximum value i max representing the number of motion vector candidates in the first search space S1908, the method returns to the cost calculation operation S1902. If i has reached i max S1908, the cost calculation terminates S1909, and the refinement of FIG. 18 continues.

The suboperation S1805 of calculating the costs for the candidate motion vectors of the second search space may be performed similarly to the operations described in the above description of FIG. 19. However, the operations of comparing S1905 the cost of the i-th candidate motion vector with the cost of P2 and storing S1906 the second candidate motion vector P2 may be omitted. This is because in the second search space search, the result is the best motion vector over the first and the second search space. The second best motion vector has no further use, if the second search space is not further extended.

Second Exemplary Embodiment

According to a second exemplary embodiment, the first candidate motion vector and the second candidate motion vector used in the determination of the second search space are the candidate motion vectors included in the first search space which are associated respectively with the lowest and second lowest matching cost (as in the first exemplary embodiment).

Figure 13:
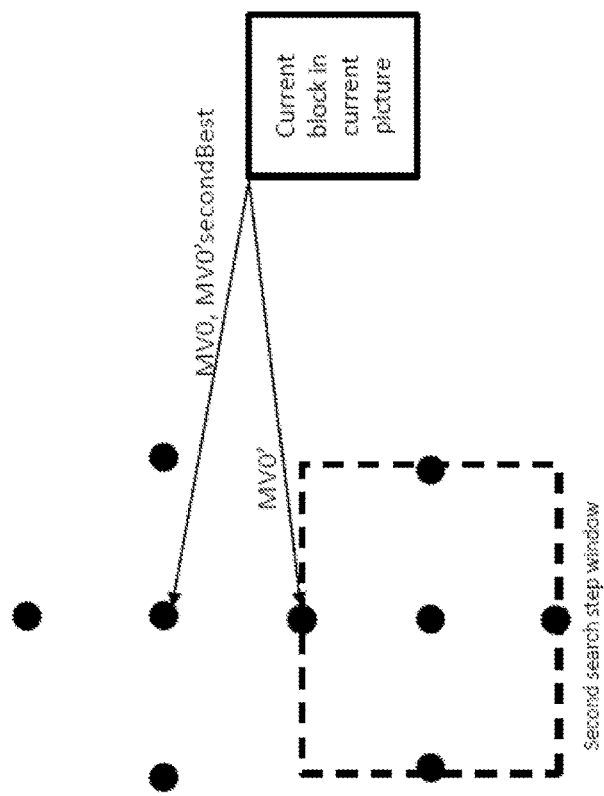
FIGS. 12-13 are schematic drawings of current blocks and an exemplary search space configuration according to an embodiment of the present application.
Figure 12:
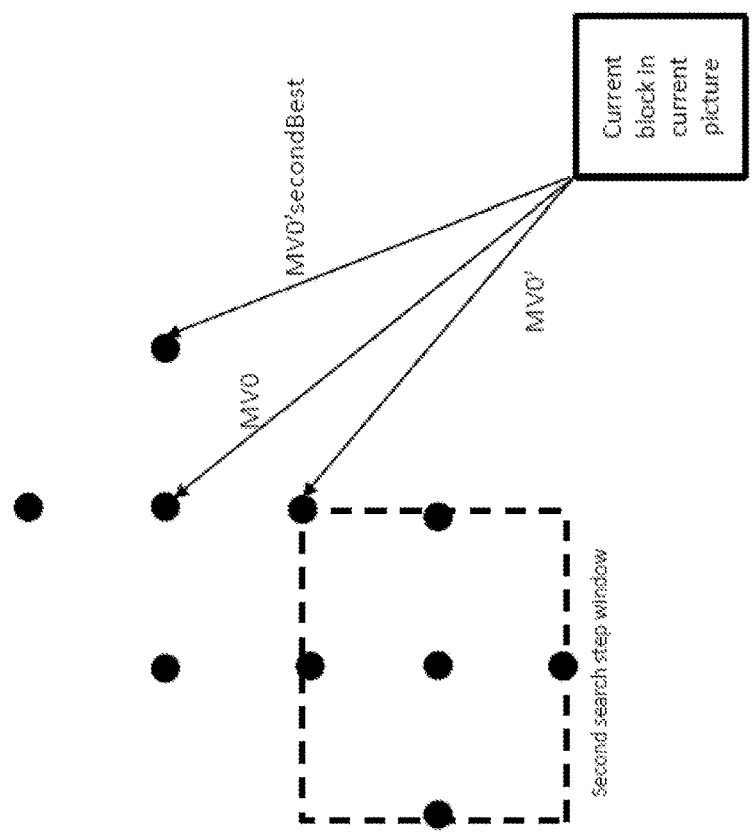

Further, according to the second exemplary embodiment, the search space determining unit 310 of FIG. 3, in operation, determines the location of the second search space which is a region. Here, the term "region" refers to a space including at least two positions to which respective at least two candidate motion vectors point. In particular, said at least two positions are adjacent in the pixel resolution of the second search space. The second search space may have the same resolution as the first search space as shown in FIGS. 12 and 13. However, the search spaces may also differ in resolution.

Advantageously, the search space, which is determined in the first stage 301 of the search space construction of FIG. 3, includes the initial estimate of the motion vector MV0 and candidate motion vectors pointing to the positions adjacent, i.e. the nearest neighbors of the initial estimate of the motion vector in a pixel resolution of the first search space, to the position pointed to by MV0. In other words, the first search space has a "cross" geometry, in contrast to the first embodiment in which a first search space having a "square" geometry (shape) is constructed in the first stage 301 of the first stage construction. However, it is noted that the first search space may have any shape, as long as the same search space is utilized both in the encoder and decoder. It is advantageous for the simplicity of the implementation, if the search space has a certain predefined form such as the cross or square geometry or any other arrangement, and the location of the initial vector MV0 merely determines the position of such first search space. On the other hand, embodiments of the present disclosure may also work with a first search space of which the size (in terms of positions pointed to by candidate MVs) and/or shape differ.

The first candidate motion vector MV0' with the lowest value of the cost function and the second candidate MV0'secondBest with the second lowest value are calculated and selected at 302.

Based on the coordinates defining the position to which MV0' points and on the direction given by a line connecting the positions to which the first and the second candidate motion vectors MV0' and MV0'secondBest point, a region is selected to perform the construction of the second search space in the second stage 303 of FIG. 3.

More specifically, one candidate motion vector included in the second search space points to the position which is not included in the first search space but closest to the position of MV0' in the resolution of the second search space on a line connecting the positions of the first and second candidate motion vectors. One or more additional candidate motion vectors may be included in the second search space which point to positions adjacent to this position in the pixel resolution of the second search space and which are not included in the first search space.

Examples of search space configurations according to this second embodiment are shown in FIGS. 12 and 13. As an example, the pixel resolution of the second search space is the same as the pixel resolution of the first search space. As can be seen in the figures, the position to which the initial candidate motion vector points is surrounded by four pixel positions adjacent to MV0 in the respective pixel resolution, i.e. four nearest neighbors. MV0 and the candidate motion vectors pointing to these four positions adjacent to MV0 are included in the first search space. The first and the second candidate motion vectors MV0' and MV0'secondBest with the lowest and second lowest cost of the first search space according to a cost function are determined. The position pointed to by MV0' and a direction of the line connecting MV0' and MV0'secondBest given by the difference vector MV0'diff are used to determine the second search space in the second stage 303 of FIG. 3. Here, the definition of MV0'diff is the same as in the description of the first exemplary embodiment. In both FIGS. 12 and 13, the second search space includes a candidate motion vector pointing approximately to a position on the line connecting MV0' and MV0'secondBest which is given by (MV0'+MV0'diff) and the adjacent positions (i.e. nearest neighbors) to said position on said line which are not pointed to by candidate motion vectors of the first search space.

In FIG. 12, MV0' and MV0'secondBest are not adjacent in the resolution of the first search space; they are second nearest neighbors. The second search space includes vectors, namely the vector pointing to said position on said line and the four nearest neighbors of said position.

In FIG. 13, MV0' and MV0'secondBest point to adjacent positions in the resolution of the first search space. In this case, the position in the second search space on the line connecting MV0' and MV0'secondBest which is defined by (MV0'+MV0'diff) is a nearest neighbor of MV0'. The second search space then comprises the vector pointing to the position corresponding to (MV0'+MV0'diff) and the candidate motion vectors pointing to the three nearest neighbors of (MV0'+MV0'diff) which are not equal to MV0'. Accordingly, the second search space comprises four candidate motion vectors.

However, if MV0' and MV0'secondBest are neither nearest nor second nearest neighbors in the pixel resolution of the first search space, i.e. if there is one pixel position in the first search space between the pixel positions to which MV0' and MV0'secondBest respectively point, the same second search space/window may be determined as in the case shown in FIG. 13.

If the search coordinates indicated by the second search space are already included in the first search space, then the second search operation is not performed (terminated). This may be in particular the case if the matching template and/or cost function that is used in the first and second stages are identical. Yet as another alternative, if the matching template and/or the cost function are different for the first and the second search operations, the second search operation can be performed. It is noted that the present disclosure provides a reduction of the size of the search space and in particular a reduction by setting the second search space based on the characteristics of the cost function development. Any template is applicable with the embodiments of the present disclosure, which may be the same or different for the respective partial search spaces such as the first search space and the second search space or further search spaces if the search space determination is cascaded in more than two stages.

According to the second exemplary embodiment, the suboperations for calculating S1803 the costs of the candidate motion vectors of the first search space (and of the second search space S1805) in the motion vector refinement shown in FIG. 18 may be carried out similarly to the calculation according to the first embodiment described above with respect to FIG. 19.

Third Exemplary Embodiment

In the embodiments described so far, the search space determining unit 310 shown in FIG. 3 identifies a first and a second candidate motion vector from the first search space which are the candidate motion vectors of the first search space for which the matching costs are the lowest and the second lowest.

According to a third exemplary embodiment of the present disclosure, for the selection 302 of a first and a second candidate motion vector, the template matching costs are computed for four candidate motion vectors pointing to positions around the starting position to which the initial estimate MV0 of the motion vector points. In particular, in order to determine the second search space, the matching costs of the pixel positions are evaluated which are adjacent in the pixel resolution of the first search space to the position pointed to by the estimate MV0 of the motion vector. A pixel position is determined to be pointed to by a first candidate motion vector of the second search space which is adjacent in the pixel resolution of the first search space to the positions pointed to by said first and second candidate motion vectors and different from the position pointed to by the estimate of the motion vector. This first candidate motion vector points onto a quadrant where the matching costs are expected to decrease, as shown in FIG. 14.

Figure 14:
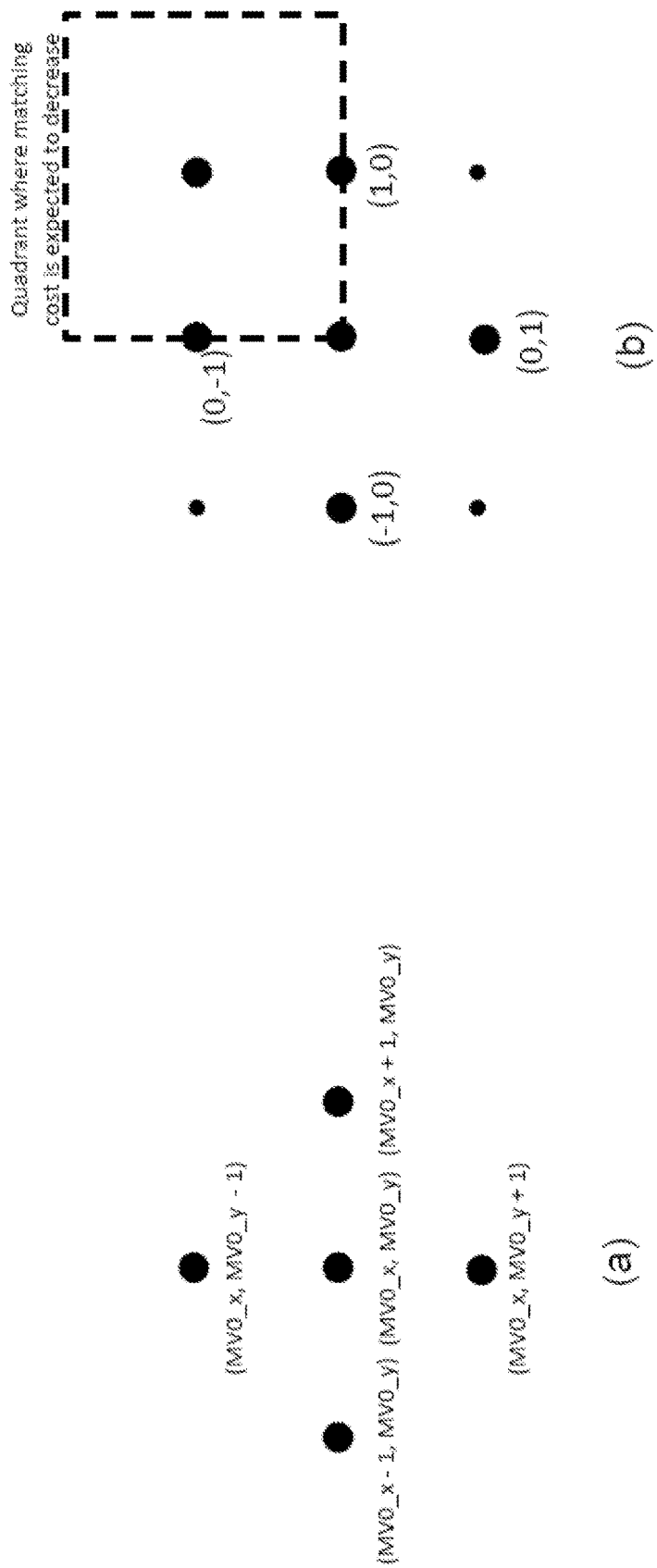
FIG. 14 is a schematic drawing illustrating the determination of the search space according to an embodiment of the present application.
Figure 15:
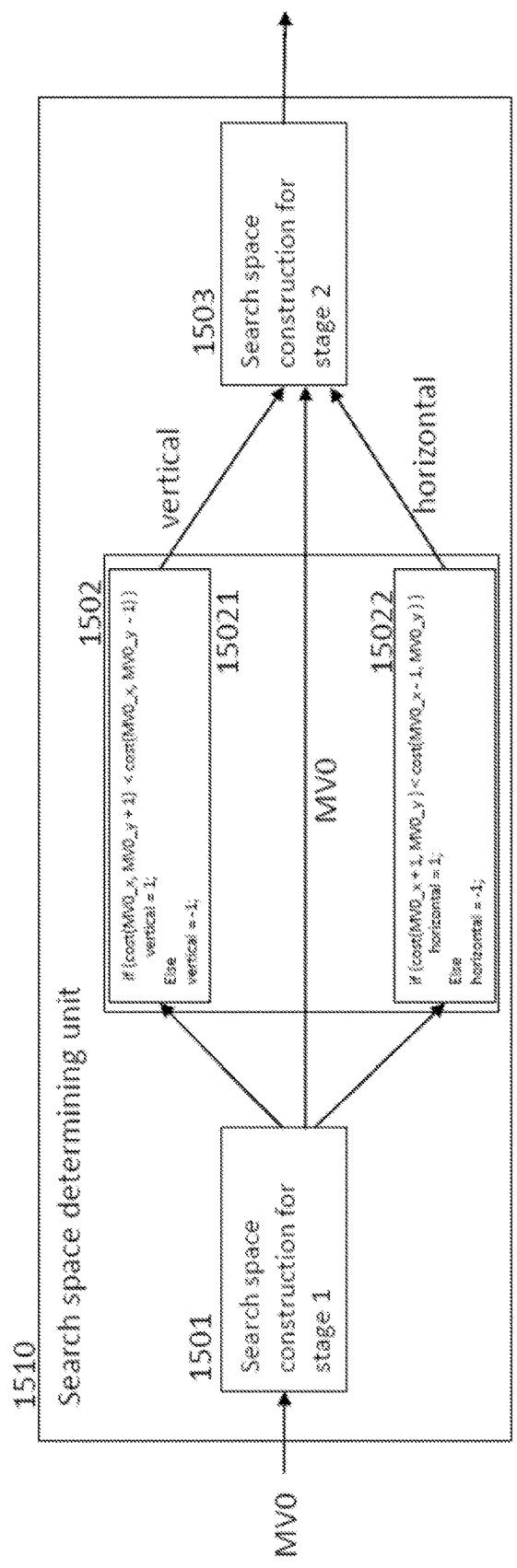
FIG. 15 is a block diagram of a search space determining unit according to an embodiment of the present application.

In FIG. 15, a search space determining unit 1510 is shown which is a modification of the more generic search space determining unit 310 shown in FIG. 3. Based on the initial estimate MV0 of the motion vector, a first search space, which is exemplarily illustrated in FIG. 14(a) is determined in stage 1 of the search space construction 1501 of FIG. 15. The coordinates of the initial estimate for the motion vector are denoted as MV0_x and MV0_y). The first search space comprises MV0 and candidate motion vectors pointing to pixel positions around the position corresponding to MV0, e.g. the nearest neighbors of MV0 in the pixel resolution of the first search space. The matching costs are calculated for the candidate motion vectors of the first search space. By selecting a first and a second candidate motion vector 1501, two directions along preferably orthogonal directions (e.g. vertical and horizontal) are calculated in which the matching costs are expected to decrease.

In FIG. 14, as well as in the rest of the application where coordinates are considered, the positive direction of the horizontal axis ("x-axis") points to the right, whereas the positive direction ("y-axis") of the vertical axis points to the bottom.

More precisely, two comparisons 15021, 15022 are made, for which the points adjacent to the pixel position corresponding to MV0 are grouped into two groups. The matching costs of two pixel positions are compared which are adjacent in the pixel resolution of the first search space to the pixel position pointed to by the initial candidate motion vector and which have the same horizontal component as the initial candidate motion vector. From the two compared vectors evaluated in this first comparison 15021, the vector with the lower matching cost is chosen as a first candidate motion vector of the first search space.

Also, the matching costs of two pixel positions are compared which are adjacent in the pixel resolution of the first search space to the pixel position pointed to by the initial candidate motion vector and which have the same vertical component as the initial candidate motion vector. From the two compared vectors evaluated in this second comparison 15022, the vector with the lower matching cost is chosen as a second candidate motion vector of the first search space.

As a result of these two comparisons, a pixel position is determined to be pointed to by the first candidate motion vector of the second search space which has the same vertical component as the first candidate motion vector and which has the same horizontal component as the second candidate motion vector. The first and the second candidate motion vectors respectively define a positive or negative half plane in the vertical and horizontal directions. Their overlapping quadrant is selected as the area where the matching cost is expected to decrease and defines second space. In FIG. 14(b), the second search space includes only one point.

The first search space may include the initial estimate MV0 of the motion vector and its nearest neighbors, i.e. the candidate motion vectors pointing to the pixel positions adjacent to MV0 in the resolution of the first search space. Such a search space configuration which has a "cross" geometry also described with respect to the second embodiment, is shown in FIG. 14(a). The matching costs according to the cost function which is used are calculated for these five candidate motion vectors of the first search space.

In the following, it is assumed without loss of generality that the coordinates of the pixel position to which the initial estimate MV0 of the motion vector point are (0,0). The two comparisons described above for determining the coordinates (horizontal, vertical) of the first motion vector of the second search space may then for example be performed according to the following procedure:

vertical=−1, horizontal=−1;
if (cost of candidate motion vector (0,1)<cost of candidate motion vector (0,−1))
    vertical=1;
if (cost of candidate motion vector (1,0)<cost of candidate motion vector (−1,0))
    horizontal=1;

By determining a motion vector (vertical, horizontal) based on the procedure given above or a similar proceeding, a quadrant is selected in which the matching cost is expected to decrease.

Accordingly, the quadrant to be used in the determination of the second search space (303 in FIG. 3) comprises candidates having coordinates (horizontal*x, vertical*y), x, y>0 and "horizontal" and "vertical" having the values determined by a proceeding as described above. This determination of the quadrant is exemplarily illustrated in FIG. 14(b). In the example shown, the motion vector (1,−1) is determined to define the selected quadrant (i.e. the top right quadrant). Potential motion vectors in the other three quadrants, which in this specific example will not be included in the second search space, are illustrated as smaller dots.

The present disclosure is not limited to the explicit definition of the above procedure. For instance, (1,1) may be used as initial values instead of (−1,−1), or, instead of setting initial coordinates, "else"-clauses may be used (compare the if-else clauses 15021, 15022 in FIG. 15), and/or the order (sequence) of the "if" conditionals may be exchanged.

When the first candidate motion vector of the second search space is determined as described above, its matching costs are calculated. As a specific case, the second search space may comprise only one said first candidate motion vector. In this case, out of the candidate motion vectors checked (in the described example, five candidate motion vectors of the first search space and one candidate motion vector of the second search space), the candidate motion vector with the lowest matching cost is selected as the motion vector to be used for the current block.

However, as at least one further candidate motion vector of the second search space, a candidate motion vector pointing to a position in a resolution of the second search space may be determined. This at least one further candidate motion vector points to a position in the resolution of the second search space, which is located approximately on a line connecting the estimate of the motion vector and the first candidate motion vector of the second search space. The pixel resolution of the second search space may be higher than the pixel resolution of the first search space. The further candidate motion vector of the second search space may point to a position located between the positions pointed to by the first candidate motion vector of the second search space and the estimate of the motion vector.

In particular, after the first candidate motion vector, the determination of the second search space 1503 may be continued in a second stage of the determination of the second search space, and the second search space may then be determined to comprise at least one additional candidate motion vector pointing to a position in the quadrant that has been defined by the first candidate motion vector of the second search space. For instance, out of the candidates checked so far, the two candidates with the minimum and the second minimum matching costs may be identified and used to calculate a direction for the determination of further points to which candidate motion vectors of the second search space point.

Figure 16:
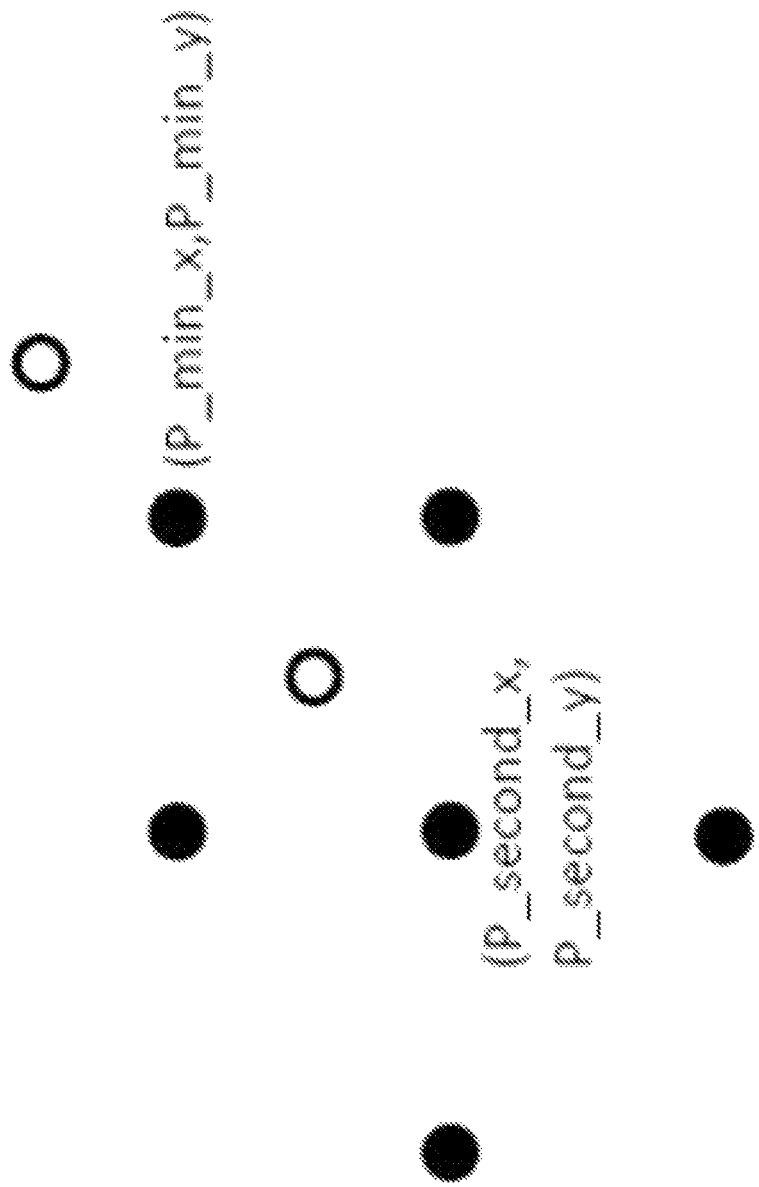
FIG. 16 is a schematic drawing of a search space configuration according to an embodiment of the present application.

An exemplary procedure for the calculation of the direction calculated based on the candidates with the lowest and the second lowest matching costs will be given in the following, wherein the coordinates of the candidates with the lowest and second lowest matching costs are denoted as (P_min_x, P_min_y) and (P_second_x, P_second_y) and the variables "direction_vertical" and "direction_horizontal" denote the components of the vector defining said direction.

direction_vertical=0, direction_horizontal=0;
if (P_min_x !=P_second_x), i.e. if (P_min_x is not equal to P_second_x)
    direction_horizontal=1;
if (P_min_y !=P_second_y), i.e. if (P_min_y is not equal to P_second_y)
    direction_vertical=1;

As shown in FIG. 16, new candidate motion vectors for the second search space may be selected based on the direction given by the vector (direction_vertical, direction_horizontal) and the coordinates of the candidate motion vector (P_min_x, P_min_y) with the lowest matching costs as either 0.5×(P_min_x+direction_vertical, P_min_y−direction_horizontal) and 0.5×(P_min_x−vertical, P_min_y+horizontal) or one of these two points, depending on the pixel positions to which the first and the second candidate motion vectors of the first search space point. The matching costs of the new candidate motion vectors of the second search space are calculated, and out of the candidate motion vectors of the first and second search, the candidate motion vector with the minimum matching cost is selected as output of the motion vector refinement process, i.e. MV0" of FIG. 3.

In the example of FIG. 16, the second search space has a fractional pixel resolution, in particular half-pixel resolution (in accordance with the coefficient 0.5 of the vectors specifying the direction for positions of the additional candidate motion vectors of the second search space). Alternative pixel resolutions such as quarter-pixel resolution may be used, and instead of one or two candidate motion vectors, two or four candidate motion vectors pointing approximately to the line given by the candidate motion vector (P_min_x, P_min_y) and the direction (direction_vertical, direction_horizontal) may be used.

In the exemplary search space configuration shown in FIG. 16, the first motion vector of the second search space coincides with the candidate motion vector (P_min_x, P_min_y) with the lowest matching costs on which the calculation of the additional motion vectors of the second search space, 0.5×(P_min_x+direction_vertical, P_min_y−direction_horizontal) and 0.5×(P_min_x−vertical, P_min_y+horizontal) is based.

Combinations of Embodiments

According to each of the exemplary embodiments described above, a second search space is selected based on the output of a first operation in which a first search space is determined at 301 and a first and a second candidate motion vector are selected from the first search space 302. However, the overall search process can comprise more operations than the determination of a first and a second search space and the selection of one or two candidates from the respective search space. In each operation or suboperation, a new search space may be determined in accordance with one of the exemplary embodiments. For instance, the search space configuration described above with respect to FIG. 16 is an example where the determination of the second search space implies subsequently applying the third exemplary embodiment and the first exemplary embodiment. This will be explained in the following.

In the exemplary search space configuration shown in FIG. 16, the second search space comprises the first candidate motion vector of the second search space and two additional candidate motion vectors. These two additional candidate motion vectors of the second search space point approximately to pixel positions on a line defined by the pixel position of the candidate motion vector with the lowest matching cost among the five candidate motion vectors of the first search space and the second search space and by the line having a direction given by the vector with the coordinates direction_horizontal and direction_vertical calculated according to the procedure given above. This procedure is an example for the calculation of two candidate motion vectors in accordance with a direction given by a line connecting two candidate motion vectors. This procedureg may also be used in the calculation of the second search space of the first embodiment that has been described above with reference to FIGS. 5 to 11.

In other words, the optional second stage of the determination of the second search space according to the third embodiment corresponds to the determination of the second search space according to the first embodiment. In other words, in the above example of determining a second search space having more candidate motion vectors than only the first candidate motion vector of the second search space, the additional motion vectors of the search space have been obtained by combining this third embodiment of the present disclosure with the first embodiment.

In the example of the third exemplary embodiment which has been described with reference to FIG. 16, the third embodiment and the first embodiment are combined when determining the second search space. However, the present disclosure is not limited to this particular example of a combination of different embodiments.

Further, the present disclosure is not limited to combining two different embodiments. Alternatively, the second search space may be determined by subsequently applying the second stage 303 according to the first embodiment and thus determining nested search spaces having different pixel resolutions, for example half-pixel resolution first and quarter-pixel resolution second.

Figure 17:
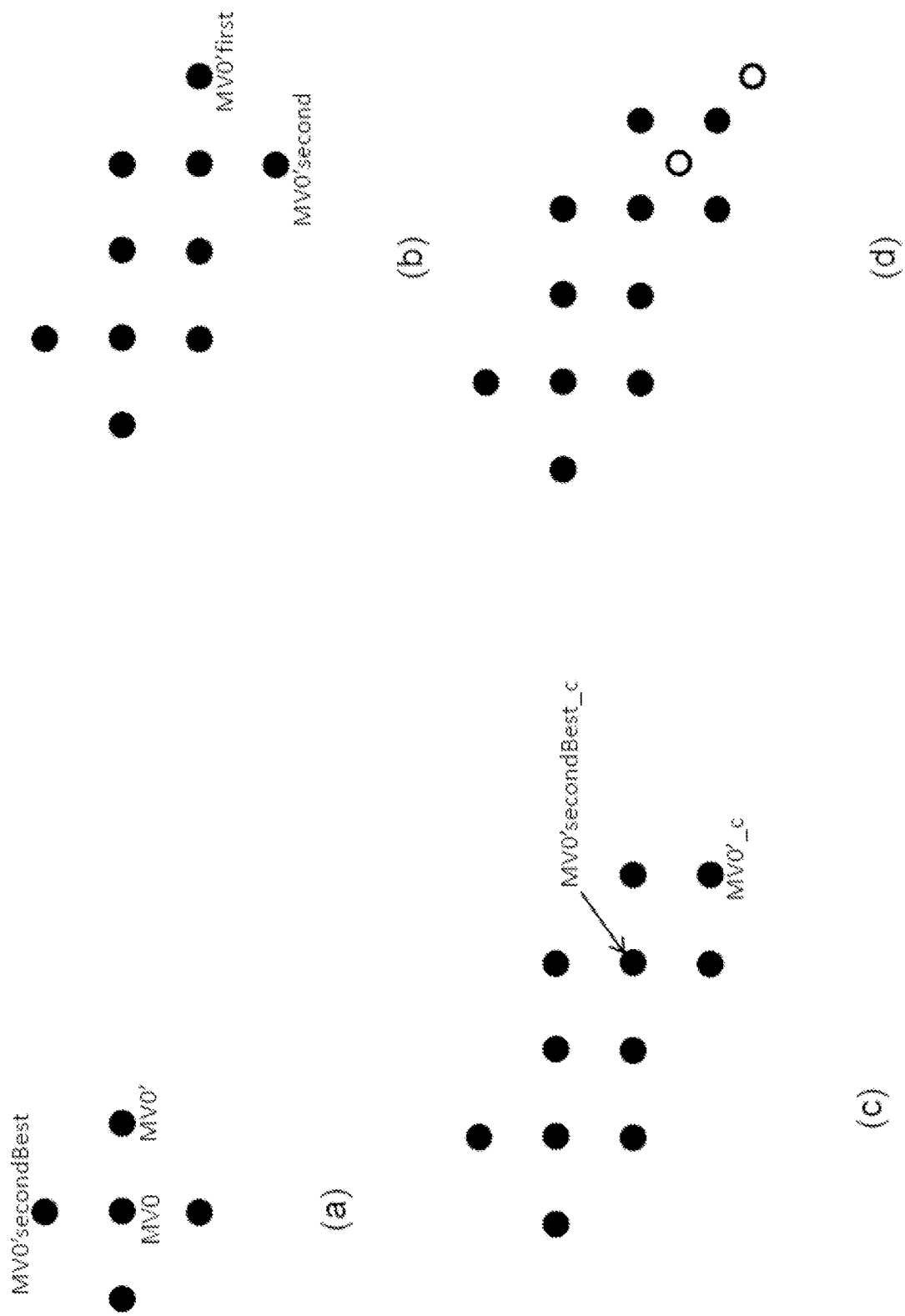
FIG. 17 is schematic drawing illustrating an exemplary determination of a search space according to an embodiment of the present application.

A further example of combining the different exemplary embodiments is illustrated in FIG. 17. As can be seen in FIG. 17(*a*), a first search space comprising five candidate motion vectors, namely the initial estimate motion vector and the four candidate motion vectors adjacent to the initial estimate motion vector in the pixel resolution of the first search space (for example, Full-pixel resolution), is determined in accordance with the second exemplary embodiment. The candidate motion vectors with the lowest and second lowest matching costs are used to determine a second search space which is a region in accordance with the second embodiment comprising further five candidate motion vectors shown in FIG. 17 (*b*). On these further five candidate motion vectors, the approach of the third embodiment is applied, i.e. an additional candidate motion vector shown in FIG. 17(*c*) is determined, by applying the selection 1502 of a first and a second candidate motion vector, MV0'first and MV0' second, of FIG. 15. In accordance with the first embodiment, again, the two candidate motion vectors with the lowest and the second lowest matching costs are determined (denoted MV0'_c and MV0'secondBest_c in the figure). As can be seen in FIG. 17(*d*), two additional candidate motion vectors pointing to pixel positions of a higher pixel resolution (for example half-pixel resolution) than the resolution used so far, are added, which point approximately to positions on a line connecting the positions corresponding to MV0'_c and MV0' secondBest_c.

An advantage of combining different embodiments is that the number of candidate motion vectors can be kept low while maintaining similar accuracy in an increased area of the reference picture. For instance, as can be seen in FIG. 17, the catenation of the three stages corresponding to the three embodiments allows for providing a position of a predictor in the accuracy half-pixel resolution for an area corresponding to a square of 7×7 full pixels.

According to another embodiment, the search space comprises all points that are inside the square which is centered around the initial motion vector. The best search point inside the search space is determined by checking all of the points according to a predefined checking order and according to a predefined matching cost function. The cost function can be SAD (sum of absolute differences), MRSAD (Mean removed sum of absolute differences), SSE (Sum of squared errors) etc. The embodiment can apply to any cost function. The difference with this embodiment compared to previous embodiments is that all of the points that are inside the search space are checked (based on matching cost). The search space includes all of the search points that are accessible for search.

In one alternative implementation of the embodiment, the search space comprises all points that are within a square whose corners are determined by the coordinates (−2,−2), (2,2), (−2,2) and (2,−2). The coordinate notation used in the embodiment is exemplified in FIG. 20, where the search points with coordinates (0,0) and (2,1) are marked with arrows. The coordinate (0,0) corresponds to the center point of the search space. In this alternative implementation, 25 search points are present in the search space.

In one alternative implementation, a predefined checking order is applied to order the search points in such a way that the points are grouped into 4 groups as follows:

The first group of points includes the center search point that is pointed to by the initial motion vector. In an example, the center search point is located at the (0,0) coordinate in FIG. 20.

Figure 20:
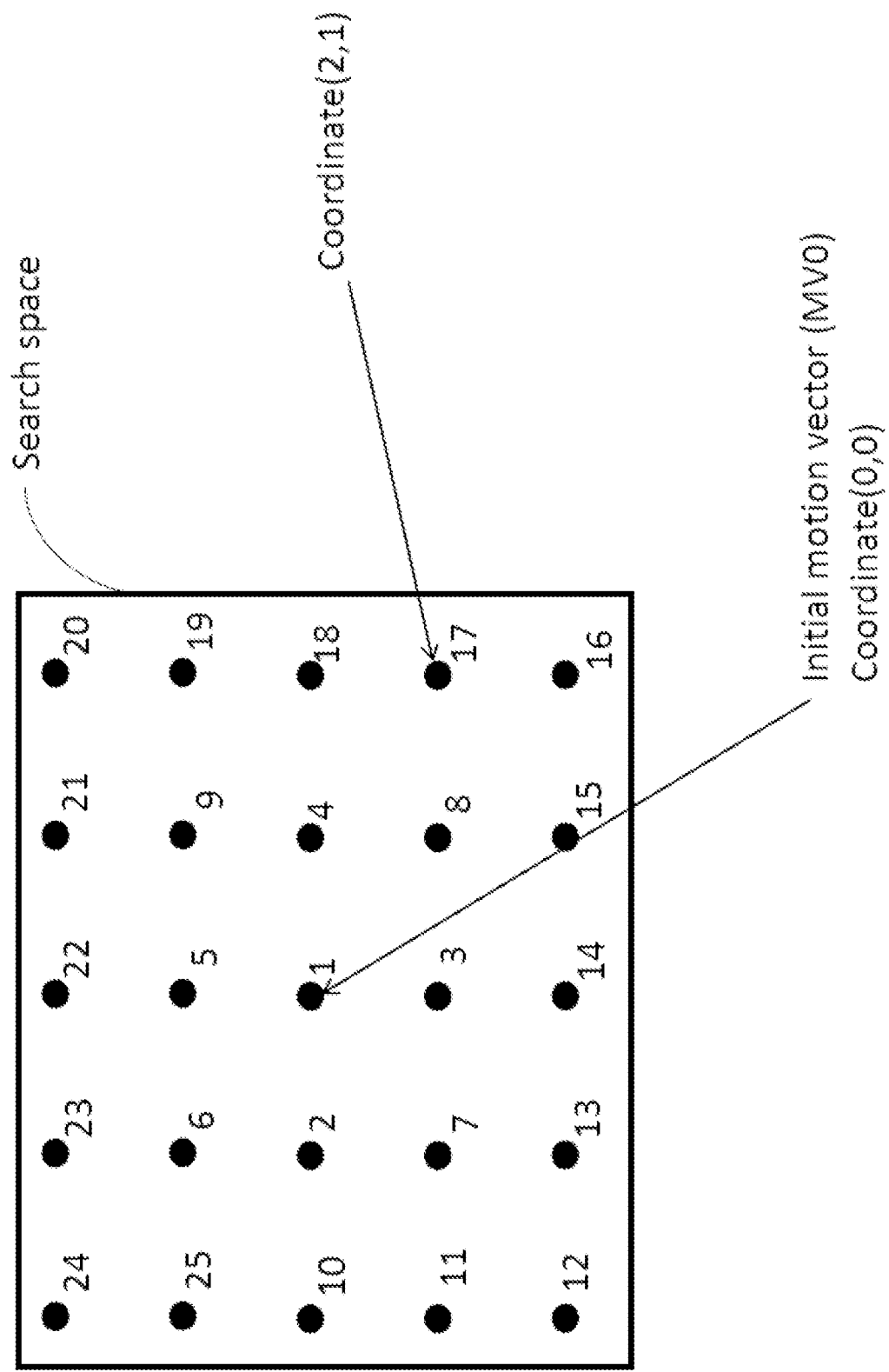
FIG. 20 is a schematic drawing illustrating an example of coordinate notation according to an embodiment of the present application.

The second group of points comprises the 4 points that are left, top, right and bottom neighbors of the center points (these are indicated as points 2, 3, 4, and 5 in FIG. 20). The four points are the immediate neighbors of the center point that have the coordinates of (−1,0), (0,1), (1,0), (0,−1).

The third group of points includes the four points that are 1 pixel sample away from the center coordinate and that are not comprised in the second group. For example, these are the points denoted by the numbers 6, 7, 8, and 9 in FIG. 20. The coordinates of these points are given by (−1,−1), (−1,1), (1,1) and (1,−1).

The fourth group of points includes the points that are 2 pixel samples away from the center point at least in one coordinate axis. In an example, these points are denoted as 10, 11, . . . , 25 in FIG. 20 and comprise 16 points. Their coordinates are given by (−2,0), (−2,1), (−2,2), (−1,2), (0,2), (1,2), (2,2), (2,1), (2,0), (2,−1), (2,−2), (1,−2), (0,−2), (−1,−2), (−2,−2), (−2,−1).

According to this alternative implementation of the embodiment, the first group of points is checked before the second group of points. Second group of points is checked before the third group of points. The third group of points is checked before the fourth group of points. If a point A is checked before point B, and if the matching cost of point A is smaller than or equal to point B, the point A is set as the best matching point out of the two points (A and B). In other words, in the case of equal matching cost, the point that is checked earlier has priority and is selected as the best point.

In another alternative implementation, a different predefined checking order is applied to order the search points in such a way that the points are grouped into 5 groups as follows:

The first group of points includes the center search point that is pointed to by the initial motion vector. In an example, the center search point is located at the (0,0) coordinate in FIG. 21.

Figure 21:
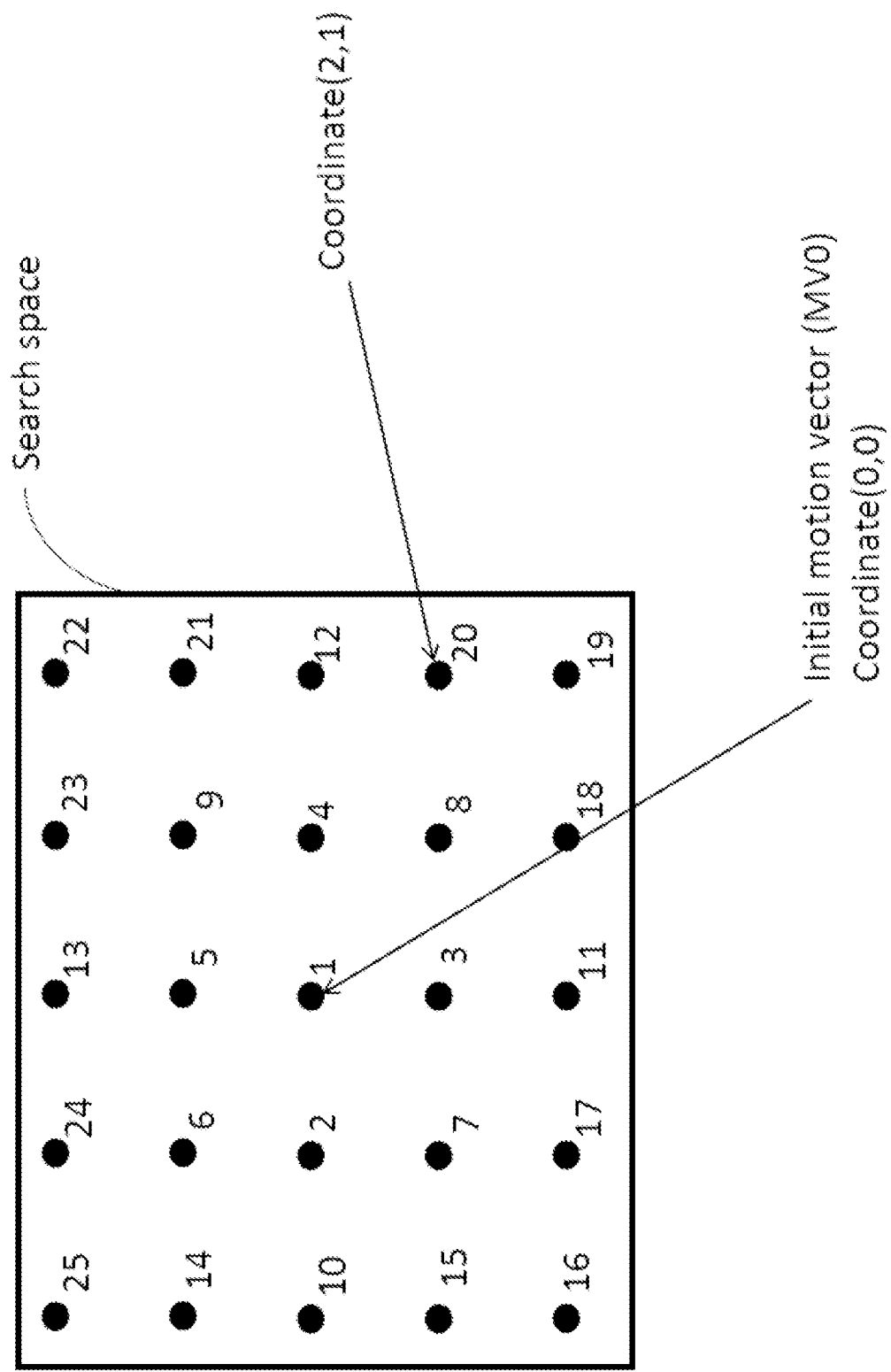
FIG. 21 is a schematic drawing illustrating another example of coordinate notation according to an embodiment of the present application.

The second group of points comprises the 4 points that are left, top, right and bottom neighbors of the center point (these are indicated as points 2, 3, 4, and 5 in FIG. 21). These four points are the immediate neighbors of the center point that have the coordinates of (−1,0), (0,1), (1,0), (0,−1).

The third group of points includes the four points that are 1 pixel sample away from the center coordinate and that are not comprised in the second group. In an example, these are points denoted by the numbers 6, 7, 8, and 9 in FIG. 21. The coordinates of these points are given by (−1,−1), (−1,1), (1,1) and (1,−1).

The fourth group of points includes the points that are 2 pixel samples away from the center point only in one coordinate axis and 0 pixel samples away from the center point in the other coordinate axis. In an example, these points are denoted as 10, 11, 12 and 13 in the FIG. 21 and comprises 4 points. Their coordinates are given by (−2,0), (0,2), (2,0), (0,−2).

The fifth group of points includes the points that are 2 pixel samples away from the center point at least in one coordinate axis and that are not included in the fourth group of points. In an example, these points are denoted as 14, 15, 16, . . . , 25 in FIG. 21 and comprise 12 points. Their coordinates are given by (−2,1), (−2,2), (−1,2), (1,2), (2,2), (2,1), (2,−1), (2,−2), (1,−2), (−1,−2), (−2,−2), (−2,−1).

According to this alternative implementation of the embodiment, the first group of points is checked before the second group of points. The second group of points is checked before the third group of points. The third group of points is checked before the fourth group of points. The fourth group of points may be checked before the fifth group of points. If a point A is checked before point B, and if the matching cost of point A is smaller than or equal to point B, the point A is set as the best matching point out of the two points (A and B). In other words, in the case of equal matching cost, the point that is checked earlier has priority and is selected as the best point.

In a further alternative implementation, yet another predefined checking order is applied to order the search points in such a way that the points are grouped into 6 groups as follows:

The first group of points includes the center search point that is pointed to by the initial motion vector. In an example, the center search point is located at the (0,0) coordinate in FIG. 22.

Figure 22:
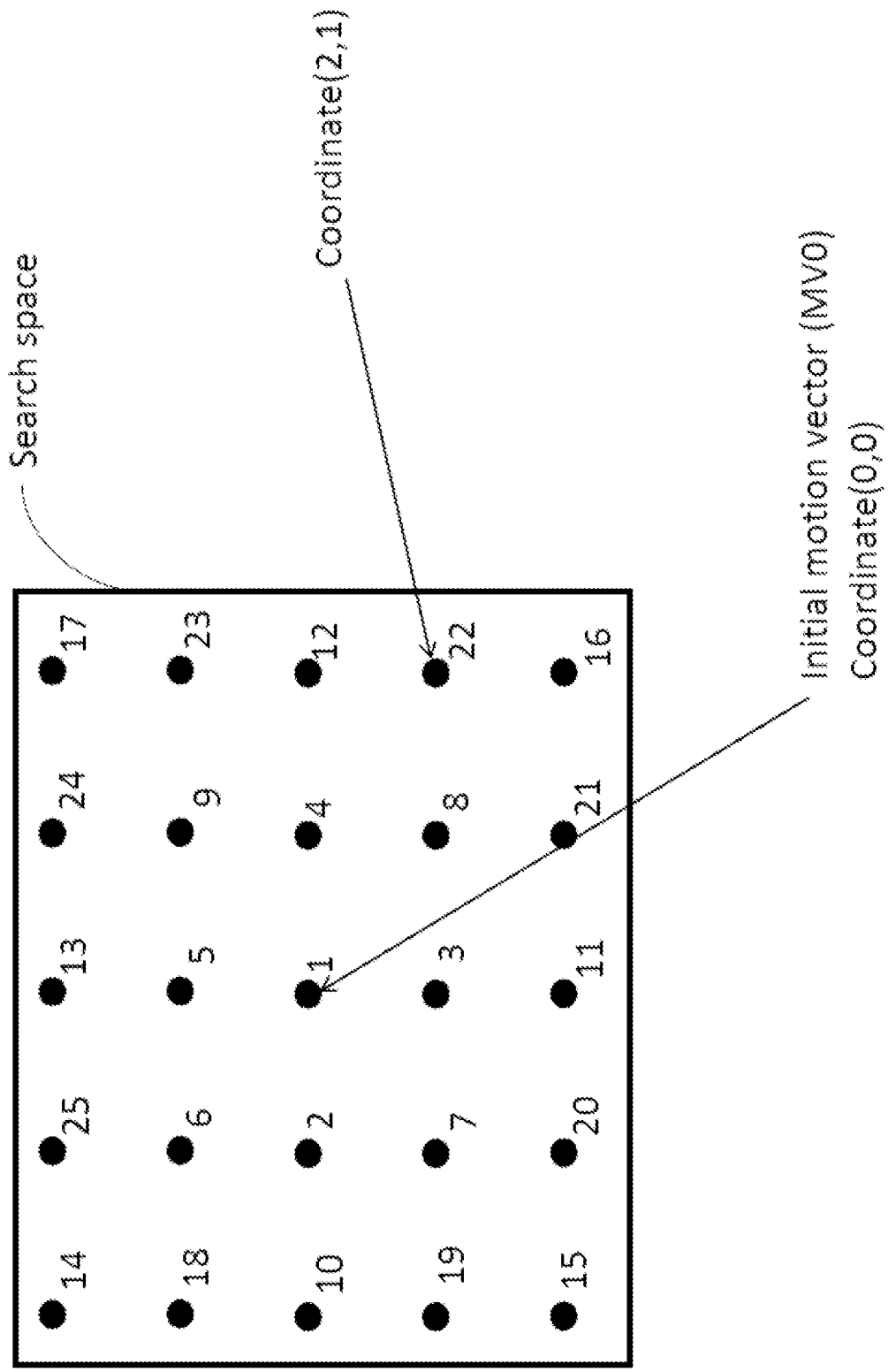
FIG. 22 is a schematic drawing illustrating another example of coordinate notation according to an embodiment of the present application.

The second group of points comprises the 4 points that are left, top, right and bottom neighbors of the center points (these are indicated as points 2, 3, 4, and 5 in FIG. 22). These four points are the immediate neighbors of the center point that have the coordinates of (−1,0), (0,1), (1,0), (0,−1).

The third group of points includes the four points that are 1 pixel sample away from the center coordinate and that are not comprised in the second group. In an example, these are points denoted by the numbers 6, 7, 8, and 9 in FIG. 22. The coordinates of these points are given by (−1,−1), (−1,1), (1,1) and (1,−1).

The fourth group of points includes the points that are 2 pixel samples away from the center point only in one coordinate axis and 0 pixel samples away from the center point in the other coordinate axis. In an example, these points are denoted as 10, 11, 12, and 13 in the FIG. 22 and comprise 4 points. Their coordinates are given by (−2,0), (0,2), (2,0), (0,−2).

The fifth group of points includes the points that are 2 pixel samples away from the center point in both coordinate axes. In an example, these points are denoted as 14, 15, 16, and 17 in FIG. 22 and comprise 4 points. Their coordinates are given by (−2,−2), (−2,2), (2,2), (2,−2).

The sixth group of points includes the points that are 2 pixel samples away from the center point at least in one coordinate axis and that are not included in the fourth or fifth groups of points. In an example, these points are denoted as 18, 19, 20, . . . , 25 in FIG. 22 and comprise 8 points. Their coordinates are given by (−2,−1), (−2,1), (−1,2), (1,2), (2,1), (2,−1), (1,−2), (−1,−2).

According to this alternative implementation of the embodiment, the first group of points is checked before the second group of points. The second group of points is checked before the third group of points. The third group of points is checked before the fourth group of points. The fourth group of points may be checked before the fifth group of points. The fifth group of points may be checked before the sixth group of points. If a point A is checked before point B, and if the matching cost of point A is smaller than or equal to point B, the point A is set as the best matching point out of the two points (A and B). In other words, in the case of equal matching cost, the point that is checked earlier has priority and is selected as the best point.

In yet another alternative implementation of the embodiment the search space comprises all points that are within a square whose corners are determined by the coordinates (−2,0), (0,2), (2,0) and (0,−2), i.e. a rhombus- or diamond-shaped search space. In this alternative implementation, 13 search points are present in the search space.

The first group of points includes the center search point that is pointed to by the initial motion vector. In an example, the center search point is located at the (0,0) coordinate in FIG. 23.

Figure 23:
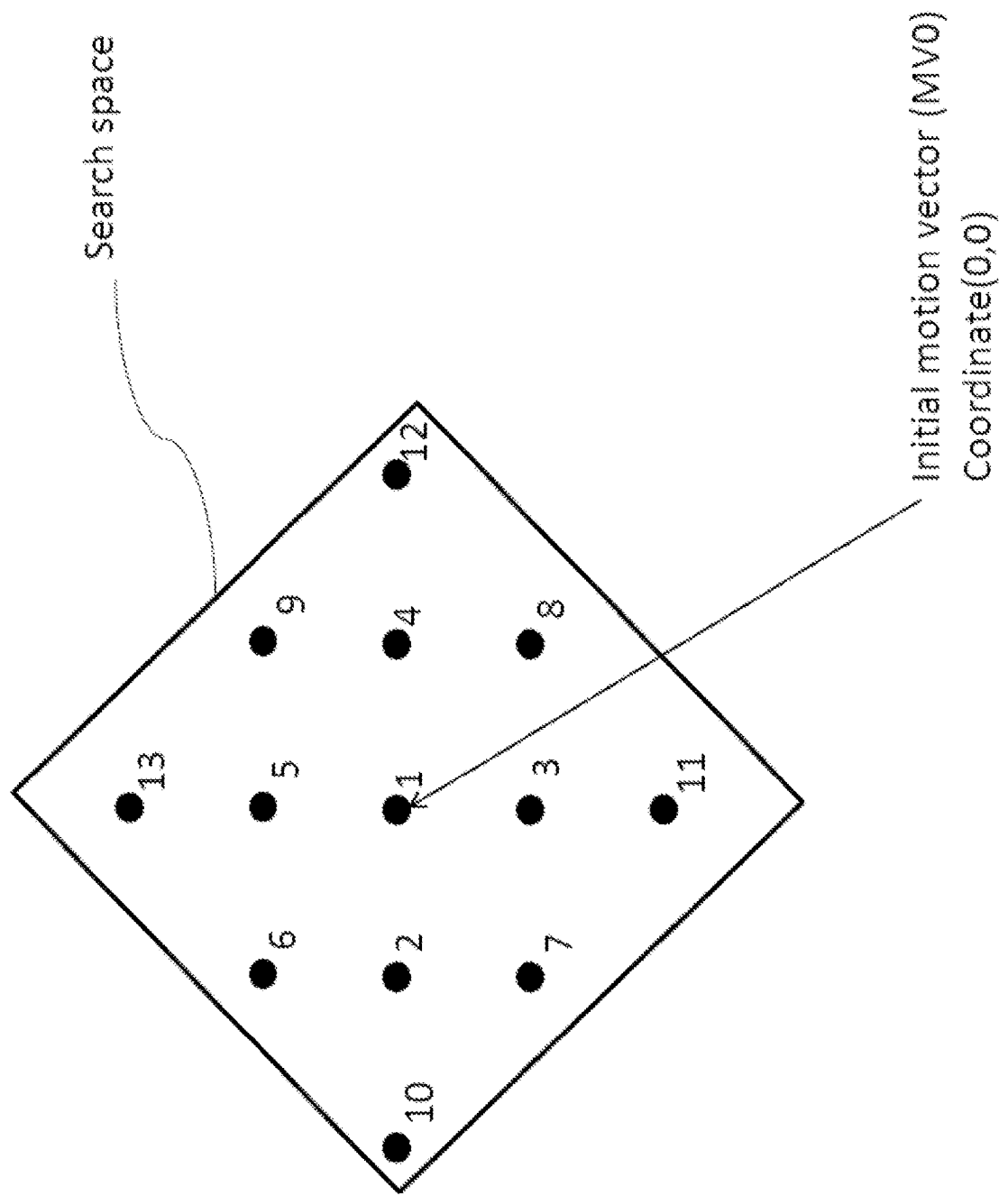
FIG. 23 is a schematic drawing illustrating another example of coordinate notation according to an embodiment of the present application.

The second group of points comprises the 4 points that are left, top, right and bottom neighbors of the center point (these are indicated as points 2, 3, 4, and 5 in FIG. 23). These four points are the immediate neighbors of the center point that have the coordinates of (−1,0), (0,1), (1,0), (0,−1).

The third group of points includes the four points that are 1 pixel sample away from the center coordinate and that are not comprised in the second group. In an example, these are points denoted by the numbers 6, 7, 8, and 9 in FIG. 23. The coordinates of the points are given by (−1,−1), (−1,1), (1,1) and (1,−1).

The fourth group of points includes the points that are 2 pixel samples away from the center point only in one coordinate axis and 0 pixel samples away from the center point in the other coordinate axis. In an example, these points are denoted as 10, 11, 12, and 13 in FIG. 23 and comprise 4 points. Their coordinates are given by (−2,0), (0,2), (2,0), (0,−2).

According to this alternative implementation of the embodiment, the first group of points is checked before the second group of points. The second group of points is checked before the third group of points. The third group of points is checked before the fourth group of points. If a point A is checked before point B, and if the matching cost of point A is smaller than or equal to point B, the point A is set as the best matching point out of the two points (A and B). In other words, in the case of equal matching cost, the point that is checked earlier has priority and is selected as the best point.

Alternatively or in addition to all of the embodiments above, if there is more than one point inside a group, the points inside the same group of points may be ordered according to the following rules:

The leftmost point among the group of points is selected as the first point among the group of points.

If there are more than one point that are leftmost points of the group of points, the point that is leftmost of the group and that has a coordinate displacement that is closer to 0 in the vertical direction (y direction) is selected as the first point among the group of points. Example: In FIG. 20, there are 5 leftmost points in the fourth group of points (10, 11, 12, 24, 25). The point 10 is selected as the first point in the fourth group since it has a zero displacement in y direction.

If there are more than one leftmost points in the group of points that have the same displacement in the y direction, then the leftmost point in the top direction is selected as the first point of the group of points. Example: In FIG. 20, there are 2 leftmost points in the third group of points (6, 7). The point 6 is selected as the first point in the third group.

After the first point in the group of points is determined, the remaining points in the same group are ordered based on clock-wise or counter-clockwise scanning of points around the center point. Example: In FIG. 20, the first point in the third group of points is determined to be point 6, and the other points are ordered based on counter-clockwise scanning around the center point. Hence the checking order among the 4 points is given by 6, 7, 8, and 9 as depicted in FIG. 20.

In a further alternative implementation of the embodiment, the search space comprises points that are within a square whose corners are determined by the coordinates (−2,−2), (2,2), (2,−2) and (−2,2). In this implementation, up to 25 search points are present in the search space.

The 25 points in the search space are grouped into 2 groups.

The first group of points includes the center search point that is pointed to by the initial motion vector. In an example, the center search point is located at the (0,0) coordinate in FIG. 24.

The second group of points comprises the remaining 24 points. The 24 points comprise all of said 25 search points excluding the center point. In other words, the 24 search points are denoted by the coordinates: (−2,−2), (−1,−2), (0,−2), (1,−2), (2,−2), (−2,−1), (−1,−1), (0,−1), (1,−1), (2,−1), (−2,0), (−1,0), (1,0), (2,0), (−2,1), (−1,1), (0,1), (1,1), (2,1), (−2,2), (−1,2), (0,2), (1,2), (2,2).

According to this alternative implementation of the embodiment, the first group of points is checked before the second group of points. In other words, if a point A belongs to the first group, then point A is checked before all of the points comprised within the second group.

Alternatively or in addition to all of the embodiments above, if there is more than one point inside a group, the points inside the same group of points may be ordered according to the following rules:

The top-left point among the group of points is selected as the first point among the group of points. The top-left point can be determined according to the following operations:

Firstly, determine the set of points in the group that has the minimum vertical coordinate. The coordinate of the points are denoted as (x,y), where the variable y indicates the vertical coordinate.

Secondly, determine the point that has the minimum horizontal coordinate in the said set of points. This point is determined to be the top-left point.

After the top-left point is determined, the remaining points in the same group are ordered according to raster scan order. In raster scanning, the points are scanned horizontally left-to-right, then at the end of one row scanning starts at the leftmost point of the next row of points. The rows are scanned starting from the top row continuing downward.

If a point A is checked before point B, and if the matching cost of point A is smaller than or equal to point B, the point A is set as the best matching point out of the two points (A and B). In other words, in the case of equal matching cost, the point that is checked earlier has priority and is selected as the best point.

According to the disclosure, point A is checked before point B if any of the following conditions is true;

Point A belongs to first group and point B belongs to the second group.

Point A and point B belong to the same group, and point A is ordered before point B.

Figure 24:
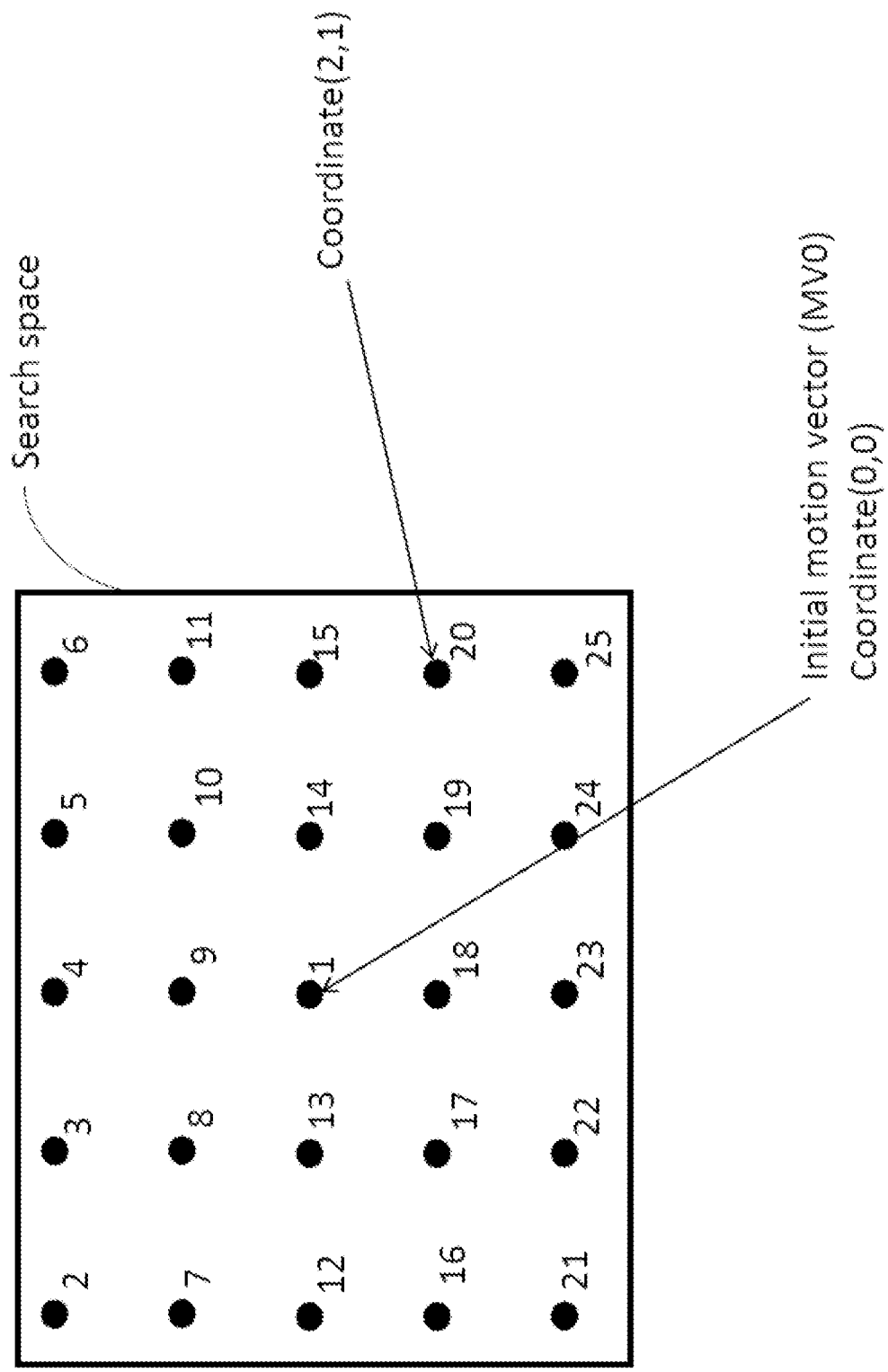
FIG. 24 is a schematic drawing illustrating another example of coordinate notation according to an embodiment of the present application.

The above embodiment is exemplified in FIG. 24. In this figure, the point comprised in the first group is labeled "1", which is the center point. There is only one point in the first group.

In the second group, there are 24 points and they are labelled 2, 3, ..., 25. The points in the second group are checked according to the same order as they are labelled, i.e. 2, 3, ..., 25 in order. The top-left point of the second group is labelled "2".

According to FIG. 24, there is a total of 25 search points in the search space, where the points are grouped into 2 groups. According to the disclosure, the points belonging to the first group are checked before the points belonging to the second group. Moreover, the points within each group are ordered according to the rule disclosed above in the present disclosure. At the end, all 25 points are ordered and the final checking order is given as 1, 2, 3, ..., 25. In other words, the final checking order of points is given by their coordinates as follows: (0,0), (−2,−2), (−1,−2), (0,−2), (1,−2), (2,−2), (−2,−1), (−1,−1), (0,−1), (1,−1), (2,−1), (−2,0), (−1,0), (1,0), (2,0), (−2,1), (−1,1), (0,1), (1,1), (2,1), (−2,2), (−1,2), (0,2), (1,2), (2,2).

In yet another implementation of the embodiment, the search space comprises points that are within a square whose corners are determined by the coordinates (−2,−2), (2,2), (2,−2) and (−2,2). In this alternative implementation, up to 25 search points are present in the search space.

The first group of points comprises all of said 25 search points of the search space. In other words, the 25 search points are denoted by the coordinates: (−2,−2), (−1,−2), (0,−2), (1,−2), (2,−2), (−2,−1), (−1,−1), (0,−1), (1,−1), (2,−1), (−2,0), (−1,0), (0,0), (1,0), (2,0), (−2,1), (−1,1), (0,1), (1,1), (2,1), (−2,2), (−1,2), (0,2), (1,2), (2,2).

Alternatively or in addition to all of the embodiments above, if there is more than one point inside a group, the points inside the same group of points may be ordered according to the following rules:

The top-left point among the group of points is selected as the first point among the group of points. The top-left point can be determined according to the following operations:

Firstly, determine the set of points in the group that has the minimum vertical coordinate. The coordinate of the points are denoted as (x,y), where the variable y indicates the vertical coordinate.

Secondly, determine the point that has the minimum horizontal coordinate in said set of points. This point is determined to be the top-left point.

After the top-left point is determined, the remaining points in the same group are ordered according to raster scan order. In raster scanning, the points are scanned horizontally left-to-right, then at the end of one row scanning starts at the leftmost point of the next row of points. The rows are scanned starting from the top row continuing downward.

If a point A is checked before point B, and if the matching cost of point A is smaller than or equal to point B, the point A is set as the best matching point out of the two points (A and B). In other words, in the case of equal matching cost, the point that is checked earlier has priority and is selected as the best point.

Figure 25:
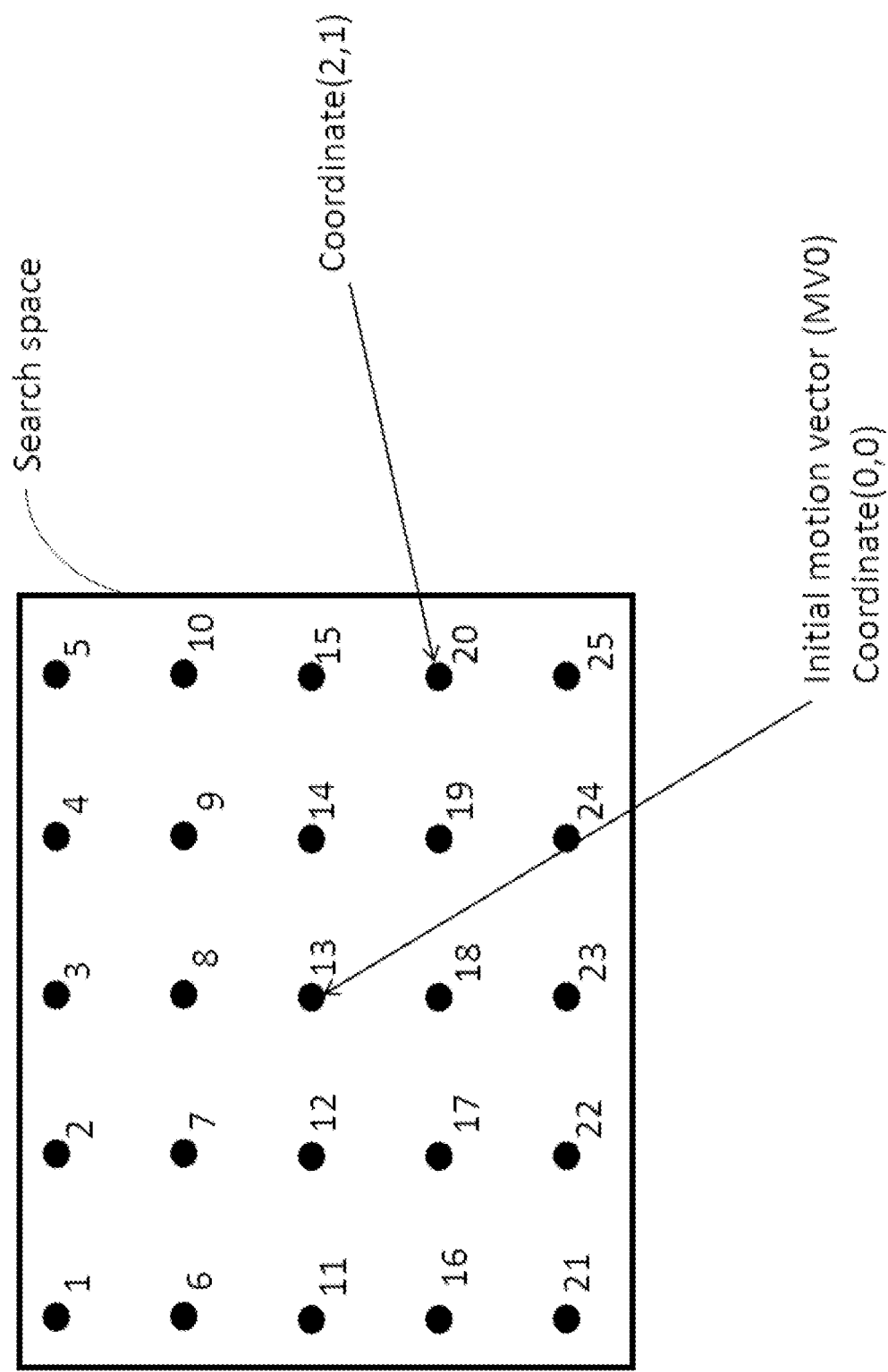
FIG. 25 is a schematic drawing illustrating another example of coordinate notation according to an embodiment of the present application.

The above embodiment is exemplified in FIG. 25. In the first group, there are 25 points and they are labelled 1, 2, 3, ..., 25. The points in the first group are checked according to the same order as they are labelled, i.e. 1, 2, 3, ..., 25 in order. The top-left point of the second group is labelled "1".

According to FIG. 25, there is a total of 25 search points in the search space, where the points are grouped into only one group. The points within the group are ordered according to the rule disclosed above in the present disclosure. At the end, all 25 points are ordered and the final checking order is given as 1, 2, 3, ..., 25. In other words, the final checking order of points is given by their coordinates as follows: (−2,−2), (−1,−2), (0,−2), (1,−2), (2,−2), (−2,−1), (−1,−1), (0,−1), (1,−1), (2,−1), (−2,0), (−1,0), (0,0), (1,0), (2,0), (−2,1), (−1,1), (0,1), (1,1), (2,1), (−2,2), (−1,2), (0,2), (1,2), (2,2).

In one further alternative implementation of the embodiment, the search space comprises points that are within a square whose corners are determined by the coordinates (−2,−2), (2,2), (2,−2) and (−2,2), excluding the 4 corner coordinates (the excluded points have the coordinates (−2,−2), (2,2), (2,−2) and (−2,2)). In this implementation, 21 search points are present in the search space. The search points include all the points within the search space determined by the corner coordinates (−2,−2), (2,2), (2,−2) and (−2,2), except for the 4 corner points (−2,−2), (2,2), (2,−2) and (−2,2). The search space is exemplified in FIG. 26.

The 21 points in the search space are grouped into 2 groups.

The first group of points includes the center search point that is pointed to by the initial motion vector. In an example, the center search point is located at the (0,0) coordinate in FIG. 26.

The second group of points comprises the 20 points that comprise all of said 21 search points excluding the center point. In other words, the 20 search points are denoted by the coordinates: (−1,−2), (0,−2), (1,−2), (−2,−1), (−1,−1), (0,−1), (1,−1), (2,−1), (−2,0), (−1,0), (1,0), (2,0), (−2,1), (−1,1), (0,1), (1,1), (2,1), (−1,2), (0,2), (1,2).

According to this alternative implementation of the embodiment, the first group of points is checked before the second group of points. In other words, if a point A belongs to the first group, then point A is checked before all of the points comprised within the second group. Alternatively or in addition to all of the embodiments above, if there is more than one point inside a group, the points inside the same group of points may be ordered according to the following rules:

The top-left point among the group of points is selected as the first point among the group of points. The top-left point can be determined according to the following operations:

Firstly, determine the set of points in the group that has the minimum vertical coordinate (points that are comprised in the top-most row). The coordinates of the points are denoted as (x,y), where the variable y indicates the vertical coordinate.

Secondly, determine the point that has the minimum horizontal coordinate in said set of points. This point is determined to be the top-left point.

After the top-left point is determined, the remaining points in the same group are ordered according to raster scan order. In raster scanning, the points are scanned horizontally left-to-right, then at the end of one row scanning starts at the leftmost point of the next row of points. The rows are scanned starting from the top row continuing downward.

If a point A is checked before point B, and if the matching cost of point A is smaller than or equal to point B, the point A is set as the best matching point out of the two points (A and B). In other words, in the case of equal matching cost, the point that is checked earlier has priority and is selected as the best point.

According to the disclosure, point A is checked before point B if any of the following conditions is true;

Point A belongs to the first group and point B belongs to the second group.

Point A and point B belong to the same group, and point A is ordered before point B.

Figure 26:
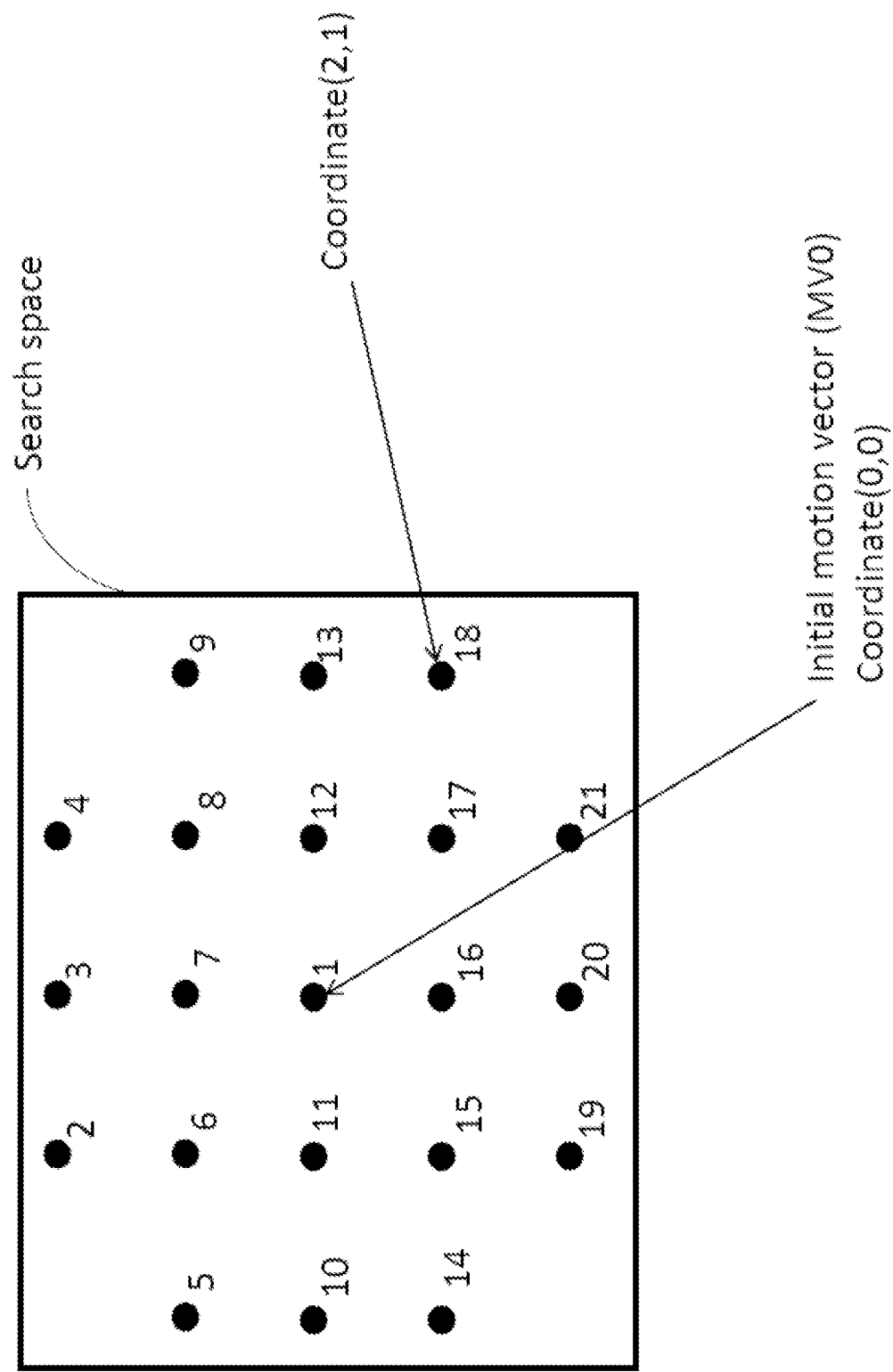
FIG. 26 is a schematic drawing illustrating another example of coordinate notation according to an embodiment of the present application.

The above embodiment is exemplified in FIG. 26. In this figure, the point comprised in the first group is labeled "1", which is the center point. There is only one point in the first group.

In the second group, there are 20 points and they are labelled 2, 3, . . . , 21. The points in the second group are checked according to the same order as they are labelled, i.e. 2, 3, . . . , 21 in order. The top-left point of the second group is labelled "2".

According to the FIG. 26, there is a total of 21 search points in the search space, where the points are grouped into 2 groups. According to the disclosure, the points belonging to the first group are checked before the points belonging to the second group. Moreover, the points within the groups are ordered according to the rule disclosed above in the present disclosure. At the end, all 21 points are ordered and the final checking order is given as 2, 3, . . . , 21. In other words, the final checking order of all points is given by their coordinates as follows: (0,0), (−1,−2), (0,−2), (1,−2), (−2,−1), (−1,−1), (0,−1), (1,−1), (2,−1), (−2,0), (−1,0), (1,0), (2,0), (−2,1), (−1,1), (0,1), (1,1), (2,1), (−1,2), (0,2), (1,2).

In yet another alternative implementation of the embodiment, the search space comprises points that are within a square whose corners are determined by the corner coordinates (−2,−2), (2,2), (2,−2) and (−2,2), excluding the 8 points that are adjacent to the corner coordinates (the excluded points have the coordinates (−1,−2), (1,−2), (1,2), (−1,2), (2,−1), (2,1), (−2,1) and (−2,−1)). In this alternative implementation, 17 search points are present in the search space. The search points include all points within the search space determined by the corner coordinates (−2,−2), (2,2), (2,−2) and (−2,2), except for said 8 points with coordinates (−1,−2), (1,−2), (1,2), (−1,2), (2,−1), (2,1), (−2,1) and (−2,−1). The search space is exemplified in FIG. 27.

The 17 points in the search space are grouped into 2 groups.

The first group of points includes the center search point that is pointed to by the initial motion vector. In an example, the center search point is located at the (0,0) coordinate in FIG. 27.

The second group of points comprises the 16 points that comprise all of said 17 search points excluding the center point. In other words, the 16 search points are denoted by the coordinates: (−2,−2), (0,−2), (2,−2), (−1,−1), (0,−1), (1,−1), (−2,0), (−1,0), (1,0), (2,0), (−1,1), (0,1), (1,1), (−2,2), (0,2), (2,2).

According to this alternative implementation of the embodiment, the first group of points is checked before the second group of points. In other words, if a point A belongs to the first group, then point A is checked before all of the points comprised within the second group. Alternatively or in addition to all of the embodiments above, if there is more than one point inside a group, the points inside the same group of points may be ordered according to the following rules:

The top-left point among the group of points is selected as the first point among the group of points. The top-left point can be determined according to the following operations:

Firstly, determine the set of points in the group that has the minimum vertical coordinate (points that are comprised in the top-most row). The coordinates of the points are denoted as (x,y), where the variable y indicates the vertical coordinate.

Secondly, determine the point that has the minimum horizontal coordinate in said set of points. This point is determined to be the top-left point.

After the top-left point is determined, the remaining points in the same group are ordered according to raster scan order. In raster scanning, the points are scanned horizontally left-to-right, then at the end of one row scanning starts at the leftmost point of the next row of points. The rows are scanned starting from the top row continuing downward.

If a point A is checked before point B, and if the matching cost of point A is smaller than or equal to point B, the point A is set as the best matching point out of the two points (A and B). In other words, in the case of equal matching cost, the point that is checked earlier has priority and is selected as the best point.

According to the disclosure, point A is checked before point B if any of the following conditions is true;

Point A belongs to the first group and point B belongs to the second group.

Point A and point B belong to the same group, and point A is ordered before point B.

Figure 27:
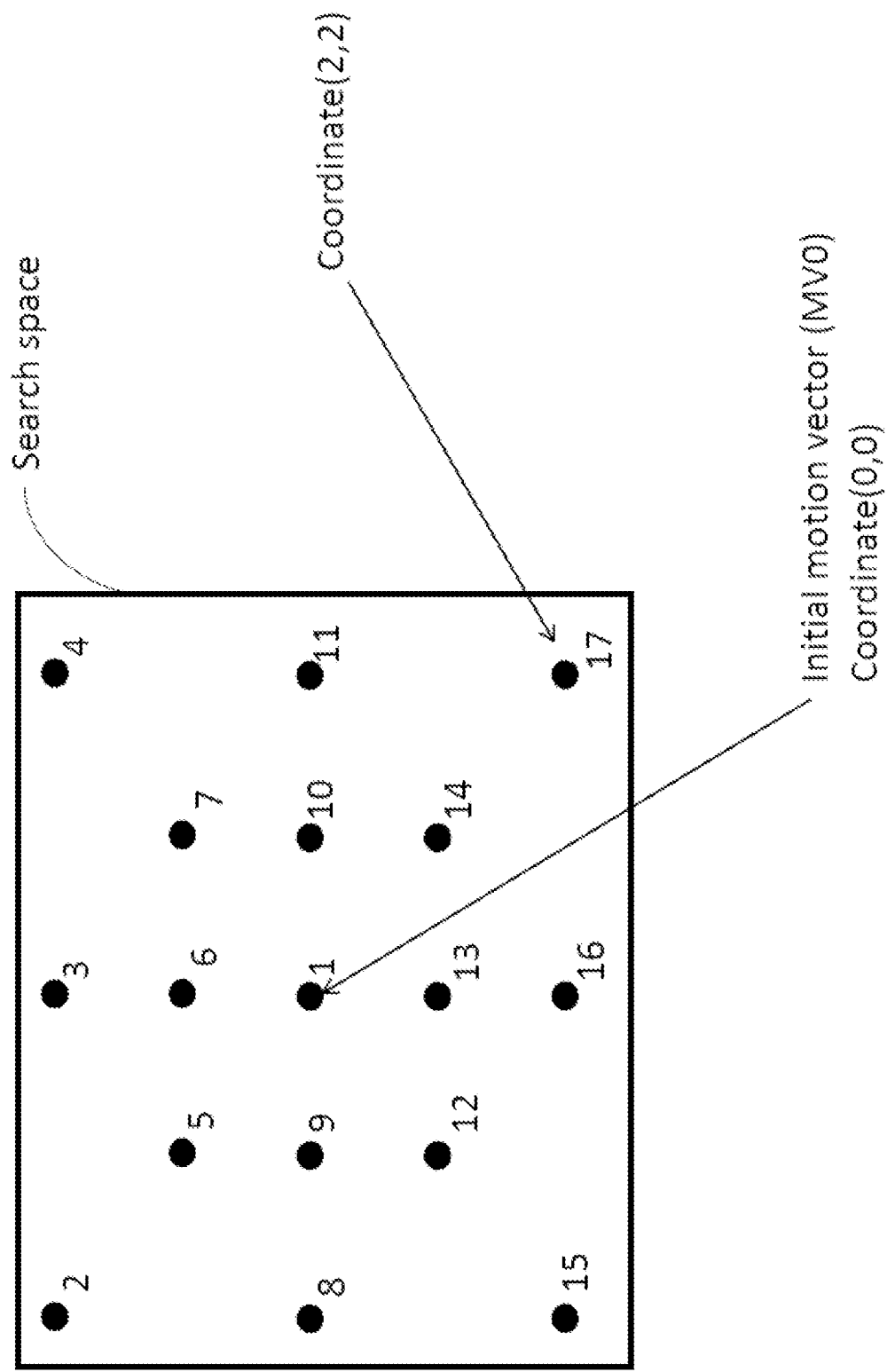
FIG. 27 is a schematic drawing illustrating another example of coordinate notation according to an embodiment of the present application.

The above embodiment is exemplified in FIG. 27. In this figure, the point comprised in the first group is labeled "1", which is the center point. There is only one point in the first group.

In the second group, there are 16 points and they are labelled 2, 3, . . . , 17. The points in the second group are checked according to the same order as they are labelled, i.e. 2, 3, . . . , 17 in order. The top-left point of the second group is labelled "2".

According to FIG. 27, there is a total of 17 search points in the search space, where the points are grouped into 2 groups. According to the disclosure, the points belonging to the first group are checked before the points belonging to the second group. Moreover, the points within each group are ordered according to the rule disclosed above in the present disclosure. At the end, all 17 points are ordered and the final checking order is given as 1, 2, 3, . . . , 17. In other words, the final checking order of all points is given by their coordinates as follows: (0,0), (−2,−2), (0,−2), (2,−2), (−1,−1), (0,−1), (1,−1), (−2,0), (−1,0), (1,0), (2,0), (−1,1), (0,1), (1,1), (−2,2), (0,2), (2,2).

Figure 28:
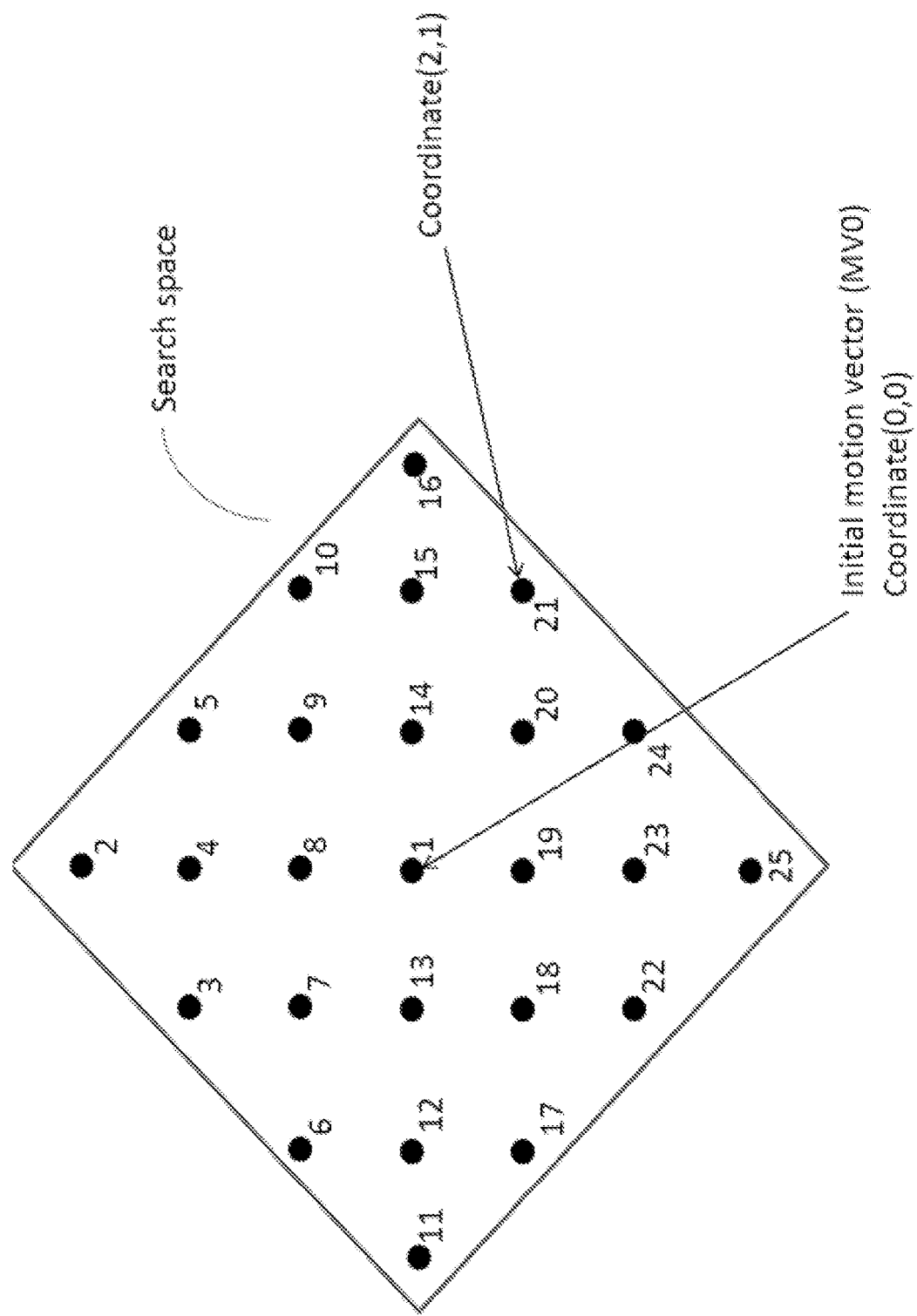
FIG. 28 is a schematic drawing illustrating an example of a search space according to an embodiment of the present application.

In another alternative embodiment, the search space is a diamond (or rhombus) shaped region, and the search space comprises 25 search points with the vertices of the diamond corresponding to the coordinates (−3,0), (0,−3), (3,0), and (0,3) in the search space. The center point with coordinate (0,0) corresponding to the initial motion vector belongs to a first group. All the other 24 points belong to the second group. The process ordering of the points in the second group is as per their raster scan position in that group (i.e. left to right within a row proceeding downwards row by row). FIG. 28 illustrates this embodiment.

In another example, the diamond-shaped region comprises 25 search points, wherein the diamond-shaped region is partitioned into two search spaces. A first search space initially comprises five search points. In an example, these five search points comprise an initial search point and four search points that are most adjacent to the initial search point in the search space. In an example, the initial search point corresponds to an initial motion vector, wherein the four search points that are most adjacent to the initial search point in the search space correspond to four candidate motion vectors most adjacent to the initial estimate motion vector in the pixel resolution of the first search space. The order of cost comparisons for the five search points is given by (0,0), (−1,0), (0,−1), (1,0), and (0,1).

A point corresponding to a candidate motion vector with the lowest matching cost in the first search space and a point corresponding to a candidate motion vector with the second lowest matching cost in the first search space are used to select two diagonal search points of the initial point. More specifically, when the search point corresponding to the lowest matching cost is a non-center search point among the 5 initial search points, the two diagonal search points at 1-pixel distance from that search point are selected. When the search point corresponding to the lowest matching cost is the center search point among the 5 initial search points, the two diagonal search points at 1-pixel distance from the search point corresponding to the second lowest matching cost are selected. There are in total four diagonal search points of the initial point in the first search space.

The order of cost comparisons for the 2 diagonal search points is in the raster scan order (i.e. left-to-right and down the rows). If the search point corresponding to the lowest matching cost in the 7 search points (five search points plus two diagonal search points) is the initial search point, the search is stopped. If the search point corresponding to the lowest matching cost in the 7 search points (five search points plus two diagonal search points) is not the initial search point, a second search space is determined based on the coordinates of the search point corresponding to the lowest matching cost.

Among the four search points most adjacent to the lowest matching cost search point, the matching cost is evaluated at search points that were not part of any earlier cost evaluations (which can be up to 2 new search points). For example, the reference is to a cross shaped 4-connected neighborhood. These 4 samples will be at a distance of 1-pixel from the center while the diagonal points will be at sqrt(2) distance from the center. Since some search points around the current center were already part of the first search space and hence the cost was evaluated earlier, the above is referring to the number of additional evaluations. The order of cost comparisons for these search points will be from the search point corresponding to the lowest matching cost in the first search space, followed by (−1,0), (0,−1), (1,0), (0,1) distance from the search point corresponding to the lowest matching cost in the first search space. Based on the search point corresponding to the lowest matching cost and the search point corresponding to the second lowest matching cost in the second search space, up to 3 more cost evaluations are performed in the determined second search space (in an example, conditioned on the lowest and second lowest cost, up to 3 search points are selected at which to evaluate cost). The order of cost comparisons shall proceed first in the following order of distance from the lowest cost search point at the beginning of these up to 3 more cost evaluations: (−1,0), (0,−1), (1,0), (0,1), (−2,0), (−1,−1), (0,−2), (1,−1), (0,2), (1,1), (0,2), (−1,1).

In the embodiments of the present disclosure, when two or more matching costs take the value equal to the lowest matching cost, the order of comparisons can change the refinement motion vector. Hence, it is needed to specify the order of comparison. Some orders of comparisons can show coding gain improvements over others. For instance, a center-biased order of comparison has been shown to have a slightly better coding gain.

Figure 29A:
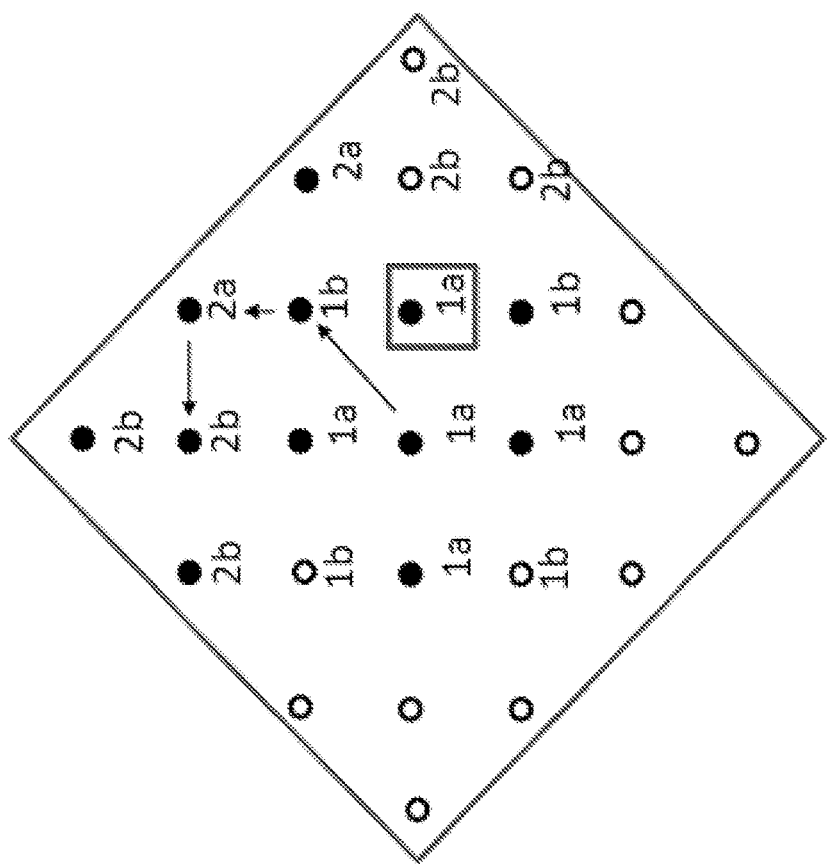
FIGS. 29A and 29B are schematic drawing illustrating an example of a multi-stage search in a search space according to an embodiment of the present application.
Figure 29B:
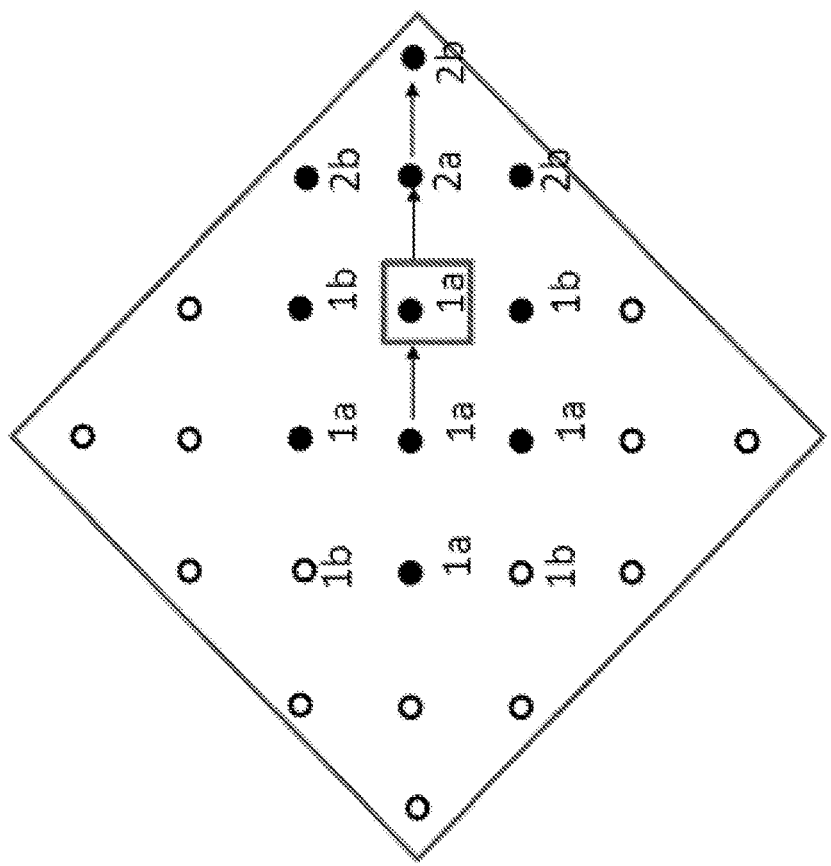

Two examples of this embodiment are illustrated in FIGS. 29A and 29B. The search coordinates marked as 1a correspond to the first 5 search points in the first search space. The search coordinates marked as 1b (filled) correspond to the two search points added to the first search space, based on the search point corresponding to the lowest matching cost and the search point corresponding to the second lowest matching cost within the first 5 search points. The search point 1a enclosed in a box indicates the search point with the lowest matching cost among the 5 initial search points (five 1a points) in the first search space. The search coordinates marked as 2a or 2b correspond to the search points in the second search space. The search points marked as 2a are the additional search points whose matching cost corresponding to this search point is evaluated first in the second search space. Based on the lowest and second lowest matching cost search points among the center search point for the second search space and the four most adjacent search points to it, a subset of search points from the search points marked as 2b are selected and the matching costs corresponding to the subset of search points are evaluated. More specifically, the search point corresponding to the lowest matching cost is used when this search point does not correspond to the center search point of the second search space. When this search point corresponds to the center search point of the second search space, the selection of the additional search points is based on the search point corresponding to the second lowest matching cost.

In an example, as showed in FIG. 29A, the search point coordinate (1,0) corresponds to the lowest matching cost search point in the first search space of 7 (or 9, including two additional diagonal points 1b for which no matching cost calculation is performed) search points. In an example, the search point coordinate (1,0) corresponds to the lowest matching cost search point in the first search space of 9 search points where matching costs are evaluated at 7 search points. One additional search point is marked as 2a. The arrows indicate the search point with the lowest cost at each stage. The search point with coordinate (2,0) marked as 2a is shown as the point corresponding to the lowest matching cost in this example. 3 additional positions (search points) marked as 2b are chosen for matching cost evaluation, and the search point corresponding to the final lowest matching cost is shown at search point coordinate (3,0). The filled circles correspond to positions at which matching cost is evaluated and the unfilled circles correspond to positions at which matching cost is not evaluated. Hence, it can be seen that matching costs are evaluated at only 11 positions of the 25 search points in FIG. 29A.

In another example, as showed in FIG. 29B, the top-right diagonal position marked as 1b is the lowest matching cost position in the first search space of 7 points (or 9 points, wherein matching costs are evaluated at 7 search points). Two positions (search points) marked as 2a are the candidate search points for which matching cost evaluation would be performed next. The search point corresponding to the lowest matching cost is shown at the coordinate (1,−2). The search point corresponding to the coordinate (1, −2) is one of the points marked as 2a. Based on the search point corresponding to the coordinate (1, −2), the three positions marked as 2b that are filled are taken up for matching cost evaluation next. The search point corresponding to the final lowest matching cost is shown to correspond to search point (0,−2). In this example, matching cost is evaluated at a total of 7+2+3=12 positions out of 25 search points.

In an alternative embodiment, a square shaped search space comprising 25 search positions is disclosed, wherein the square shaped search space with the four corner coordinates corresponding to (−2,−2), (−2,2), (2,2) and (2,−2) is employed. In this case, there are two search spaces. The first search space comprises the search center point corresponding to the initial motion vector and its 8-connected neighbor points at a distance of (−1,0), (−1,−1), (0,−1), (1,−1), (1,0), (1,1), (0,1), (−1,1) from the center. The order of matching cost calculation also starts from the center position and traverses these eight points in the same order as the 8-connected neighbors are listed in the above sentence.

If the search point with the lowest matching cost is the center point, the search stops. If the search point with the lowest matching cost is not the center point, the search point with the lowest matching cost in the first search space is used to determine a second search space. If the search point corresponding to the lowest matching cost has a zero in one of the coordinates, the second search space comprises three new search points that complete the 8-connected neighborhood of the search point corresponding to the lowest matching cost. If the search point corresponding to the lowest matching cost does not have a zero in one of the coordinates, the second search space comprises five new search points that complete the 8-connected neighborhood of the search point corresponding to the lowest matching cost. The order of cost comparisons in the second search space also proceeds in the order of (−1,0), (−1,−1), (0,−1), (1,−1), (1,0), (1,1), (0,1), (−1,1) distance from the search point corresponding to the lowest matching cost.

Figure 30B:
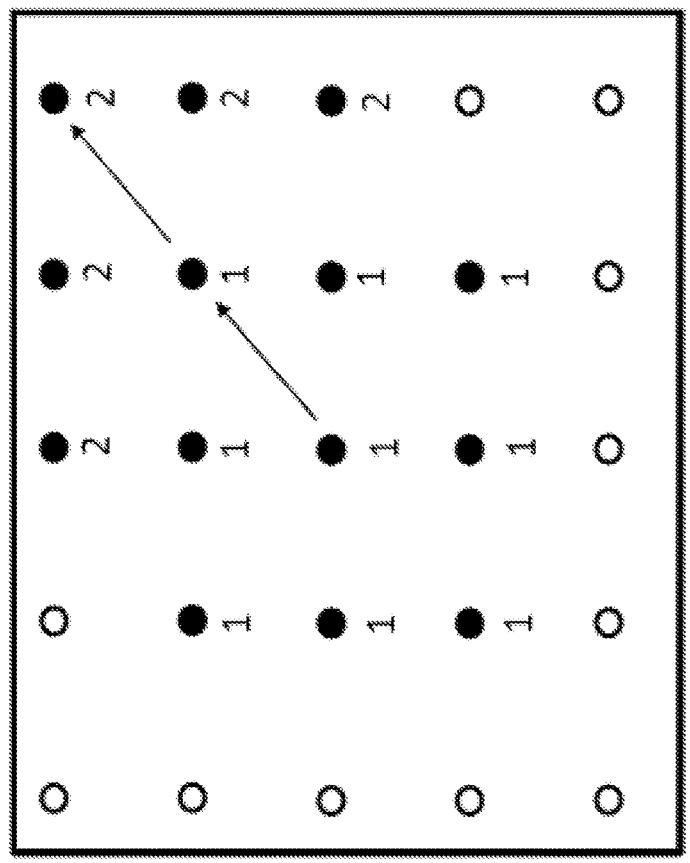
FIGS. 30A and 30B are schematic drawings illustrating further examples of search spaces according to an embodiment of the present application.
Figure 30A:
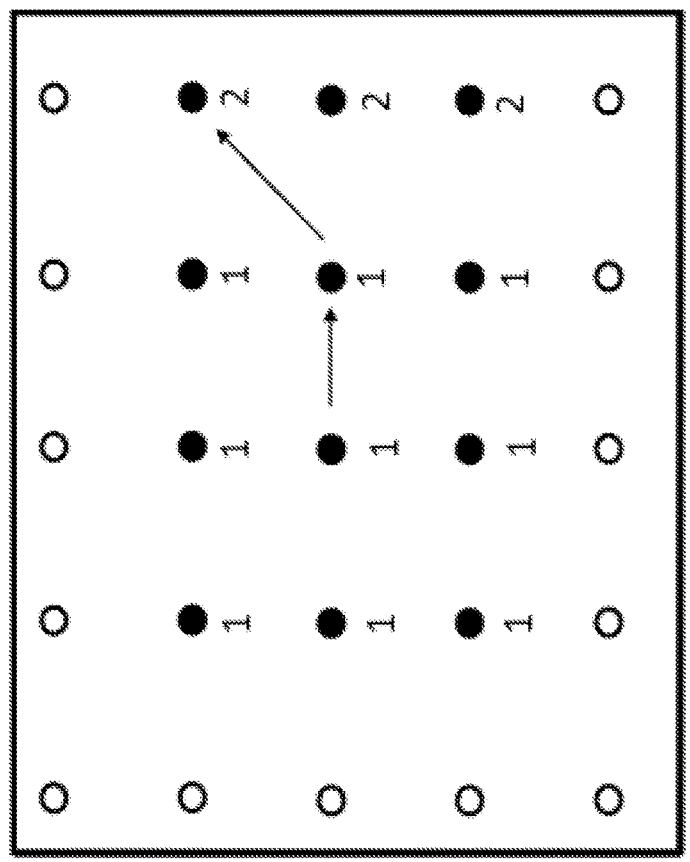

FIG. 30 illustrates this embodiment. The search points marked as 1 correspond to the first search space and the points marked as 2 correspond to the second search space that is determined based on the lowest matching cost position in the first search space. In FIG. 30A, position (1,0) is shown to be the lowest matching cost position in the first search space. Hence, 3 more search points (2,−1), (2,0) and (2,1) are added as second search space points. The final lowest matching cost is shown to be at (2,−1) by way of example. Hence, in this case, a total of 9+3=12 matching costs are evaluated. In FIG. 30B, position (1,−1) is shown to be the lowest matching cost position in the first search space. Hence, 5 more search points (0,−2), (1,−2), (2,2), (2,−1) and (2,0) are added as second search space points. The final lowest matching cost is shown to be at (2,−2) by way of example. In this case, a total of 9+5=14 matching costs are evaluated.

In another alternative embodiment, the 25-point square search space with the four corner search space coordinates corresponding to (−2,−2), (−2,2), (2,2) and (2,−2) is disclosed. A first search space initially comprises five search points. In an example, the five search points comprise an initial search point and four search points that are most adjacent to the initial search point in the search space. In an example, the initial search point corresponds to an initial motion vector, where the four search points that are most adjacent to the initial search point in the search space correspond to four candidate motion vectors most adjacent to the initial estimate motion vector in the pixel resolution of the first search space. The order of cost comparisons for the five search points is given by (0,0), (−1,0), (0,−1), (1,0), and (0,1).

A point corresponding to a candidate motion vector with the lowest matching cost in the first search space and a point corresponding to a candidate motion vector with the second lowest matching cost in the first search space are used to select two out of the four diagonal search points from the initial motion vector to be part of the first search space. The order of cost comparisons for the 2 diagonal positions (search points) are in the raster scan order (i.e. left-to-right and down the rows). If the search point corresponding to the lowest matching cost out of the 7 search points is the initial search point, the search stops. If the search point corresponding to the lowest matching cost out of the 7 search points is not the initial search point, a second search space is determined based on the coordinates of the search point corresponding to the lowest matching cost.

Among the four search points most adjacent to the lowest matching cost search point, the matching cost is evaluated at search points that were not part of any earlier cost evaluations (which can be up to 2 new search points). The order of cost comparisons will be starting from the search point corresponding to the lowest matching in the first search space, followed by (−1,0), (0,−1), (1,0), (0,1) distance from the search point corresponding to the lowest matching cost. Based on the search point corresponding to the lowest matching cost and the search point corresponding to the second lowest matching cost in the second search space, up to 2 diagonal positions relative to the lowest cost search point (search point corresponding to the lowest matching cost) are added to the second search space. The order of cost comparisons shall proceed from the lowest cost search point in the second search space and shall proceed in the raster scan order of these additional up to 2 search points.

Figure 31B:
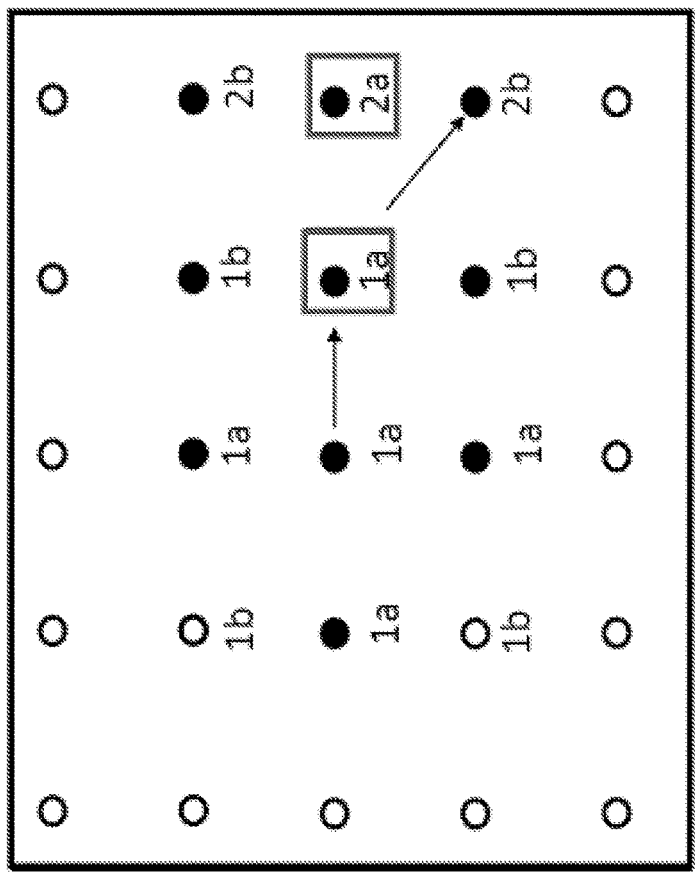
FIGS. 31A and 31B are schematic drawings illustrating further examples of a multi-stage search in a search space according to an embodiment of the present application.
Figure 31A:
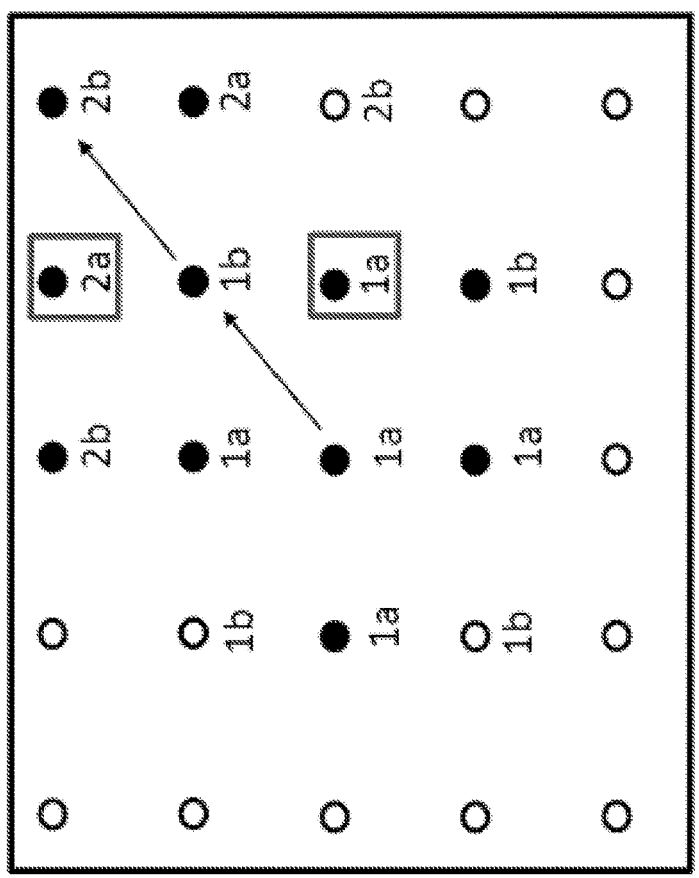

Two examples of this embodiment are illustrated in FIGS. 31A and 31B. The search coordinates marked as 1a correspond to the first 5 search points in the first search space. The search coordinates marked as 1b (filled) correspond to the two search points added to the first search space, based on the search point corresponding to the lowest matching cost and the search point corresponding to the second lowest matching cost within the first 5 search points. The search point 1a enclosed in a box indicates the search point with the lowest matching cost from the 7 search points (or 9 points, where matching costs are evaluated at 7 search points) in the first search space. The search coordinates marked as 2a or 2b correspond to the search points in the second search space. The search points marked as 2a are the additional search points at which matching cost is evaluated first in the second search space. Based on the lowest and second lowest matching cost search points among the lowest matching cost search point from the first search space and the four most adjacent search points to it, a subset of search points from the search points marked as 2b are selected and the matching costs are evaluated.

In an example, as showed in FIG. 31A, the search point coordinate (1,−1) corresponds to the lowest matching cost search point in the first search space of 7 search points (or 9 points, where matching costs are evaluated at 7 search points). Two additional search points are marked as 2a. The arrows indicate the search point with the lowest cost at each stage. The search point with coordinate (1,−2) marked as 2a is shown as the lowest cost point (search point corresponds to the lowest matching cost) in this example. 3 additional positions (search points) marked as 2b are chosen for matching cost evaluation and the search point corresponding to the final lowest matching cost is shown as a search point corresponding to coordinate (2,−2). The filled circles correspond to positions at which matching cost is evaluated and the unfilled circles correspond to positions at which matching cost is not evaluated. Hence, it can be seen that matching costs are evaluated at only 5+2+2+2=11 positions out of 25 search points in FIG. 31A.

In another example, as showed in FIG. 31B, the (1,0) position marked as 1a turns out to be the lowest matching cost position in the first search space of 7 points (or 9 points, where matching costs are evaluated at 7 search points). One position marked as 2a is the candidate search point for which matching cost evaluation would be performed next. The search point corresponding to the lowest matching cost is shown as a search point corresponding to the coordinate (2,0) and marked as 2a. Based on the search point corresponding to the coordinate (2,0), the two positions marked as 2b that are filled are taken up for matching cost evaluation next. The search point corresponding to the final lowest matching cost is shown as a search point corresponding to the coordinate (2,1). In this example, matching cost is evaluated at a total of 5+2+1+2=10 positions out of 25 search points.

In another alternative embodiment of the disclosure, a hexagonal search space with 23 search points with its vertices at (−3,0), (−1,−2), (1,−2), (3,0), (1,2), (−1,2) is employed.

Figure 32:
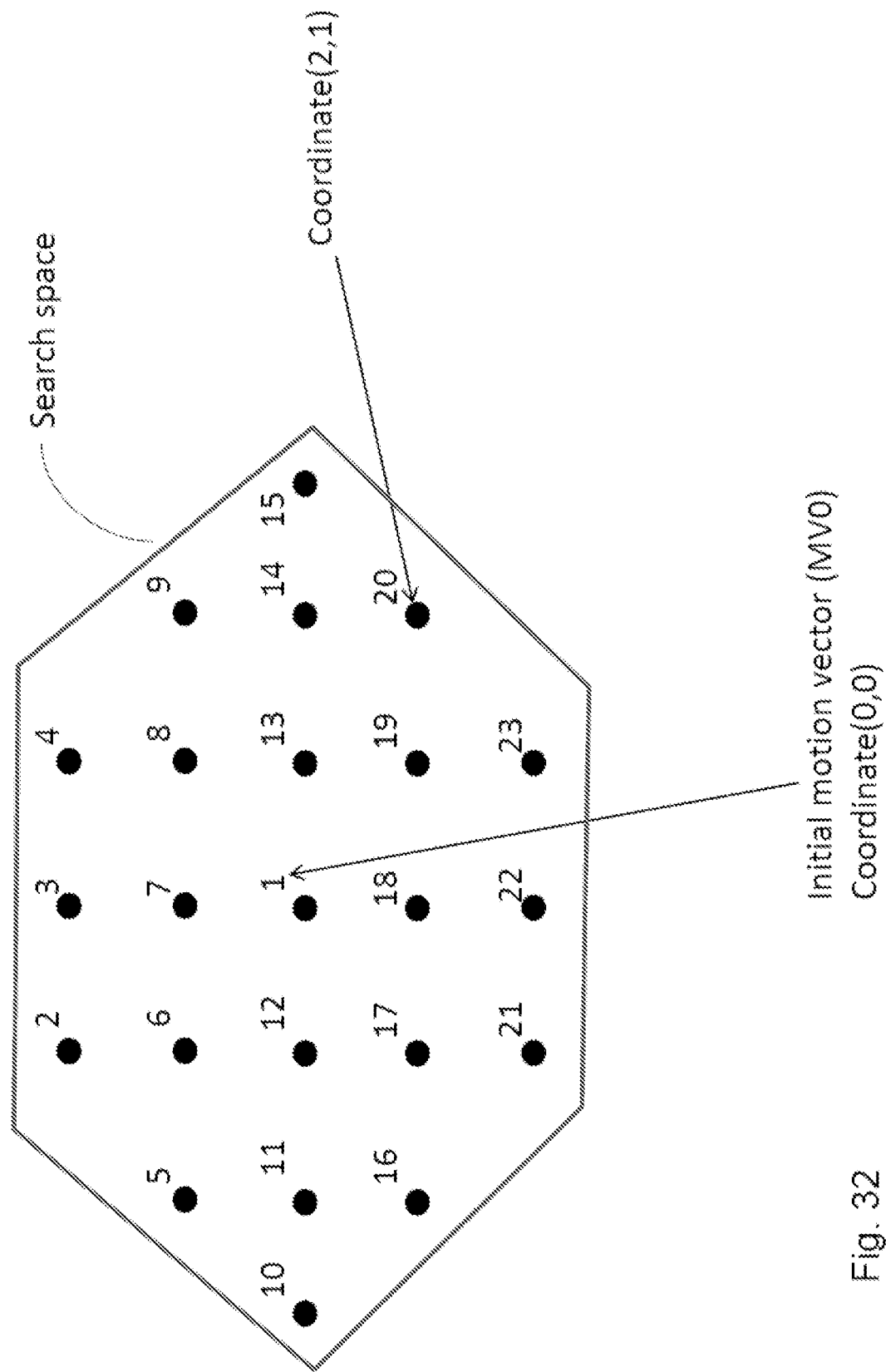
FIG. 32 is a schematic drawing illustrating another example of a search space according to an embodiment of the present application.

In an example, the center point with coordinate (0,0) corresponding to the initial motion vector belongs to a first search space. All the other 22 points belong to a second search space. The ordering of the points in the second group is as per their raster scan position in that group (i.e. left to right within a row proceeding downwards row by row). FIG. 32 illustrates this embodiment.

In an example, two search spaces are employed as follows. A first search space comprises the center search point, the center search point corresponding to an initial motion vector, and 8-connected neighbors at a distance of (−1,0), (−1,−1), (0,−1), (1,−1), (1,0), (1,1), (0,1), (−1,1) from the center search point. The order of matching cost for these search points starts from the center position (search point) and traverses these eight points in the same order as the 8-connected neighbors are listed in the above sentence. If a search point with the lowest matching cost is the center position, the search stops. If a search point with the lowest matching cost is not the center search point, the search point with the lowest matching cost in the first search space is used to determine a second search space.

If the lowest matching cost point (the search point with the lowest matching cost) is in the horizontal direction relative to the center search point, the second search space contains 4 additional search points. In an example, if the horizontal movement is from the left to the right, the four points correspond to the 4 positions to the right of the lowest cost search point. If the horizontal movement is from the right to the left, the four points correspond to the 4 positions to the left of the lowest cost search point. If the lowest matching cost point is in the vertical direction relative to the center search point, the second search space contains 3 additional search points to complete the 8-connected neighborhood of the lowest cost search point. Otherwise (if lowest matching cost point is not in the exclusively horizontal or exclusively vertical direction relative to the center search point), if the lowest matching cost point is diagonal relative to the center search point, the second search space contains 4 additional search points to complete the valid set of search points within the 8-connected neighborhood of the lowest cost search point. The order of cost comparisons in the second search space proceeds in the order of (−1,0), (−1,−1), (0,−1), (1,−1), (1,0), (1,1), (0,1), (−1,1), (−2,0), (2,0) distance from the lowest cost search point.

FIG. 33 illustrates this embodiment. The search points marked as 1 correspond to the first search space, and the points marked as 2 correspond to the second search space that is determined based on the lowest matching cost position (search point corresponding to the lowest matching cost in the first search space) in the first search space.

In an example, as showed in FIG. 33A, the search point coordinate (1,0) is shown to be the lowest matching cost position in the first search space. 4 search points with coordinates at (2,−1), (2,0), (2,1) and (3,0) are added as second search space points (points in the second search space). The search point corresponding to the final lowest matching cost is shown to be a search point with coordinates at (2,−1). In this case, a total of 9+4=13 matching costs are evaluated.

In a further example, as showed in FIG. 33B, the search point coordinate (1,−1) is shown to be the lowest matching cost position in the first search space. 4 search points with coordinates at (0,−2), (1,−2), (2,−1) and (2,0) are added as second search space points. The search point corresponding to the final lowest matching cost is shown to be a search point with coordinates at (2,−1). In this case, a total of 9+4=13 matching costs are evaluated.

In yet another example, as showed in FIG. 33C, the search point coordinate (0,−1) is shown to be the lowest matching cost position in the first search space. 3 search points with coordinates at (−1,−2), (0,−2), and (1,−2) are added as second search space points. The search point corresponding to the final lowest matching cost is shown to be a search point with coordinates at (0,−2). In this case, a total of 9+3=12 matching costs are evaluated.

The embodiments above describe how the predefined order is applied for checking the search points according to the matching cost. Therefore, according to the embodiments, According to a first operation, all of the points are grouped into one or more ordered groups.

According to a second operation, if there are multiple points in a group, the points are ordered according to the predefined rules that are disclosed by the embodiments.

After the first and the second operation, all of the points in the search space (that include all of the points that are accessible by motion vector refinement search operation) are ordered with respect to each other. The order is then used for checking the points according to a predefined matching cost. If the predefined matching cost is the same for two points in the search space, the point that was checked first (according to the ordering operation) is selected as the better point. Accordingly, all points are compared with each other and the best point among the points in the search space is determined. The motion vector that points to the determined best point (among all of the points in the search space) is determined to be the refined motion vector.

Finally, the refined motion vector is used for predicting a block using inter prediction.

The points in the search space in the above embodiments correspond to candidate motion vectors that are used in motion vector refinement. In other words, the center point in the search space typically corresponds to one of the motion vectors of the initial motion vector pair. Moreover, all of the other search points in the search space correspond to one motion vector of the candidate motion vector pairs, more specifically the motion vector corresponding to the L0 list of the candidate motion vector pairs. In another example, each search point in the search space corresponds to one motion vector of the candidate motion vector pairs, more specifically the motion vector corresponding to the L1 list of the candidate motion vector pairs.

A refined motion vector can be obtained by a method as described above, such as motion vector refinement.

According to the different embodiments, the present application discloses a method for determining a motion vector to be used in inter-prediction of a current block of a video picture, the method comprising: obtaining an initial motion vector; obtaining at least two groups of points according to the initial motion vector, wherein a first group of the at least two groups of points only includes a first point corresponding to the initial motion vector and additional N points with N≥0 and wherein each point of the first group is closer to the first point than any point of the points of a second group of the at least two groups; and obtaining the motion vector for the current block according to the at least two groups of points and a cost function.

In an embodiment, the N points adjacent to the first point and the second group includes points excluding the points of the first group.

In an embodiment, the cost function is calculated based on pixel values of pixels of one or more reference blocks of one or more reference pictures for the current block.

In an embodiment, the cost function indicates a difference between a template and an area in a reference picture for the current block that corresponds to the template in a location pointed to by a motion vector candidate corresponding to a respective point among the at least two groups of points.

In an embodiment, the cost function indicates a difference between the current block and a candidate block pointed to by a motion vector candidate corresponding to a respective point among the at least two groups of points.

In an embodiment, the cost function is evaluated for at least a subset of the points belonging to the at least two groups of points.

In an embodiment, the at least two groups of points comprise all the points that are inside a rhombus-shaped region, the rhombus-shaped region being centered at a point corresponding to the initial motion vector.

In an embodiment, corners of the rhombus-shaped region are determined by the coordinates (−3,0), (0,−3), (3,0) and (0,3) with respect to the center point.

In an embodiment, the at least two groups of points comprise all the points that are inside a square-shaped region, the square-shaped region being centered at a point corresponding to the initial motion vector.

In an embodiment, corners of the square-shaped region are determined by the coordinates (−2,−2), (2,2), (−2,2) and (2,−2) with respect to the center point.

In an embodiment, the at least two groups of points comprise all the points that are inside a hexagonal-shaped region, the hexagonal-shaped region being centered at a point corresponding to the initial motion vector.

In an embodiment, corners of the hexagonal-shaped region are determined by the coordinates (−3,0), (−1,−2), (1,−2), (3,0), (1,2), (−1,2) with respect to the center point.

In an embodiment, a first group of points in the at least two groups of points comprises the center point that is pointed to by the initial motion vector.

In an embodiment, the obtaining the motion vector for the current block according to the at least two groups of points and a cost function comprises: determining a first search space with at least part of the points in the first group of points according to the initial motion vector; obtaining a first search point in the first search space based on the cost function, wherein the first search point corresponds to a lowest cost in the first search space or the first search point corresponds to a second lowest cost in the first search space; and when the first search point in the first search space is not the search point corresponding to the initial motion vector, determining a second search space according to the first search point.

In an embodiment, the first search point corresponds to the second lowest cost in the first search space, when the search point corresponding to the initial motion vector corresponds to the lowest cost in the first search space.

In an embodiment, the first search point does not correspond to the initial motion vector.

In an embodiment, the first search space comprising an initial search point corresponding to the initial motion vector and four search points that are most adjacent to the initial search point.

In an embodiment, further comprising: adding two diagonal search points in the first group of points according to the first search point to the first search space.

In an embodiment, determining the second search space according to the first search point comprises selecting at least one point from a second group of points in the at least two groups of points that is most adjacent to the first search point to be included in the second search space.

In an embodiment, further comprising: determining a second search point corresponding to a lowest cost in the second search space; and adding up to three additional points from the second group of points to the second search space according to the second search point.

In an embodiment, the up to three additional points are added in the order (−1,0), (0,−1), (1,0), (0,1), (−2,0), (−1,−1), (0,−2), (1,−1), (0,2), (1,1), (0,2), (−1,1) with respect to the second search point.

In an embodiment, the first search space comprising an initial search point corresponding to the initial motion vector and 8 neighbour points at a distance of (−1,0), (−1,−1), (0,−1), (1,−1), (1,0), (1,1), (0,1), (−1,1) from the initial search point.

In an embodiment, determining the second search space according to the first search point comprises: when the first search point is one of the most adjacent points in the first search space with respect to the initial search point, the second search space comprises three search points from a second group of points in the at least two groups of points that complete the 8 neighbourhood of the first search point; and when the first search point is one of the diagonal points in the first search space with respect to the initial search point, the second search space comprises five search points from the second group of points that complete the 8 neighbourhood of the first search point.

In an embodiment, determining the second search space according to the first search point comprises: when the first search point is a horizontal neighbour of the initial search point on a right-hand side or a left-hand side of the initial search point, the second search space comprises four points from a second group of points in the at least two groups of points right or left, respectively, of the first search point; when the first search point is a vertical neighbour of the initial search point above or below the initial search point, the second search space comprises three points from the second group of points above or below, respectively, the first search point; and when the first search point is a diagonal point with respect to the initial search point in the first search space, the second search space comprises four points from the second group of points to complete the 8-connected neighbourhood of the first search point.

In an embodiment, a cost of the cost function is evaluated starting from the search point corresponding to the initial motion vector to other search points in the first search space and/or the second search space in a raster scan order.

In an embodiment, a cost of the cost function is evaluated in an order from a center search point to groups of search points around the center search point with increasing distance from the center search point, wherein the order of cost evaluation within each group of search points follows a clockwise order starting from the position to the left of the center position.

In an embodiment, the at least two groups of points are processed in order when the at least two groups of points are processed with the cost function.

In an embodiment, when one group of points in the at least two groups of points comprises at least two points, there are more than one leftmost points in the group of points and the group of points have a same displacement in −y direction, the leftmost point in the top direction is selected as the first point of the group of points in an order.

In an embodiment, after the first point in the group of points is determined, the remaining points in the same group are ordered based on clock-wise or counter-clockwise order around the center point.

In an embodiment, the initial motion vector corresponds to a motion vector that is derived using an index signaled in the bitstream.

In an embodiment, neither the initial motion vector nor the obtained motion vector for the current block is coded into the bitstream.

The present application also discloses an encoder comprising processing circuitry for carrying out the above different methods.

The present application also discloses a decoder comprising processing circuitry for carrying out the above different methods.

The present application also discloses a computer program product comprising instructions which, when the program is executed by a computer, cause the computer to carry out the method according to the above different methods.

The present application also discloses a decoder, comprising: one or more processors; and a non-transitory computer-readable storage medium coupled to the one or more processors and storing instructions for execution by the one or more processors, wherein the instructions, when executed by the one or more processors, configure the decoder to carry out the method according to the above different methods.

The present application also discloses an encoder, comprising: one or more processors; and a non-transitory computer-readable storage medium coupled to the one or more processors and storing instructions for execution by the one or more processors, wherein the instructions, when executed by the one or more processors, configure the encoder to carry out the method according to the above different methods.

The motion vector determination including the motion vector refinement as described above can be implemented as a part of encoding and/or decoding of a video signal (motion picture). However, the motion vector determination may also be used for other purposes in image processing such as movement detection, movement analysis, or the like.

The motion vector determination may be implemented as an apparatus. Such an apparatus may be a combination of a software and hardware. For example, the motion vector determination may be performed by a chip such as a general purpose processor, or a digital signal processor (DSP), or a field programmable gate array (FPGA), or the like. However, embodiments of the present disclosure are not limited to implementation on a programmable hardware. They may be implemented on an application-specific integrated circuit (ASIC) or by a combination of the above mentioned hardware components.

The motion vector determination may also be implemented by program instructions stored on a computer readable medium. The program, when executed, causes the computer to perform the operations of obtaining an estimate of the motion vector, determining the first search space including a plurality of candidate motion vectors based on the estimate, identifying a first and a second candidate motion vector in the first search space according to a cost function, determining a second search space including one or more candidate motion vectors based on the first and the second candidate motion vectors, and selecting the motion vector for the current block from among the candidate motion vectors of the first search space and the second search space. The computer readable medium can be any medium on which the program is stored such as a DVD, CD, USB (flash) drive, hard disc, server storage available via a network, etc.

The encoder and/or decoder may be implemented in various devices including a TV set, set top box, PC, tablet, smartphone, or the like. It may be a software, app implementing the method operations.

Summarizing, embodiments of the present disclosure relate to the construction of a search space for determining a motion vector for a current block of a picture in a video sequence. The search space construction is split into two main stages, wherein a first and a second partial search space are respectively determined. Based on an initial estimate of a motion vector, a first search space is constructed first. A first and a second candidate motion vector of the first search space are identified according to a cost function. Based on the first and the second candidate motion vectors, a second search space is constructed. The motion vector for the current block is selected from the candidate motion vectors of the first search space and the second search space.

Although embodiments of the disclosure have been described above mainly within the framework of motion picture video coding, the proposed techniques can be applied as well for coding (i.e. encoding or decoding) of any picture set comprising two or more pictures. The picture set may comprise, for example, a set of still pictures obtained in a medical imaging application, e.g., a sequence of computed tomography (CT) scan images. In the appended claims, the term "video" may therefore mean a motion picture sequence or any other picture set that comprises two or more pictures.

What is claimed is:

1. A method for determining a motion vector to be used in inter-prediction of a current block of a video picture, the method comprising:
   obtaining an initial motion vector;
   obtaining at least two groups of points according to the initial motion vector, wherein a first group of the at least two groups of points only includes a first point corresponding to the initial motion vector and additional N points with N≥0 and a second group of the at least two groups of points includes a plurality of adjacent neighboring points; and
   obtaining the motion vector for the current block according to the at least two groups of points and a cost function, comprising:
      determining costs of vertical adjacent neighboring points in the two groups of points and costs of horizontal adjacent neighboring points in the two groups of points based on the cost function;
      determining a search space according to the initial motion vector, a difference in the costs of the vertical adjacent neighboring points and a difference in the costs of the horizontal adjacent neighboring points; and
      obtaining the motion vector for the current block according to a point having a lowest cost in the search space.

2. The method according to claim 1, wherein the cost function is calculated based on pixel values of pixels of one or more reference blocks of one or more reference pictures for the current block.

3. The method according to claim 1, wherein the cost function indicates a difference between the current block and a candidate block pointed to by a motion vector candidate corresponding to a respective point among the at least two groups of points.

4. The method according to claim 1, wherein the cost function is evaluated for at least a subset of the points belonging to the at least two groups of points.

5. The method according to claim 1, wherein the at least two groups of points comprise all the points that are inside a square-shaped region, the square-shaped region being centered at a point corresponding to the initial motion vector.

6. The method according to claim 5, wherein corners of the square-shaped region are determined by coordinates (−2,−2), (2,2), (−2,2) and (2,−2) with respect to a center point.

7. The method according to claim 1, wherein a first group of points in the at least two groups of points comprises a center point that is pointed to by the initial motion vector.

8. The method according to claim 1, wherein determining the search space comprises:
  determining a first search space with at least part of the points in the first group of points according to the initial motion vector;
  obtaining a first search point in the first search space based on the cost function, wherein the first search point corresponds to a lowest cost in the first search space or the first search point corresponds to a second lowest cost in the first search space; and
  when the first search point in the first search space is not a search point corresponding to the initial motion vector, determining a second search space according to the first search point.

9. The method according to claim 8, wherein the first search point corresponds to the second lowest cost in the first search space, when the search point corresponding to the initial motion vector corresponds to the lowest cost in the first search space.

10. The method according to claim 9, wherein the first search point does not correspond to the initial motion vector.

11. The method according to claim 8, wherein the first search space comprising an initial search point corresponding to the initial motion vector and four search points that are most adjacent to the initial search point.

12. The method according to claim 11, further comprising:
  adding two diagonal search points in the first group of points according to the first search point to the first search space.

13. A decoder, comprising:
  one or more processors; and
  a non-transitory computer-readable storage medium coupled to the one or more processors and storing instructions, which when executed by the one or more processors, cause the one or more processors to perform operations of:
  obtaining an initial motion vector;
  obtaining at least two groups of points according to the initial motion vector, wherein a first group of the at least two groups of points only includes a first point corresponding to the initial motion vector and additional N points with N≥0 and a second group of the at least two groups of points includes a plurality of neighboring points; and
  obtaining a motion vector for a current block according to the at least two groups of points and a cost function, comprising:
    determining costs of vertical adjacent neighboring points in the two groups of points and costs of horizontal adjacent neighboring points in the two groups of points based on the cost function;
    determining a search space according to the initial motion vector, a difference in the costs of the vertical adjacent neighboring points and a difference in the costs of the horizontal adjacent neighboring points; and
    obtaining the motion vector for the current block according to a point having a lowest cost in the search space.

14. The decoder according to claim 13, wherein the cost function is calculated based on pixel values of pixels of one or more reference blocks of one or more reference pictures for the current block.

15. The decoder according to claim 13, wherein the cost function indicates a difference between the current block and a candidate block pointed to by a motion vector candidate corresponding to a respective point among the at least two groups of points.

16. The decoder according to claim 13, wherein the cost function is evaluated for at least a subset of the points belonging to the at least two groups of points.

17. The decoder according to claim 13, wherein the at least two groups of points comprise all the points that are inside a square-shaped region, the square-shaped region being centered at a point corresponding to the initial motion vector.

18. The decoder according to claim 17, wherein corners of the square-shaped region are determined by coordinates (−2,−2), (2,2), (−2,2) and (2,−2) with respect to a center point.

19. The decoder according to claim 13, wherein a first group of points in the at least two groups of points comprises a center point that is pointed to by the initial motion vector.

20. An encoder, comprising:
  one or more processors; and
  a non-transitory computer-readable storage medium coupled to the one or more processors and storing instructions, which when executed by the one or more processors, cause the one or more processors to perform operations of:
  obtaining an initial motion vector;
  obtaining at least two groups of points according to the initial motion vector, wherein a first group of the at least two groups of points only includes a first point corresponding to the initial motion vector and additional N points with N≥0 and a second group of the at least two groups of points includes a plurality of neighboring points; and
  obtaining a motion vector for a current block according to the at least two groups of points and a cost function, comprising:
    determining costs of vertical adjacent neighboring points in the two groups of points and costs of horizontal adjacent neighboring points in the two groups of points based on the cost function;
    determining a search space according to the initial motion vector, a difference in the costs of the vertical adjacent neighboring points and a difference in the costs of the horizontal adjacent neighboring points; and obtaining the motion vector for the current block according to a point having a lowest cost in the search space.

* * * * *